(12) United States Patent
Hardin et al.

(10) Patent No.: US 12,536,515 B2
(45) Date of Patent: *Jan. 27, 2026

(54) APPLICATION OF DYNAMIC TOKENS

(71) Applicants: Ryan Hardin, Henderson, TX (US);
Andrew Hill, Houston, TX (US)

(72) Inventors: Ryan Hardin, Henderson, TX (US);
Andrew Hill, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/616,466

(22) Filed: Mar. 26, 2024

(65) Prior Publication Data
US 2024/0232837 A1  Jul. 11, 2024

Related U.S. Application Data

(63) Continuation of application No. 17/868,809, filed on Jul. 20, 2022, now Pat. No. 11,972,403, which is a continuation of application No. 16/892,335, filed on Jun. 4, 2020, now Pat. No. 11,423,374, which is a continuation of application No. 15/616,942, filed on Jun. 8, 2017, now Pat. No. 10,719,819, which is a continuation of application No. 14/930,200, filed on Nov. 2, 2015, now Pat. No. 9,710,794, which is a
(Continued)

(51) Int. Cl.
| | |
|---|---|
| *G06Q 30/02* | (2023.01) |
| *G06Q 20/10* | (2012.01) |
| *G06Q 20/38* | (2012.01) |
| *G06Q 30/0273* | (2023.01) |
| *H04L 41/06* | (2022.01) |
| *H04L 67/02* | (2022.01) |

(52) U.S. Cl.
CPC ....... *G06Q 20/102* (2013.01); *G06Q 20/3825* (2013.01); *G06Q 30/0273* (2013.01); *H04L 41/06* (2013.01); *H04L 67/02* (2013.01)

(58) Field of Classification Search
None
See application file for complete search history.

(56) References Cited

U.S. PATENT DOCUMENTS 6,055,567 A * 4/2000 Ganesan ................ G06Q 30/04
   709/219
6,148,290 A * 11/2000 Dan ..................... G06Q 30/016
   705/304
(Continued)

*Primary Examiner* — Sunit Pandya

(57) ABSTRACT

A method assigns token requirements to service subscriptions in a service platform, such as a service platform containing entities or a database containing a plurality of said entities. The operator of the service platform establishes customization factors and maintains records reserving data services associated with token requirements for delivery to entities. In addition, customization factors are determined from values representing information associated with objects in a database. Token requirements associated with data services are calculated from one or more formulas utilizing customization factors. Sponsorships associated with the entities can be accepted by the service platform. The service platform can apply credit toward the fulfillment of token requirements. An entity can be provided a data service based on a relationship with a sponsorship such that an entity assigned a subscription having a token requirement fulfilled as a result of applying credit from a sponsorship will receive services related to the subscription.

1 Claim, 9 Drawing Sheets

Related U.S. Application Data continuation of application No. 13/955,033, filed on Jul. 31, 2013, now Pat. No. 9,245,284.

(56) References Cited

U.S. PATENT DOCUMENTS

| | | | | |
|---|---|---|---|---|
| 7,146,338 | B2* | 12/2006 | Kight | G06Q 30/04 |
| | | | | 705/40 |
| 8,732,154 | B2* | 5/2014 | Messer | H04L 67/53 |
| | | | | 707/708 |
| 2003/0115149 | A1* | 6/2003 | Dan | G06Q 10/10 |
| | | | | 705/64 |
| 2006/0080321 | A1* | 4/2006 | Horn | G06F 16/9535 |
| 2007/0214043 | A1* | 9/2007 | Yasuda | G06Q 30/0207 |
| | | | | 705/14.1 |
| 2009/0138330 | A1* | 5/2009 | Higgins | G06Q 30/06 |
| | | | | 705/7.29 |
| 2014/0114857 | A1* | 4/2014 | Griggs | G06Q 40/00 |
| | | | | 705/44 |
| 2014/0181130 | A1* | 6/2014 | Davis | G06F 16/25 |
| | | | | 707/758 |
| 2014/0188586 | A1* | 7/2014 | Carpenter | G06Q 20/3821 |
| | | | | 705/14.23 |
| 2014/0370846 | A1* | 12/2014 | Neal | H04M 15/09 |
| | | | | 455/406 |

* cited by examiner

APPLICATION OF DYNAMIC TOKENS

CROSS REFERENCE TO RELATED APPLICATIONS

This continuation patent application claims priority from co-pending United States Non-provisional patent application having Ser. No. 17/868,809, filed 20 Jul. 2022, entitled "APPLICATION OF DYNAMIC TOKENS", which claims priority from United States Non-provisional patent application having Ser. No. 16/892,335, filed 4 Jun. 2020, entitled "APPLICATION OF DYNAMIC TOKENS", now U.S. Pat. No. 11,423,374 issued on 3 Aug. 2022, which claims priority from United States Non-provisional patent application having Ser. No. 15/616,942, filed 8 Jun. 2017, entitled "APPLICATION OF DYNAMIC TOKENS", now U.S. Pat. No. 10,719,819 issued on 21 Jul. 2020, which claims priority from United States Non-provisional patent application having Ser. No. 14/930,200, filed 2 Nov. 2015, entitled "APPLICATION OF DYNAMIC TOKENS", now U.S. Pat. No. 9,710,794 issued on 18 Jul. 2017, which claims priority from United States Non-provisional patent application having Ser. No. 13/955,033, filed 31 Jul. 2013, entitled "APPLICATION OF DYNAMIC TOKENS", now U.S. Pat. No. 9,245,284 issued on 26 Jan. 2016, all having a common applicant herewith and being incorporated herein in their entirety by reference.

FIELD

This disclosure relates generally to delivery of services, and more particularly to delivery of services having token requirements.

BACKGROUND

Software products and services can be provided to various entities or organizations, including membership organizations, via the Internet. For example, software products and services can be provided to a membership organization via an online membership website. Furthermore, data or software products and services can be provided to software applications running on mobile devices, desktop devices, or web applications, or via application programming interfaces (APIs), based on subscriptions and preferences.

When providing data services, software products, services, and/or other features to some entities or membership organizations, currently available technologies can provide the features to all or some of the entities or organizations subscribed to receive them. In some cases, features of software products, etc. are provided to any entity or organization having a subscription level that includes the features. When providing features, for example via subscription, it is common to provide the features in response to a fee assignment delivered to the entity or organization. In some cases, coupon technology can be used to provide discounts to multiple entities or organizations concurrently.

In each of these cases, an entity or organization can usually receive services from one or more, or multiple different, service providers without considering interesting characteristics of or relationships associated with or within the entity or organization. Current technologies are, therefore, less than perfect.

SUMMARY

Various embodiments disclosed herein include providing one or more entities services by a service platform or provider, establishing multiple parameters defining tokens or token values or requirements, and maintaining records associating sponsorships with one or more entities. The service platform can receive a request from an entity interested in using or accessing services made available for use to the entity, and the request or characteristics associated with the entity can be used, in whole or in part, to determine a token requirement. In some embodiments, a service feature is provided based on a relationship between the token requirement and one or more calculations and/or one or more applications of tokens. Services can then be provided and/or delivered to the organization or entity.

In some embodiments, the service platform can record a calculated requirement associated with a software feature, and provide the calculated requirement to the entity to assist in future actions relating to one or more requests for or delivery of software features. The service platform can also receive information related to the entity—for example, contacts, members, sponsors, sponsorship values, etc.—and determine a token requirement based on the information related to the entity to provide additional service features to the entity or to perform requirement calculations in response to the received information. In some embodiments, the service platform can recalculate token requirements, token values, contact database sizes, membership quantities, sponsor quantities and sponsorship values at regular intervals.

In some embodiments, software features can be provided to an entity subscribing to a service if a token requirement is at least partially satisfied by token calculations or credits associated with one or more sponsors; if the token requirement is not satisfied, the entity can be charged for delivery of services. In some embodiments, services can be provided if the token requirement for a service contract, e.g. a fee for a service subscription or service level, is satisfied entirely by token calculations or credits associated with one or more sponsors. In some embodiments, the service platform can select from among several calculations in deciding which feature to provide to an entity.

In some embodiments, the service platform provides data services to one or more membership organizations or associations or entities based on one or more requests from one or more sponsors, and the platform stores one or more records of interest corresponding to each request. In at least one embodiment, the service platform accepts, from a sponsor, payment to be associated with a sponsorship interest associated with an entity. The service platform can also receive payment from an entity not associated with a sponsorship interest. Furthermore, some embodiments include time based restrictions. Some embodiments include processes or calculations repeated at regular or irregular intervals or on a schedule.

Various embodiments can be implemented as a system that includes memory, a communications interface, and a processor that cooperate to store and execute a program of instructions implementing various methods and techniques described herein. Some embodiments can be implemented as a computer readable medium tangibly embodying a program of instructions. Furthermore, some embodiments can be implemented as a computer readable medium tangibly embodying one or more data structures having information related to or implementing various methods and techniques described herein for access by a program of instructions being executed on a data processing system.

DETAILED DESCRIPTION

Various embodiments of the present disclosure provide for delivering services, such as data services, or information to any of various websites, applications, or devices, or application programming interfaces (APIs) being consumed by websites, applications, or devices, used by subscribing entities, used by entities associated with the subscribing entities, or accessed by third-party visitors, users, or consumers. Sponsors can request sponsorship associated with an entity so that data services assigned to an entity having a token requirement can be provided to the entity.

Figure 1:
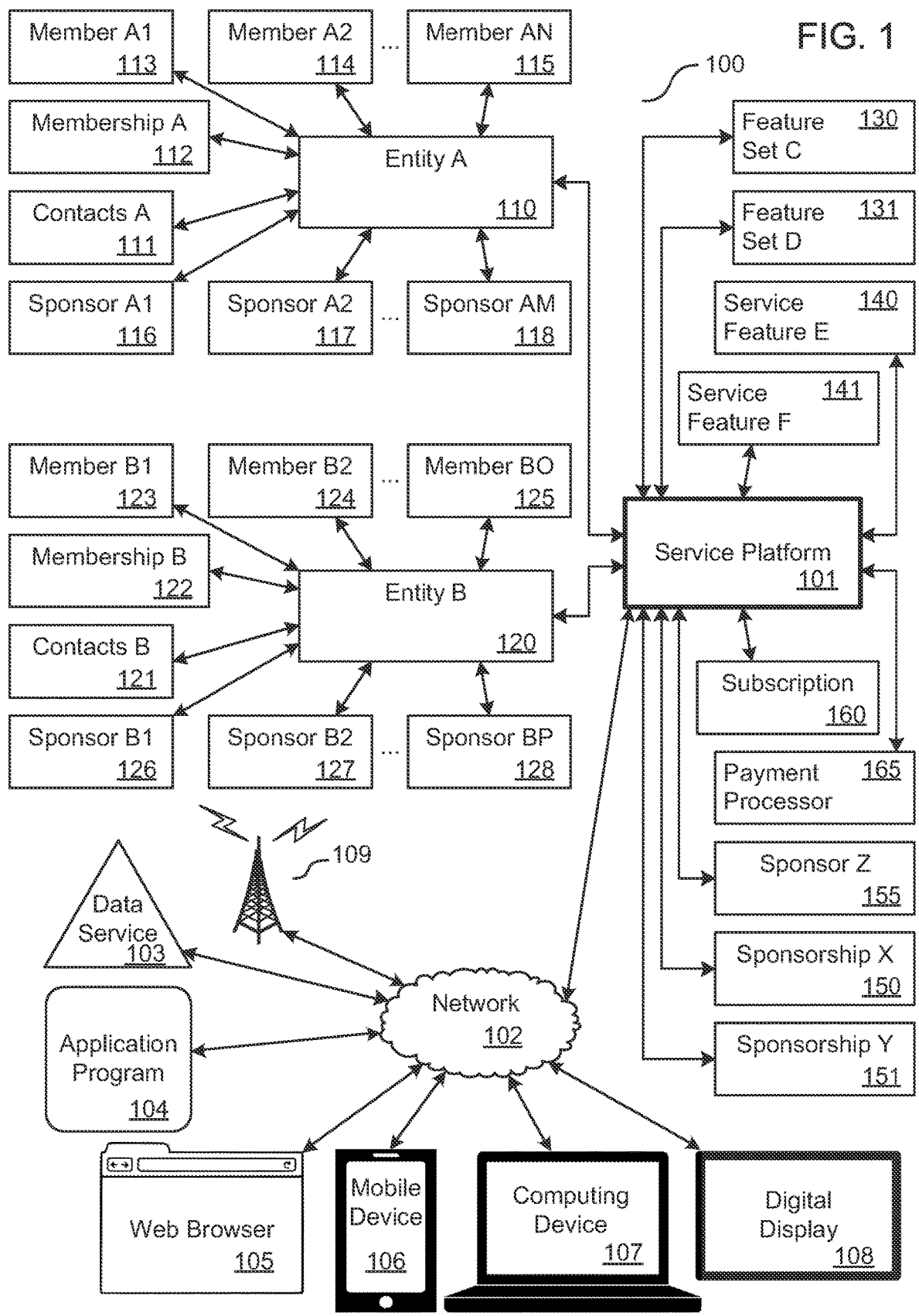
FIG. 1 is an abstract representation of a service platform according to various embodiments of the present disclosure.

Referring first to FIG. 1, system 100 is illustrated. System 100 can provide for delivery of services or other products consumed on devices or by systems accessed by entities where particular sponsorship and/or token requirements or conditions are satisfied. System 100, as illustrated, includes systems, methods, individuals, or organizations operating under control of service platform 101, systems, individuals, or organizations operating under control of entity A 110, systems, individuals, or organizations operating under control of sponsor A1 116, and services, service features, feature sets, or service contracts associated or included with subscription 160. Service platform 101 can receive a request from entity A 110 to subscribe to subscription 160. Service platform 101 can use sponsor A1 116 to satisfy conditions associated with delivery of subscription 160 or the services to entity A 110.

System 100 can include a plurality of entities associated with service platform 101, for example entity A 110 or entity B 120. In some embodiments, system 100 can include entities as members associated with entities, for example member A1 113, member A2 114, or member AN 115, which can be members associated with entity A 110 and can have a membership associated with entity A 110, for example membership A 112; and member B1 123, member B2 124, or member BO 125, which can be members associated with entity B 120 and can have a membership associated with entity B 120, for example membership B 122. In some embodiments, members can be registered end-users of a product or service provided an entity. For example, member A1 113 can be a registered website user of a website provided by entity A 110. In some embodiments, system 100 can include entities as contacts associated with entities, for example contacts A 111, which are contacts associated with entity A 110; and contacts B 121, which are contacts associated with entity B 120. In some embodiments, contacts can be anonymous end-users of a product or service provided by an entity. For example, one of contacts A 111 can be an anonymous website visitor using a website provided by entity A 110. In some embodiments, system 100 can include entities as sponsors associated with entities, for example sponsor A1 116, sponsor A2 117, or sponsor AM 118, which are sponsors associated with entity A 110 and have a sponsorship associated with entity A 110, for example sponsorship X 150; and sponsor B1 126, sponsor B2 127, or sponsor BP 128, which are sponsors associated with entity B 120 and have a sponsorship associated with entity B 120, for example sponsorship Y 151. In some embodiments, system 100 can include entities as sponsors associated with service platform 101 and not directly associated with an entity associated with service platform 101, for example, sponsor Z 155, which can have a sponsorship associated with an entity, for example, sponsorship X 150 or sponsorship Y 151. In some embodiments, system 100 can include entities as sponsors associated with service platform 101 and not associated with an entity associated with service platform 101 and having a sponsorship not associated with an entity associated with service platform 101. For example, sponsorship Y 151 can be associated with service platform 101. In some embodiments, entity A 110 can have a sponsorship associated with entity B 120, or entity A 110 can be associated as sponsor B1 126 which is a sponsor of entity B 120.

In some embodiments, service platform 101 can quantify the number of memberships associated with entities, for example service platform 101 can determine that entity A 110 has N members having memberships, and service platform 101 can determine entity B 120 to have O members having memberships. (Note that by stating "O members", and as indicated in FIG. 1, this is referring to the alphabetical letter O representing a variable having a numeric value and not necessarily limited to the number zero (0).) Likewise, in some embodiments, service platform 101 can quantify the number of contacts associated with entities, for example the number of contacts in contacts A 111 can determined by service platform 101. In some embodiments, system 100 can quantify the number of sponsors associated with entities, for example service platform 101 can determine that entity A 110 has M sponsors associated with entity A 110, and service platform 101 can determine entity B 120 to have P sponsors associated with entity B 120. Likewise, in some embodiments, service platform 101 can quantify the number of sponsorships associated with entities. In some embodiments, in the event a sponsor is not directly associated with an entity but the sponsor has a sponsorship associated with an entity, the number of sponsors determined to be associated with an entity may be different than the number of sponsorships determined to be associated with the entity. In some embodiments, service platform 101 can perform said quantifications in multiple instances or at regular intervals.

It should be noted that the term "entity" can include an individual, peer, end-user or application end-user, website visitor or website end-user, business, company, corporation, partnership, association, organization, membership organization, membership association, chamber of commerce, government, group, subsidiary, branch office, system, software application, device, sponsor, contact, member, any representative thereof, or any representative operating under the control of such an entity, to which a subscription, membership, or sponsorship can be presented, associated, assigned, reserved, provided, or delivered, or to which said entity can request a subscription, membership, or sponsorship for such a presentation, association, assignment, reservation, provision, or delivery; that the foregoing list of possible entities or entity types or categories is not exhaustive; and other entities or entity types/categories not mentioned in the foregoing list can be included as an entity. It should also be noted that, in some embodiments, an entity need not have associated contacts, members or memberships, or sponsors or sponsorships to be associated with service platform 101.

It should be noted that entities designated as associations, membership organizations, chambers of commerce, non-profit organizations, or the like, particularly entities comprised of members, can benefit according to various embodiments of the present disclosure. It should be noted that an entity associated with other entities, for example, an entity comprised of members, whereby the members pay fees or dues for membership with the entity, can receive revenue and/or make budgetary decisions based on revenue received from membership fees or dues from its associated entities and/or members. It should also be noted that, if said entity comprised of members strives, as one of its business objectives or duties, to provide services that are beneficial to its members, and said entity uses received revenue from the membership dues to help accomplish this goal of providing such beneficial services, the ability for said entity to reduce expenses so that it can maximally allocate resources towards the services that benefit its members would or should naturally be pursued by said entity. For example, in the case for a typical chamber of commerce, a chamber of commerce can attract members by providing services of value that benefit its membership, and in order to better provide valuable and beneficial services to its membership, if the chamber of commerce can direct financial resources away from unnecessary expenses and towards resources that help allow the betterment or improvement of those services, the chamber of commerce can be in a better position for growth in membership, and the membership can be in a better position by directly benefitting from improved services provided by the chamber of commerce. Moreover, because a typical chamber of commerce creates its budget using membership dues, a chamber of commerce might cease or struggle to exist if it loses its membership over time. As such, one approach for an entity, such as a chamber of commerce, is to pursue systems, methods, software, processes, business models, applications, services, or similar concepts so that expenses, for example costs for administering day-to-day services or office management, can remain low or non-existent, or can have the responsibility or burden for meeting such costs allocated or deferred elsewhere. One example of this would be for the entity to utilize a system or application or method or process that can help defer costs of services to the very members of or to sponsors associated with the entity.

In some embodiments, system 100 can include methods to associate entities with other entities. For example, service platform 101 can group entities together using common identifiers. For example, member A1 113, member A2 114, and member AN 115 can be assigned a common identifier associated with entity A 110. In another example, sponsor B1 126, sponsor B2 127, and sponsor BP 128 can be assigned a common identifier associated with entity B 120. In another example, a first one of contacts A 111 can be assigned a common identifier with a second one of contacts A 111 such that both first one and second one of contacts A 111 are associated with entity A 110. In another example, a first one of membership B 122 can be assigned a common identifier with a second one of membership B 122 such that both first one and second one of membership B 122 are associated with entity B 120. In another example, suppose sponsorship X 150 and sponsorship Y 151 are both associated with entity A 110; both can be assigned a common identifier such that both sponsorships are associated with entity A 110.

In some embodiments, system 100 can include methods to distinguish between entities. For example, service platform 101 can distinguish between entities using unique identifiers. For example, entity A 110 and entity B 120 each can be assigned a unique identifier so that entity A 110 is uniquely identified from entity B 120.

In some embodiments, system 100 can include methods to distinguish between entities that are associated with other entities. For example, service platform 101 can distinguish between entities that are associated with entities using unique identifiers. For example, member A1 113 and member A2 114 each can be assigned a unique identifier so that member A1 113 is uniquely identified from member A2 114. In another example, sponsor B1 126 and sponsor B2 127 each can be assigned a unique identifier so that sponsor B1 126 can be uniquely identified from sponsor B2 127. In another example, a first one of contacts A 111 and a second one of contacts A 111 can each be assigned a unique identifier so that first one and second one of contacts A 111 can be uniquely identified from each other. In another example, a first one of membership B 122 and a second one of membership B 122 can each be assigned a unique identifier so that first one and second one of membership B 122 can be uniquely identified from each other. In another example, suppose sponsorship X 150 and sponsorship Y 151 are both associated with entity A 110; each can be assigned a unique identifier so that each can be uniquely identified from each other.

In some embodiments, system 100 can include methods for associating or assigning entities of one type with another type. For example, service platform 101 can receive information from entity A 110 for an invoice, statement, or bill such that if one of contacts A 111, sponsor A1 116, or another entity not associated with entity A 110 pays the invoice, statement, or bill, the payee will be granted a membership with entity A 110, for example, membership A 112, and/or will become a member of entity A1 110, for example member A1 113. In another example, service platform 101 can receive information from entity A 110 for an invoice, statement, or bill such that if one of contacts A 111, member A1 113, or another entity not associated with entity A 110 pays the invoice, statement, or bill, the payee will be granted a sponsorship with entity A 110, for example, sponsorship X 150, and/or will become a sponsor of entity A1 110, for example, sponsor A1 116. Additionally, rather than receive said information in the examples above from entity A 110, service platform 101 can receive said information from one of contacts A 111, sponsor A1 116, member A1 113, or another entity not associated with entity A 110.

Furthermore, service platform 101 can receive and/or store information pertaining to an invoice, statement, or bill. Information pertaining to invoices, statements, or bills can include, but are not limited to, the following: a created date; a due date; a net due date or date interval; a unique identifier; an entity assignment; a parent entity assignment; an amount due; a grace period; an associated term related to a membership; an associated term related to a sponsorship; an associated term related to a subscription; a scheduled interval or date for recurrence that can be used such that an additional invoice, statement, or bill can be created; whether or not the invoice, statement, or bill has been paid; payments made toward the invoice, statement, or bill; or the payment method for payments made toward the invoice, statement, or bill. Therefore, in some embodiments, system 100 can include a billing and/or invoicing system. In some embodiments, a billing and/or invoicing system can be provided or delivered to entities by service platform 101 or used by entities associated with service platform 101. Therefore, in some embodiments, multiple billing and/or invoicing systems can be provided to a plurality of entities associated with service platform 101. In some embodiments, invoices, statements, or bills included with system 100 can use methods to uniquely identify invoices, statements, or bills from each other. For example, a unique identification number can be assigned to each invoice. In some embodiments, invoices, statements, or bills included with system 100 can use methods to associate invoices, statements, or bills with entities or parent entities. For example, a common identifier can be assigned to all invoices created by entity B 120 and received by service platform 101 that is different from a common identification number that can be assigned to all invoices created by entity A 110 and received by service platform 101. For example, entity B 120 can create invoices received by service platform 101 for customers of entity B 120, for example member B1 123, one of contacts B 121 or sponsor B1 126. These invoices created by entity B 120 can be distinguished apart from invoices created by entity A 110 and received on service platform 101 by using a common identification number or string as a parent entity assignment associated with entity B 120 that is different from a common identification number or string that can be associated with invoices having a relationship with entity A 110. In some embodiments, entities of entities can utilize a billing and/or invoicing system provided by service platform 101. For example, member A1 113 can utilize a billing and/or invoicing system provided by service platform 101 to member A1 113 so that member A1 113 can administer and/or create invoices and/or payments for customers of member A1 113. In some embodiments, system 101 can use methods to uniquely assign invoices, statements, or bills to entities. For example, an invoice can be uniquely assigned to member A1 113 using a unique identifier associated with member A1 113. In another example, an invoice can be uniquely assigned to sponsor A1 116 using a unique identifier associated with sponsor A1 116.

In some embodiments, a billing and/or invoicing system can be utilized by service platform 101. For example, service platform 101 can create an invoice, statement, or bill such that if one of contacts B 121, member B1 123, sponsor B2 127, or another entity not associated with entity B 120 pays the invoice, statement, or bill, the payee will be granted a sponsorship associated with entity B 120 or a sponsorship associated with service platform 101, for example sponsorship Y 151. In another example, service platform 101 can create an invoice, statement, or bill such that if entity A 110 or entity B 120 pays the invoice, statement, or bill, the payee will be granted a subscription with service platform 101, for example, subscription 160. This also shows that invoices, statements, or bills can be created for memberships, sponsorships, or subscriptions. Therefore, invoices, statements, or bills created by entities on service platform 101, received by service platform 101 for entities, or created by service platform 101 can be of different type or category.

It should be noted that, in some embodiments, service platform 101 can also be designated as an entity; therefore, in a comparable manner to an entity on service platform 101, for example entity A 110, service platform 101 can have one or more associated contacts, users, members, memberships, sponsors, sponsorships, subscriptions, invoices, statements, bills, or payment processors or can participate in any method or system or fashion with service platform 101 just as an entity as described herein can participate.

In some embodiments, system 100 can include subscriptions, for example subscription 160. It should be noted that, in some embodiments, subscription 160 can include a plurality of subscriptions. In some embodiments, subscription 160 can be associated with one or more services or products or content; for example services or products or content associated with service feature E 140 or service feature F 141, feature set C 130 or feature set D 131, data service 103, or application program 104; can be associated with service contracts for said one or more services or products or content; can be for a sponsorship, for example sponsorship X 150 or sponsorship Y 151; or can be for a membership, for example membership A 112 or membership B 122. It should be noted that, in some embodiments, a service can also mean or include one or more service or product or content reservations, one or more service or product or content fulfillments, or one or more service or product or content deliveries; that, in some embodiments, a service can also mean or include one or more service contracts or one or more reservations or one or more fulfillments or deliveries thereof; that, in some embodiments, a service can also mean or include one or more service features, for example service feature E 140 or service feature F 141, or a delivery or inclusion thereof; that, in some embodiments, a service can also mean or include one or more feature sets, for example feature set C 130 or feature set D 131, or a delivery or inclusion thereof; that, in some embodiments, a service can also mean or include one or more data services, for example data service 103, or a reservation or delivery thereof; that, in some embodiments, a service can also mean or include one or more application programs, for example application program 104, or a reservation or delivery thereof; that, in some embodiments, the terms "subscription(s)", "service(s)", "service subscription(s)", "products(s)", "good(s)", "content", "deliverable content", "service contract(s)", "service feature(s)", "feature set(s)", "data service(s)", and "application program(s)" can be used interchangeably; that, in some embodiments, the aforementioned terms and/or meanings can either imply that the terms and/or meanings can be used collectively or can be used separately and independently; that, in some embodiments, a subscription, for example subscription 160, can include, represent, or be associated with any of these terms and/or meanings; and/or that, in some embodiments, a service can include any of the reservations, deliveries, products, services, methods, systems, processes, determinations, or utilities as described herein, or otherwise.

In some embodiments, subscription 160 can be used to associate one or more relationships between one or more entities and one or more services. For example, subscription 160 can relate an entity, for example entity A 110, with services, for example services associated with service feature E 140 or service feature F 141, feature set C 130 or feature set D 131, data service 103, application program 104, or a service contract to delivery any of such services. In some embodiments, subscription 160 can be used to manage relationships between entities and services. For example, suppose that an entity, for example entity A 110, has an interest in one or more services, for example services associated with feature E 140 or service feature F 141, feature set C 130 or feature set D 131, data service 103, or application program 104. Entity A 110 can send an interest request to service platform 101, and said interest in said one or more services can be recorded as an interest in a subscription, for example subscription 160, for said one or more services. In some embodiments, an association, assignment, allowance, or grant of subscription 160 to entities can be contingent upon a determination made by service platform 101. For example, service platform 101 can use payments made toward an invoice, statement, or bill associated with subscription 160 to associate subscription 160 with, assign subscription 160 to, allow subscription 160 for, or grant subscription 160 to entity A 110. In another example, service platform 101 can use token requirements credited toward an invoice, statement, or bill associated with subscription 160 or associated with entity A 110 to associate subscription 160 with, assign subscription 160 to, allow subscription 160 for, or grant subscription 160 to entity A 110. In another example, service platform 101 can apply credits from payments received or accepted from sponsors towards token requirements associated with subscription 160 to associate subscription 160 with, assign subscription 160 to, allow subscription 160 for, or grant subscription 160 to entity A 110. In some embodiments, an association with, assignment of, allowance of, or granting of subscription 160 to an entity can be considered an association, assignment, allowance, or grant of a service contract to said entity.

In some embodiments, one or more services; for example services associated with service feature E 140 or service feature F 141, feature set C 130 or feature set D 131, data service 103, or application program 104; one or more subscriptions, for example subscription 160; or one or more service contracts related to subscriptions, for example subscription 160; can be allowed for delivery to entities, can be assigned to be delivered to entities, can be reserved for delivery to entities, or can be delivered or provided to entities. In some embodiments, delivery or provision of said one or more services, subscriptions, or service contracts to entities can be provided by service platform 101, can be provided by entities associated with service platform 101, or can be provided by entities associated with other entities associated with service platform 101. In some embodiments, delivery or provision of said one or more services, subscriptions, or service contracts to entities can be contingent upon a determination made by service platform 101. In some embodiments, delivery or provision of said one or more services, subscriptions, or service contracts to entities can be contingent upon payments made toward an invoice, statement, or bill associated with said one or more services, subscriptions, or service contracts.

For example, service platform 101 can use payments made toward an invoice, statement, or bill associated with said one or more services, subscriptions, or service contracts to deliver or provide said one or more services, subscriptions, or service contracts to entity A 110. In another example, service platform 101 can use token requirements credited toward an invoice, statement, or bill associated with said one or more services, subscriptions, or service contracts or associated with entity A 110 to deliver or provide said one or more services, subscriptions, or service contracts to entity A 110. In another example, service platform 101 can apply credits from payments received or accepted from sponsors towards token requirements associated with said one or more services, subscriptions, or service contracts to deliver or provide said one or more services, subscriptions, or service contracts to entity A 110. In some embodiments, delivery or accessibility of said one or more services, subscriptions, or service contracts to/for entities can be reserved, withheld, or restricted by service platform 101 until requirements associated with said one or more services, subscriptions, or service contracts are satisfied. In some embodiments, said requirements can include token requirements. In some embodiments, said requirements can include payment of invoices, statements, or bills. In some embodiments, said requirements can include a combination of token requirements and payment of invoices, statements, or bills. In some embodiments, providing or delivering said one or more services, subscriptions, or service contracts by service platform 101 or by a second entity to a first entity can be considered delivery of, provisioning of, or fulfillment of an associated, assigned, allowed, or granted service contract to said first entity.

In some embodiments, service platform 101 can prompt entities to create additional invoices, statements, or bills using scheduled intervals or dates for recurrence. For example, entity A 110 can be prompted on a scheduled date to create a second invoice by service platform 101 for member A1 113 so that once the invoice is paid by member A1 113, member A1 113 will effectively renew its membership with entity A 110, as designated or recorded by service platform 101. In some embodiments, service platform 101 can create additional invoices, statements, or bills for entities or for service platform 101 using scheduled intervals or dates for recurrence. For example, a second invoice for sponsor B1 126 can be created on a scheduled date by service platform 101 for entity B 120 and/or without any intervention required by entity B 120 at the time of the creation, and/or once the invoice is paid by or on behalf of sponsor B1 126, sponsor B1 126 will effectively renew its sponsorship with entity B 120, as designated or recorded by service platform 101. In another example, a second invoice for entity A 110 can be created on a scheduled date for service platform 101 by service platform 101 so that once the invoice is paid by entity A 110, entity A 110 will effectively renew its subscription with service platform 101, as designated or recorded by service platform 101. In another example, a second invoice for sponsor Z 155 can be created on a scheduled date for service platform 101 by service platform 101 so that once the invoice is paid by sponsor Z 155, sponsor Z 155 will effectively renew its sponsorship with service platform 101, for example sponsorship Y 151, as designated or recorded by service platform 101.

In some embodiments, system 100 can include methods for restricting entities of one type or category from becoming associated with or assigned to entities of another type or category. For example, suppose entity A 110 desires that an entity must first have a membership associated with entity A 110, for example membership 112, or must first become a member of entity A 110, for example member A1 113, before said entity can become a sponsor of entity A 110, for example sponsor A1 116, or have a sponsorship associated with entity A 110, for example sponsorship X 150. Service platform 101 can then restrict the availability or presentation of sponsorships to only members of, or to only those having memberships associated with, entity A 110. Because this example shows that a member can also be a sponsor or associated as a sponsor, it should be noted that an entity of one type or category can be the same entity of another type or category, or an entity of one type or category can be associated as an entity of another type or category. Furthermore, it should be noted that in each of multiple embodiments, any of the following can be included with system 100: contacts can be associated as members, members can be associated as contacts, contacts can be associated with memberships, contacts can be associated as sponsors, sponsors can be associated as contacts, contacts can be associated with sponsorships, members can be associated with memberships, members can be associated with sponsorships, members can be associated as sponsors, sponsors can be associated as members, sponsors can be associated with sponsorships, and sponsors can be associated with memberships. Additionally, it should be noted that in some embodiments, an entity, for example entity A 110, can be a member, a contact, or a sponsor of another entity, for example, entity B 120. In some embodiments, entity A 110 can have a membership associated with or a sponsorship associated with entity B 120. Therefore, in some embodiments, a parent entity, for example entity A 110, having child entities, for example member A1 113, can be a child entity of one or more entities, for example entity B 120. It should also be noted that in some embodiments, an entity can be a member of two or more different parent entities. For example, an entity can be member A1 113, which can be a child of entity A 110, and can be member B1 123, which can be a child of entity B 120. In another example, an entity can be sponsor A1 116, which can be a child of entity A 110, and can be sponsor B1 126, which can be a child of entity B 120. In some embodiments, an entity can have a membership with two or more different entities. In some embodiments, an entity can be a sponsor of two or more different entities. In some embodiments, an entity can have a sponsorship with two or more different entities. In some embodiments, an entity can have a subscription with two or more different entities.

Still referring to FIG. 1, consider one of contacts A 111, which can be associated with entity A 110. Suppose entity A 110 creates an invoice for said one of contacts A 111, such that once the invoice is marked as paid, said one of contacts A 111 is granted a membership associated with entity A 110, for example, membership A 112, and is then assigned as a member, for example, member A1 113. Said payment can utilize payment processor 165. In some embodiments, system 100 can include one or more payment processors, for example, payment processor 165. Payment processor 165 can be used to process or collect payments for memberships, sponsorships, subscriptions, or any other invoice, statement, or bill created by one or more entities on service platform 101, received by service platform 101, or created by service platform 101, either on behalf of service platform 101 or on behalf of the one or more entities. In some embodiments, service platform 101 can use or communicate or interface with payment processor 165, wherein payment processor 165 is provided by a third party or a third party having an application programming interface (API). In some embodiments, system 100 can include payment processor 165 with service platform 101 as an internal payment processor provided by service platform 101.

In some embodiments, service platform 101 can include or charge one or more fees to entities associated with the use of payment processor 165 via service platform 101. For example, entity A 110 can request for an invoice to be created by service platform 101 and assigned to member A1 113. Service platform 101 can receive the request. In one instance, service platform 101 can create and store the requested invoice on service platform 101. Member A1 113 can request to make a payment toward the invoice, and service platform 101 can receive the payment request. The payment request can include payment information provided by member A1 113, for example member A1 113 can provide credit/debit card, banking, or other payment information, or the payment request can include payment information associated with member A1 113, for example service platform 101 can use payment information stored and associated with member A1 113 such as a payment token, a key, a unique identifier, a customer number or identifier, a stored and/or a preferred credit/debit card, bank account/ACH data, or any other information, any of these which can be encrypted or unencrypted, that can represent payment information associated with member A1 113 or a local or third-party payment account associated with member A1 113 with respect to service platform 101. In response to receiving the payment request, service platform 101 can send a request to payment processor 165. Said payment request to payment processor 165 can include information associated with entity A 110, payment information provided by or associated with member A1 113, and/or information associated with service platform 101. Service platform 101 can also include one or more additional fees to be included with the invoice, for example a transaction fee. The transaction fee can be a fee charged to entity A 110, or the transaction fee can be a fee charged to member A1 113.

In a second instance, rather than create and store the requested invoice on service platform 101, service platform 101 can send a request to payment processor 165 to create an invoice on or with payment processor 165 on behalf of entity A 110. Therefore, in some embodiments, service platform 101 can send a request to payment processor 165 to create one or more invoices. In some embodiments, the request can be sent on behalf of one or more entities for an invoice associated with one or more customers of the one or more entities. In some embodiments, the request can be sent on behalf of service platform 101 for an invoice associated with one or more customers of service platform 101.

Continuing with the second instance example, service platform 101 can include information with the request, for example amount due, due date, customer number or identifier, such as a customer number associated with member A1 113, or any other information pertinent to the invoice. In response to the invoice creation request by service platform 101, payment processor 165 can send response information to service platform 101, and service platform 101 can receive the response. Said information in the response can include information associated with a successfully created invoice, for example a unique identifier, a date, an amount due, a customer number or identifier, a payment status, or any other information related to the invoice. Service platform 101 can record said information in the response. Service platform 101 can associate said information in the response with either entity A 110 or member A1 113, or with both entity A 110 and member A 113. Service platform 101, either in the original request to create the invoice, or in a future request to update the invoice can include one or more additional fees to be included with the invoice, for example a transaction fee. The transaction fee can be a fee charged to entity A 110, or the transaction fee can be a fee charged to member A1 113. Additionally, rather than include the one or more additional fees in the original request or in a future update request, service platform 101 can specify or configure a setting with payment processor 165 to include one or more additional fees upon the creation of an invoice by payment processor 165 as requested by service platform 101 on behalf of entity A 110.

In some embodiments, service platform 101 can create one or more customers on or with payment processor 165. As such, said one or more customers will have an account with payment processor 165. In some embodiments, said one or more customers can be entities who are customers of service platform 101, for example entity A 110 or sponsor Z 155 can be a customer of service platform 101. In some embodiments, said one or more customers can be entities who are customers of entities associated with service platform 101, for example member A1 113, one of contacts A 111, or sponsor A1 116 can be a customer of entity A 110. In some embodiments, said creation of one or more customers on or with payment processor 165 can be via one or more authorized requests sent to an API managed by payment processor 165 by service platform 101 on behalf of one or more entities. In response to sending said one or more authorized requests, payment processor 165 can send one or more responses, and service platform 101 can receive the one or more responses. Service platform 101 can receive information included with the one or more responses related to the creation of said one or more customers, for example a customer number or identifier or a group number or identifier. Service platform 101 can store said information and associate the information with the appropriate entity on service platform 101.

In some embodiments, service platform 101 can create one or more subscriptions on payment processor 165. In some embodiments, said one or more subscriptions can be for a subscription associated with a customer of service platform 101. In some embodiments, a customer of service platform 101 can be any entity having an association with service platform 101 or an association with an entity on service platform 101, for example a customer can be entity A 110, sponsor Z 155, member A1 113, one of contacts A 111, sponsor A1 116, and so forth. In some embodiments, said one or more subscriptions can be for a subscription associated with a customer of one or more entities. Service platform 101 can send a request to payment processor 165 on behalf of the one or more entities for the creation of said one or more subscriptions. For example, member A1 113 can have a subscription for membership with entity A 110. Service platform 101 can send a request to payment processor 165 for a subscription or a subscription plan to be created for member A1 113 on behalf of entity A 110. Service platform 101 can send information with the request, for example, a customer number or identifier, a group number or identifier, a term for the subscription, a trial period duration, an interval or billing interval, an amount, or any other information that can be relevant to a subscription. For example, by sending a customer identifier associated with member A1 113 with the request to create a subscription, payment processor 165 can create a subscription that is associated with the correct customer. In some embodiments, when sending a request to payment processor 165 to create a customer, service platform 101 can include subscription information so that payment processor can immediately associate said customer with a subscription plan upon creation. In response to a subscription creation request, payment processor 165 can provide a response, and service platform 101 can receive the response. Service platform 101 can also receive and/or process information associated with the response. Said information in the response can include a unique identifier, or any other information relevant to the subscription.

In some embodiments, service platform 101 can send a request to payment processor 165 to obtain the status of one or more subscriptions, invoices, or payments made toward subscriptions or invoices. Service platform 101 can receive information in a response to said request, and can process, store, and/or report said information to entities on service platform 101. Additionally, in some embodiments, service platform 101 can use said information to determine the state of subscriptions, sponsorships, memberships as observed, stored, or used on service platform 101. Service platform 101 can use this information in the provision, or lack thereof, of services to entities associated with said subscriptions, sponsorships, or memberships. For example, suppose service platform 101 receives information that sponsor A1 116 has an outstanding balance on a subscription or invoice that was created on payment processor 165 and associated with sponsor A1 116. In response to receiving this information, service platform 101 can make a determination to change or terminate the status of any sponsorship associated with sponsor A1 116. Additionally, service platform 101 can make a determination to change or cease the provision of any services associated with sponsor A1 116 or sponsor A1 116's sponsorship.

In some embodiments, payment processor 165 can include a plurality of payment processors. In some embodiments, payment processor 165 can represent or include one or more third-party resource servers or systems. In some embodiments, payment processor 165 can represent or include one or more third-party authorization servers or systems. For example, first one of payment processor 165 can be an authorization server for payment processor 165, while second one of payment processor 165 can be a resource server for payment processor 165. In some embodiments, said one or more resource servers or systems and said one or more authorization servers or systems can be the same servers or systems, or can be provided by the same third party, for example payment processor 165. In some embodiments, resource servers or authorization servers can include an API provided by or associated with payment processor 165, and said API can be utilized by service platform 101.

In some embodiments, service platform 101 can request information associated with service platform 101 for use with one or more payment processors. In some embodiments, service platform 101 can receive information associated with service platform 101 for use with one or more payment processors. In some embodiments, service platform 101 can store information associated with service platform 101 for use with one or more payment processors. In some embodiments, service platform 101 can send information associated with service platform 101 for use with one or more payment processors.

In some embodiments, service platform 101 can request information associated with entities for use with one or more payment processors. In some embodiments, service platform 101 can receive information associated with entities for use with one or more payment processors. In some embodiments, service platform 101 can store information associated with entities for use with one or more payment processors. In some embodiments, service platform 101 can send information associated with entities for use with one or more payment processors.

For example, using payment processor 165 may require supplying identification, authentication, verification or authorization information required by payment processor 165 to be sent with a request so that payment processor 165 can identify, authenticate, verify, or authorize said request with an account associated with payment processor 165, for a resource associated with an account that is associated with payment processor 165, or for a method allowed by payment processor 165 for, or on behalf of, an account, or a future account, associated with payment processor 165. Any of said identification, authentication, verification, or authorization information herein shall be referred to as "conversation information". In some embodiments, service platform 101 can request, receive, store, or send said conversation information to or from payment processor 165. In some embodiments, the requesting, receiving, storing, or sending of said conversation information can be performed on behalf of entities associated with or registered having an account on service platform 101, on behalf of entities of said aforementioned entities, wherein said entities of said aforementioned entities are associated with or have an account on service platform 101, or on behalf of service platform 101. In some embodiments, said conversation information can be associated with entities associated with or registered having an account on service platform 101, with entities of said aforementioned entities, wherein said entities of said aforementioned entities are associated with or have an account on service platform 101, or with service platform 101. In some embodiments, service platform 101 can request, receive, store, or send said conversation information to or from entities associated with or registered having an account on service platform 101, or with entities of said aforementioned entities.

For example, suppose entity A 110 desires or requests to use a first one of payment processor 165 and a second one of payment processor 165. Service platform 101 receives the requests from entity A 110 for these two different ones of payment processor 165. Service platform 101 can request, receive, store or use conversation information related to first one of payment processor 165 and entity A 110. Service platform 101 can also request, receive, store, or use conversation information related to second one of payment processor 165 and entity A 110. Similarly, service platform 101 can receive a request from entity B 120 for a third one of payment processor 165, and service platform 101 can request, receive, store, or use conversation information related to a third one of payment processor 165 and entity B 120. The identity of the third one of payment processor 165 can have the same identity as the first one or the second one of payment processor 165, but the information related to entity B 120's association with third one of payment processor 165, for example conversation information associated with entity B 120 and the third one of payment processor 165, can be unique to entity B 120. Also, conversation information for entity A 110 related to the first one of payment processor 165 can be distinct from the conversation information for entity A 110 related to the second one of payment processor 165. Similarly, information related to any one of payment processor 165 and associated with entities of entities, for example member A1 113, sponsor A1 116, or one of contacts A 111, can be requested, received, stored, or used by service platform 101. For example, member B1 123 can request, and service platform 101 can store, information related to a fourth one of payment processor 165 as requested by member B1 123 or initiated by member B1 123.

Conversation information can include information required by payment processor 165 used to identify, authenticate, verify, or authorize requests, either requests made by service platform 101 on behalf of service platform 101, or requests made by service platform 101 on behalf of one or more entities. Conversation information can also include redirection information, for example a redirect uniform resource identifier (URI) or a redirect uniform resource locator (URL), so that responses to requests can be directed to Internet or network endpoints, locations, systems, websites, web pages, software, applications, APIs, resources, or platforms that can receive them. For example, service platform 101 can receive a response, which can include information, as a result of a request by service platform 101. Said response can be on a designated redirect URI by service platform 101, and service platform 101 can include said redirect URI in the request so that the recipient of the request, for example payment processor 165, can use the redirect URI in any response to the request. Additionally, conversation information can include request signatures, digital signatures, encoding methods, signature methods, or digital certificates, for example keyed-hash message authentication codes or RSA encryption algorithms with secure hash algorithms, such as HMAC-SHA1, RSA-SHA1, or others, so that the identity of the sender, the location or address of the sender or associated with the sender, or the conversation information provided by the sender can be verified, authenticated, or validated by the recipient as being created and/or sent and/or originating from the sender. It should be noted that any digital signature can use any combination of, or concatenation of, any conversation information with any other conversation information, or with any other information, in the digital signing method or key used to create hash values, message digests, or digest values from data that is encoded. Conversation information can include said hash values, message digests, or digest values. For example, service platform 101 and/or payment processor 165 can exchange or use a message authentication code (MAC) as a key with an access token to sign certain components of Hypertext Transfer Protocol (HTTP) requests. By providing or by inspecting the digital signature, a determination can be made as to the validity and/or identity of the sender and/or the recipient. In some embodiments, service platform 101 can include methods to digitally sign any information or conversation information sent in one or more requests to payment processor 165. In some embodiments, service platform 101 can digitally sign any information or conversation information sent in one or more requests to payment processor 165. In some embodiments, service platform 101 can inspect or process digital signatures to make a determination if information or responses received from payment processor 165 can be verified as either being sent from payment processor 165 or from a fraudulent impersonator of payment processor 165. Service platform 101 can include methods to reject or ignore responses or information sent from an unverified or fraudulent impersonator of payment processor 165. Additionally, conversation information can include encryption methods so that the conversation information can be transferred securely over a network. Additionally, conversation information, or one or more requests or responses having conversation information, can be sent or received using secure communication channels or cryptographic protocols, for example Secure Sockets Layer (SSL) or Transport Layer Security (TLS). Additionally, the sending or receiving can be via HTTP requests or HTTP responses using HTTP commands or verbs, for example GET, PUT, POST, DELETE, or any other HTTP command. Additionally, conversation information can be included in HTTP request headers, for example headers that specify Location, Cache-Control, Pragma, Status, WWW-Authenticate, Content-Type, Authorization, or any other field; query strings and/or query string parameters; or in an HTTP request body. Also, conversation information included in Authorization HTTP headers can include information generated via authentication schemes, such as basic authentication, bearer authentication, MAC authentication, or other authentication schemes. Also, conversation information, or certain elements of conversation information, can be included in plain text, JavaScript Object Notation (JSON), Extensible Markup Language (XML), Security Association Markup Language (SAML) or any other markup language, data structure, content type, or other computer-readable format. Conversation information also can include information provided by providers, such as information to establish or verify the identity or identities of entities and/or service platform 101 and/or payment processor 165, which can include values for client assertion type parameters and/or values for client assertion parameters associated with the identity or identities. Conversation information also can include token secrets with one or more access tokens, unauthorized request tokens, authorized request tokens, authorization codes, or refresh tokens received by service platform 101 from payment processor 165 or any token provider. Furthermore, conversation information can be encoded, for example URL encoded as the application/x-www-form-urlencoded media type, encoded in the UTF-8 character set, encoded as Base64 text, or any other encoding scheme. Additionally, conversation information or communications involving conversation information can be sent, received, and/or interpreted by service platform 101 using HTTP response status codes, for example "200 OK", "401 Unauthorized", or any other HTTP response status code. In some embodiments, service platform 101 can utilize a software library or compiled library code to implement requests, responses, receipts, features, methods, schemes, types, or behaviors associated with any communication exchange between service platform 101, payment processor 165, and/or entities involving said conversation information. Service platform 101 can utilize conversation information using any of the features, methods, schemes, types, behaviors, libraries, information, or any other properties associated with the conversation information as disclosed herein. Said utilization and/or any conversation information can be combined with any request sent by service platform 101 or payment processor 165 or any response received by service platform 101 or payment processor 165.

In some embodiments, system 100 can include methods or systems for one or more entities or for service platform 101 to interact with one or more applications provided by service platform 101 used on third-party systems, servers, or APIs, each an example of payment processor 165. In some embodiments, system 100 can include methods or systems for one or more entities or for service platform 101 to interact directly with third-party systems, servers, or APIs, each an example of payment processor 165. Payment processor 165 can manage resources or methods for entities and can provide said resources or methods for use or access by service platform 101. Said one or more applications provided by service platform 101 or said direct interaction methods as mentioned above herein shall be referred to as "developer app". In some embodiments, said one or more entities can have entities as members. In some embodiments, said one or more entities can be a sponsor of one or more entities. In some embodiments, said one or more entities can be a member of one or more entities. In some embodiments, said one or more entities can be a contact of one or more entities. In some embodiments, service platform 101 can interact with payment processor 165 via developer app on behalf of said one or more entities, or on behalf of service platform 101.

For example, service platform 101 can register to use developer app with resources or methods made available by payment processor 165 via an API. Registration to use developer app can include service platform 101 sending a request to payment processor 165. Registration also can include service platform 101 sending information required by payment processor 165 for registration, for example an application name, a uniform resource locator (URL) or website address, a redirect uniform resource identifier (URI) or redirect uniform resource locator (URL), a scope used to designate one or more access levels or resource types to which developer app is requesting or will request access, or a client identifier, any of which can be included with or included as conversation information. In response to sending the request, payment processor 165 can respond with identification credentials, for example a client identifier and/or a client secret or a consumer key and/or a consumer secret, associated with developer app to be used by service platform 101 as credentials for verifying and/or authenticating future requests as requests associated with registered developer app and/or as requests originating from service platform 101. Service platform 101 can receive and/or store said identification credentials associated with registered developer app. Said identification credentials can be included with or included as conversation information in requests and/or responses made by or received by service platform 101.

In some embodiments, service platform 101 can approve or authorize service platform 101 to use one or more registered developer apps provided by service platform 101 for interaction with third parties. In some embodiments, service platform 101 can direct one or more entities to third parties, for example payment processor 165, so that the one or more entities can approve or authorize one or more registered developer apps being registered with said third parties, for example payment processor 165, and so that service platform 101 can use or access resources or methods associated with or owned by the one or more entities as made available by said third parties, for example payment processor 165, via the approved or authorized one or more registered developer apps. In some embodiments, service platform 101 can receive and/or utilize and/or store information associated with said approval or authorization of the one or more entities. Said information associated with said approval or authorization can be included with or included as conversation information.

For example, service platform 101 can receive a request from entity A 110 for service platform 101 to create, use, or modify a resource or to use a method on payment processor 165 on behalf of entity A 110. For example, entity A 110 can request service platform 101 to create a subscription or a customer on behalf of entity A 110 on payment processor 165. Service platform 101 can query stored records associated with entity A 110 to see if service platform 101 has previously stored any valid conversation information associated with entity A 110 and payment processor 165 that can be used by service platform 101 in an authorized request to payment processor 165. If no valid conversation information or authorization exists for entity A 110, service platform 101 can direct entity A 110 to payment processor 165 in order for entity A 110 to authorize a developer app provided by service platform 101, which, once authorized by entity A 110, can be utilized by service platform 101 to create, use, or modify resources or to use methods on payment processor 165 on behalf of entity A 110. Such direction can include providing or presenting a link having a URI/URL endpoint of payment processor 165 (acting either an authorization server or a resource server) to entity A 110 for authorization. Service platform 101 can include information with the link; for example a redirect URI/URL endpoint associated with or controlled by service platform 101 to where entity A 110 or a user agent, browser, or application program used by entity A 110 can be redirected by payment processor 165 in response to a successful authorization, which will allow service platform 101 to receive and/or process response information associated with said authorization; information credentials associated with service platform 101, such as a client identifier and/or a client secret or a consumer key and/or a consumer secret that can provide identification and/or verification of service platform 101 to payment processor 165 with respect to the developer app being sought for authorization by entity A 110; a response type and/or a grant type, such as a value that can indicate to payment processor 165 what type of authorization grant is being pursued; a scope, which can include one or more values to help payment processor 165 present to entity A 110 what resources or resource types can be accessed by developer app upon authorization; or a state or nonce value, which can include a value created or used by service platform 101 and returned by payment processor 165 to identify and associate any responses received by service platform 101 with said authorization by entity A 110. It should be noted that any of said information included with the link can be included as conversation information.

In some embodiments, as a result of entity A 110's grant or authorization of the developer app associated with service platform 101, service platform 101 can receive a request from entity A 110, from a user agent, browser, or application program used by entity A 110, or from payment processor 165. For example, in some embodiments, service platform 101 can receive a request from a browser being used by entity A 110. Information can be included in the request. For example, the request from a browser being used by entity A 110 can be directed to the redirect URI/URL endpoint associated with or controlled by service platform 101 as previously delivered or configured by service platform 101, and response information can be appended to the request located at the redirect URI/URL endpoint as one or more query string parameters or a query string values. Said one or more query string parameters or values can include a code generated by payment processor 165, and said code can be used by payment processor 165 as a notification or record of entity A 110's authorization of the developer app. Other response information can include an expiry date or time interval, a grant type, or the state or nonce previously sent by service platform 101. Any of said response information can be included as conversation information. Service platform 101 can record, store, and/or use any of said response information for further processing.

In some embodiments, in response to receiving authorization information or approval from one or more entities of a developer app, service platform 101 can send a request to a third party, for example payment processor 165, to obtain an access token assigned from said third party to be used and/or associated with said one or more entities. Service platform 101 can use said access token with respect to the third party or an API provided by the third party such that said access token grants access to resources and/or methods provided by the third party. For example, in response to receiving response information indicating entity A 110's authorization of the developer app, service platform 101 can send a request to payment processor 165 or to any endpoint operated by payment processor 165 to request an access token. Service platform 101 can include information in the request, for example the code previously generated by payment processor 165 associated with the authorization by entity A 110; information credentials associated with service platform 101, such as a client identifier and/or a client secret or a consumer key and/or a consumer secret that can provide identification and/or verification of service platform 101 to payment processor 165; a redirect URI/URL endpoint associated with or controlled by service platform 101 to where payment processor 165 can be directed to deliver a response to a successful access token assignment, which will allow service platform 101 to receive and/or process said response and/or information associated with said access token assignment; a response type and/or a grant type, such as a value that can indicate to payment processor 165 what type of authorization grant is being pursued; a scope, which can include one or more values to help payment processor 165 verify or approve what resources or resource types can be accessed by the access token upon assignment; or a state or nonce value, which can include a value created or used by service platform 101 and returned by payment processor 165 to identify and associate any responses received by service platform 101 with said access token assignment by payment processor 165. It should be noted that any of said information included with the request for an access token assignment can be included as conversation information.

In some embodiments, as a result of an access token assignment by third parties, for example payment processor 165, service platform 101 can receive information related to access tokens. In some embodiments, service platform 101 can associate access tokens assigned with third parties, for example payment processor 165, with one or more entities or with service platform 101. For example, in response to the request for an access token assignment sent by service platform 101 associated with entity A 110, payment processor 165 can send a response to service platform 101, or to the redirect URI/URL endpoint as provided by service platform 101 in the request for the access token assignment. Service platform 101 can receive said response. Said response can include response information that can be received by service platform 101. For example, service platform 101 can receive an HTTP response code, such as a "200 OK", which service platform 101 can use to interpret that the response contains a successful access token assignment. Other response information can include an access token issued by payment processor 165, for example an access token assigned to entity A 110 to be used in requests made by service platform 101 to payment processor 165 to access resources or methods made available by payment processor 165; a token type, which can describe the token type, for example a "Bearer", "MAC", or any other token type as specified by payment processor 165 or as requested by service platform 101; an expiry parameter, value, or date, for example the duration the access token remains valid before expiring or a date/time upon which after the access token will become invalid; a refresh token that can be used to obtain a new access token if/when the access token becomes invalid or expires; a scope, which can include one or more values to help payment processor 165 verify or approve what resources or resource types can be accessed by the access token upon assignment; a state or nonce value, which can include a value created or used by service platform 101 and returned by payment processor 165 to identify and associate any responses received by service platform 101 with said access token assignment by payment processor 165; or any other parameter or value as appropriate having some connection with the relationship between entities, service platform 101, and/or third parties, for example payment processor 165. It should be noted that any of said response information included with a response to a request for an access token assignment can be included with or included as conversation information. In some embodiments, service platform 101 can record, store, and/or use said response information, and service platform 101 can associate said response information with entities or with service platform 101.

In some embodiments, service platform 101 can use said response information, for example an access token, to access resources or methods allowed by third parties, for example payment processor 165, via one or more developer apps. In some embodiments, service platform 101 can send a request to payment processor 165 to access resources or methods made available by payment processor 165 for use in connection with an account owned, controlled, or operated by entity A 110 with respect to payment processor 165. In some embodiments, service platform 101 can send information with the request to access said resources or said methods. In some embodiments, said request to be directed to one or more endpoints where said resources or said methods are made available for use by payment processor 165. For example, because service platform 101 can possess an access token associated with entity A 110, service platform 101 can send one or more requests to payment processor 165 to access resources or methods authorized by entity A 110. For example, because entity A 110 can request service platform 101 to create a subscription or a customer on behalf of entity A 110 on payment processor 165, service platform 101 can send such a request to payment processor 165 on the authority of entity A 110. Said request for the creation of a subscription or customer can include authorization information, such as an access token, and/or other information, such as information as related to entities who are customers of entity A 110 or information as related to subscriptions associated with entity A 110.

Service platform 101 can use, process, or store response information sent to service platform 101 and received by service platform 101 as a result of sending requests for resources or methods. For example, service platform 101 can use said response information to determine if a resource or method request was successful. In another example, service platform 101 can use said response information in reports or data presentation systems. In another example, service platform can provide said response information or said reports or said data presentation systems to entities.

In some embodiments, service platform 101 can send a request to payment processor to obtain one or more new or renewed access tokens. Said request can include information, for example a refresh token, a grant type, and/or a scope. Service platform 101 can receive a response to said request, and said response can include information such as a new access token that service platform 101 can record, store, and/or use, and said information in said response can be included with or included as conversation information.

It should be noted that, in some embodiments, interactions with any of Internet or network endpoints, locations, systems, websites, web pages, software, applications, APIs, resources, or platforms as described herein or otherwise need not be restricted to payment processors, for example payment processor 165, nor need to be restricted to processing payments associated with entities. As such, said interactions as described herein can also apply to any other Internet or network endpoints, locations, systems, websites, web pages, software, applications, APIs, resources, or platforms accessed by service platform 101 or on behalf of entities in a similar manner and used for purposes other than payment processing, subscriptions, invoices, or billing systems. Furthermore, it should be noted that in some embodiments, payment processor 165 can represent other third-parties not involved in processing payments. For example, payment processor 165 can simply be or represent a third party having one or more interactive websites, one or more web pages, one or more Internet or network end-points, one or more software applications, one or more systems, one or more resources, one or more platforms, or one or more APIs that can be used by service platform 101 or entities in a manner or by methods as described herein or otherwise. For example, system 100 can include similar methods so that member A1 113 can approve a developer app provided by service platform 101 that interfaces with a third-party API, and that, once approved, member A1 113 can send content or information, for example a status update and/or a message and/or a digital image representing a photo or logo, via service platform 101 to the third-party API. Therefore, in some embodiments, payment processor 165 can include any third party having any one of Internet or network endpoints, locations, systems, websites, web pages, software, applications, APIs, resources, or platforms that can be used or interfaced by service platform 101 on behalf of service platform 101 or by service platform 101 on behalf of entities as described herein or otherwise.

In some embodiments, system 100 can include scheduled methods for one or more entities or for service platform 101 to interact with one or more developer apps associated with service platform 101. For example, sponsor B1 126 can be a sponsor of entity B 120. Service platform 101 can receive content from sponsor B1 126 associated with sponsor B1 126's sponsorship. This information can include advertising content; for example one or more graphics; logos; images; text promotions/messages; videos; audio; bar codes; 2-D barcodes, for example a QR code; coupons; geo-fenced content, website URLs; or any content that can be used for advertising purposes. In some embodiments, said content can be generated by service platform 101 on behalf of an entity, for example sponsor B1 126. For example, service platform 101 can provide a website profile page for an entity, and the URL of the profile page, or a shortened URL of the profile page, can be included with the content. Sponsor B1 126 can approve or authenticate a developer app associated with service platform 101, for example an application provided by service platform 101 that interfaces with the Twitter platform, for example via an API, and service platform 101 can receive and record response information from Twitter's platform using methods as described herein. In response to receiving said content from sponsor B1 126 and information from Twitter's platform pertaining to sponsor B1 126's approval or authentication of said developer app, service platform 101 can post some or all of said content on behalf of sponsor B1 126 to Twitter via methods made available by Twitter, for example, via a URL/URI endpoint that allows for posting content. Furthermore, service platform 101 can post this content on a schedule. In some embodiments, said posting can use conversation information associated with entity B 120, such that said content associated with sponsor B1 126 is posted to an account associated with or controlled by entity B 120 on Twitter (or a third party), wherein the account or entity B 120 has approved and/or authenticated a developer app associated with service platform 101. In some embodiments, said posting can use conversation information associated with sponsor B1 126, such that said content associated with sponsor B1 126 is posted to an account associated with or controlled by sponsor B1 126 on Twitter (or a third party), wherein the account or sponsor B1 126 has approved and/or authenticated a developer app associated with service platform 101. In some embodiments, said posting can use conversation information associated with service platform 101, such that said content associated with sponsor B1 126 is posted to an account associated with or controlled by service platform 101 on Twitter (or a third party), wherein the account or service platform 101 has approved and/or authenticated a developer app associated with service platform 101. In some embodiments, said one or more developer apps can exist on one or more different third-party platforms having an API, for example, the Twitter API or the Facebook API, or the like. Said schedule can be defined by sponsor B1 126 and received by service platform 101, said schedule can be defined by service platform 101, or said schedule can be executed by service platform 101. Likewise, in a similar example, member A1 113 can be the one or more entities, member A1 113 can be a member of entity A 110, service platform 101 can receive any of said content from member A 113, service platform 101 can receive and record response information from a third party, service platform 101 can provide any of said content and said response information to the third party, and said service platform 101's provision of said content to the third party can be performed on a scheduled basis. Likewise, in another similar example, entity A 110 can be the one or more entities, entity A 110 can be associated with service platform 101, service platform 101 can receive any of said content from entity A 110, service platform 101 can receive and record response information from a third party, service platform 101 can provide any of said content and said response information to the third party, and said service platform 101's provision of said content to the third party can be performed on a scheduled basis.

In some embodiments, system 100 can include methods to indicate that invoices, statements, or bills have been paid. For example, a payment can be made electronically using payment processor 165. Service platform 101 can receive information from payment processor 165 indicating a successful or failed payment processing attempt. Service platform 101 can record the payment. In another example, a payment for an invoice, statement, or bill can be made manually, by mail, by in-person delivery, or by another non-digital method, and service platform 101 can provide a method so the invoice, statement, or bill can be designated or marked as being paid, and recorded by service platform 101. In some embodiments, system 100 can include further processing once payments have been received or marked as paid. For example, suppose member A1 113 pays for an invoice for membership renewal and entity A 110 marks the invoice as paid, and this information is received by service platform 101. In response to receiving payment information, service platform 101 can associate a membership with member A1 113, for example, membership A 112. Service platform 101 can store a start date for membership A 112. Service platform 101 can store an end date for membership A 112. Service platform 101 can store a term length for membership A 112. In some embodiments, entities can specify characteristics for memberships stored by service platform 101. For example, a term length can be specified for a membership, for example membership A 112, by entity A 110 and stored by service platform 101. A term length can be specified and stored by service platform 101 using a duration of time, for example a quantity of seconds, minutes, hours, days, weeks, months, years, etc.

In another example, suppose entity B 120 creates an invoice for sponsorship, and an entity pays for said invoice for sponsorship using payment processor 165. Service platform 101 then receives information from payment processor 165 indicating that a payment has taken place that can be applied to said invoice. In response to receiving this information, service platform 101 can provide the entity a sponsorship associated with entity B 120, for example, sponsorship Y 151. In response to receiving this information, service platform 101 can assign the entity as a sponsor associated with entity B 120, for example, sponsor B1 126. In another example, suppose service platform 101 creates an invoice for a subscription with service platform 101, for example, subscription 160, and an entity pays for said invoice for the subscription using payment processor 165. Service platform 101 then receives information from payment processor 165 indicating that a payment has taken place that can be applied to said invoice. In response to receiving this information, service platform 101 can provide the entity a subscription with service platform 101. In response to receiving this information, service platform 101 can assign the entity as an entity associated with service platform 101, for example entity A 110.

In another example, suppose service platform 101 creates an invoice for an entity to renew a subscription, for example subscription 160, with an entity, for example entity A 110, or for an entity to renew a subscription, for example subscription 160, with service platform 101. Additionally suppose that an entity pays for said invoice for the renewal subscription using payment processor 165. Service platform 101 then receives information from payment processor 165 indicating that a payment has taken place that can be applied to said invoice. In response to receiving this information, service platform 101 can provide the paying entity the renewed subscription. Similar methods of renewing memberships and similar methods of renewing sponsorships can also follow this example.

Therefore, in some embodiments, system 100 can include subscription assignment or renewal methods, for example, subscription assignment or renewal methods associated with a subscription, for example subscription 160. In some embodiments, said subscription assignment or renewal methods can include processing of invoices, statements, or bills. In some embodiments, said subscription assignment or renewal methods can include processing of token requirements. In some embodiments, a term can be associated with a subscription, for example subscription 160. In some embodiments, a term can be associated with an invoice, statement, or bill that is associated with a subscription. In some embodiments, said subscription renewal methods can repeat on a schedule. In some embodiments, said schedule can be defined by entities and received by service platform 101. In some embodiments, said schedule can be defined or recorded by service platform 101.

Therefore, in some embodiments, system 100 can include membership assignment or renewal methods, for example membership assignment or renewal methods associated with a membership, for example membership A 112. In some embodiments, said membership assignment or renewal methods can include processing of invoices, statements, or bills. In some embodiments, said membership assignment or renewal methods can include processing of token requirements. In some embodiments, a term can be associated with a membership, for example membership A 112. In some embodiments, a term can be associated with an invoice, statement, or bill that is associated with a membership. In some embodiments, said membership renewal methods can repeat on a schedule. In some embodiments, said schedule can be defined by entities and received by service platform 101. In some embodiments, said schedule can be defined or recorded by service platform 101.

Therefore, in some embodiments, system 100 can include sponsorship assignment or renewal methods, for example sponsorship assignment or renewal methods associated with a sponsorship, for example sponsorship X 150. In some embodiments, said sponsorship assignment or renewal methods can include processing of invoices, statements, or bills. In some embodiments, said sponsorship assignment or renewal methods can include processing of token requirements. In some embodiments, a term can be associated with a sponsorship, for example sponsorship X 150. In some embodiments, a term can be associated with an invoice, statement, or bill that is associated with a sponsorship. In some embodiments, said sponsorship renewal methods can repeat on a schedule. In some embodiments, said schedule can be defined by entities and received by service platform 101. In some embodiments, said schedule can be defined or recorded by service platform 101.

In some embodiments, system 100 can include methods to indicate that invoices, statements, or bills have not been paid or remain outstanding. For example, suppose that member B1 123 is associated with membership B 122 associated with entity B 120, and member B1 123 has been assigned a membership renewal invoice. Additionally suppose that the processing date as determined by service platform 101 has surpassed a grace period date associated with the membership renewal invoice or has surpassed a grace period calculated by service platform 101 using a due date and grace period, which are both associated with the membership renewal invoice. In response to a determination that no payments have been received or that the invoice has not yet been paid, service platform 101 can mark member B1 123 as an inactive member. In response to a determination that the invoice has not yet been paid, for example after the grace period has expired, service platform 101 can drop member B1 123 from membership, for example membership B 122. In some embodiments, said grace period can be defined by entity B 120 and received by service platform 101. In some embodiments, said grace period can be determined and/or defined by service platform 101. In some embodiments, service platform 101 can notify entity B 120 of a membership drop that is to take place as determined by service platform 101, and the drop will be pending approval by entity B 120 and/or pending a receipt by service platform 101 from entity B 120 of an approval of the drop. In some embodiments, membership drop or drop methods by service platform 101 can be performed automatically and/or without interaction required of entity B 120 with respect to the drop or pending drop as a condition for the performance of the drop. Therefore, in some embodiments, service platform 101 can drop one or more members, for example member B1 123. Therefore, in some embodiments, service platform 101 can mark one or more memberships as inactive, for example membership B 122. Therefore, in some embodiments, memberships can be assigned different statuses. In some embodiments, service platform 101 can quantify memberships as only those memberships having a status that designates the membership as active. In some embodiments, service platform 101 can designate entities as having either an active, inactive (or dropped), or pending membership status. In some embodiments, system 100 can include membership drop methods. In some embodiments, said membership drop methods can include processing of invoices, statements, or bills. In some embodiments, said membership drop methods can include processing of token requirements.

Likewise, and in a similar manner as described herein with respect to membership drop methods, in some embodiments, service platform 101 can drop one or more sponsors, for example sponsor A1 116. In some embodiments, service platform 101 can mark one or more sponsorships as inactive, for example sponsorship X 150. In some embodiments, sponsorships can be assigned different statuses. In some embodiments, service platform 101 can quantify sponsorships as only those sponsorships having a status that designates the sponsorship as active. In some embodiments, service platform 101 can designate entities as having either an active, inactive (or dropped), or pending sponsorship status. In some embodiments, system 100 can include sponsorship drop methods. In some embodiments, said sponsorship drop methods can include processing of invoices, statements, or bills. In some embodiments, said sponsorship drop methods can include processing of token requirements.

Likewise, and in a similar manner as described herein with respect to membership drop methods, in some embodiments, service platform 101 can drop one or more subscriptions, for example subscription 160, or one or more subscribers. In some embodiments, service platform 101 can mark one or more subscriptions as inactive. In some embodiments, subscriptions can be assigned different statuses. In some embodiments, service platform 101 can quantify subscriptions as only those subscriptions having a status that designates the subscription as active. In some embodiments, service platform 101 can designate entities as having either an active, inactive (or dropped), or pending subscription status. In some embodiments, system 100 can include subscription drop methods. In some embodiments, said subscription drop methods can include processing of invoices, statements, or bills. In some embodiments, said subscription drop methods can include processing of token requirements.

In some embodiments, sponsorships can be of different type or category. For example, different sponsorship types can be different within sponsorships associated with a single entity, or different sponsorship types can be different between sponsorships associated with multiple entities. For example, suppose both sponsorship X 150 and sponsorship Y 151 are associated with entity A 110. Sponsor A1 116 can be associated with sponsorship X 150, and this sponsorship can be categorized as a "gold" sponsorship; sponsor A2 117 can be associated with sponsorship Y 151, and this sponsorship can be categorized as a "silver" sponsorship. In another example, suppose sponsorship X 150 is associated with entity A 110 and sponsorship Y 151 is associated with entity B 120. Sponsor A1 116 can be associated with sponsorship X 150, and this sponsorship can be categorized as a "gold" sponsorship; sponsor B2 127 can be associated with sponsorship Y 151, and this sponsorship can be categorized as a "premium" sponsorship. In some embodiments, sponsorship types or categories can be defined by service platform 101. In some embodiments, sponsorship types or categories can be requested by entities and received by service platform 101.

In some embodiments, sponsors can be of different type or category. Different sponsor types or categories can be different within sponsors associated with a single entity, or different sponsor types or categories can be different between sponsors associated with multiple entities. For example, sponsor A1 116 can be a "gold" sponsor, and sponsor A2 117 can be a "silver" sponsor. In another example, sponsor A1 116 can be a "platinum" sponsor, and sponsor B2 127 can be a "featured" sponsor. In some embodiments, sponsor types or categories can be defined by service platform 101. In some embodiments, sponsor types or categories can be requested by entities and received by service platform 101.

In some embodiments, memberships can be of different type or category. For example, consider member A1 113 and member A2 114, both having memberships associated with entity A 110. Member A1 113 can be associated with a first one of membership A 112, and this first one of membership A 112 can be categorized as a "gold" membership; member A2 114 can be associated with a second one of membership A 112, and this second one of membership A 112 can be categorized as a "silver" membership. In some embodiments, membership types or categories can be defined by service platform 101. In some embodiments, membership types or categories can be requested by entities and received by service platform 101.

In some embodiments, members can be of different type or category. Different member types or categories can be different within members associated with a single entity. For example, member A1 116 can be a "gold" member, and member A2 117 can be a "silver" member. In some embodiments, member types or categories can be defined by service platform 101. In some embodiments, member types or categories can be requested by entities and received by service platform 101.

In some embodiments, subscriptions can be of different type or category. For example, different subscription types can be different within subscriptions associated with a single entity, or different subscriptions types can be different between subscriptions associated with multiple entities. For example, suppose both a first one of subscription 160 and a second one of subscription 160 are associated with entity A 110. Sponsor A1 116 can be associated with the first one of subscription 160, and this subscription can be categorized as a "basic" subscription; sponsor A2 117 can be associated with the second one of subscription 160, and this subscription can be categorized as a "pro" subscription. In another example, suppose entity A 110 is associated with a subscription, for example first one of subscription 160, and entity B 120 is associated with a subscription, for example second one of subscription 160. First one of subscription 160 associated with entity A 110 can be categorized as a "starter" subscription; second one of subscription 160 associated with entity B 120 can be categorized as a "premier" subscription. In some embodiments, service platform 101 can include different services with subscriptions according to the type or category of subscription or subscription types/categories.

In some embodiments, subscriptions can have different prices. For example, in order for an entity, for example entity A 110, to obtain a subscription, for example subscription 160, entity A1 110 can provide a form of payment for a subscription to service platform 101, for example using a payment processor, such as payment processor 165. The price for entity A 110 to obtain a subscription, for example subscription 160, can depend on customization factors. For example, the price can depend on a price set for all entities of a particular subscription type or category. In another example, the price can depend on preferences by service platform 101. For example, suppose service platform 101 sets the price for subscription 160. In another example, the price can depend on preferences by entities. For example, suppose an entity, for example entity A 110, is willing to pay or donate a desired amount for subscription 160, and service platform 101 receives this desired amount from entity A 110. In some embodiments, subscriptions can have requirements that differ than a price payment requirement. In some embodiments, subscription requirements can include a token requirement.

In some embodiments, sponsorships can have different prices. For example, in order for an entity, for example member A1 113, to become a sponsor, for example sponsor A1 116, or in order for an entity, for example member A1 113, to obtain a sponsorship, for example sponsorship X 150, member A1 113 can provide a form of payment for a sponsorship to either entity A 110 or service platform 101, for example using a payment processor, such as payment processor 165. The price for member A1 113 to become a sponsor, for example sponsor A1 116, or the price for member A1 113 to obtain a sponsorship, for example sponsorship X 150, can depend on customization factors. For example, the price can depend on a price set for all sponsors of a particular sponsorship type or category. In another example, the price can depend on preferences by service platform 101. For example, suppose service platform 101 sets the price for sponsorship X 150. In another example, the price can depend on preferences by entities. For example, suppose entity A 110 desires to set the price for sponsorship X 150, and service platform 101 receives this desired price from entity A 110. Service platform 101 can provide this price to an entity interested in sponsorship, for example member A1 113. In another example, suppose an entity, for example member A1 113, is willing to pay or donate a desired amount for sponsorship X 150, and service platform 101 receives this desired amount from member A1 113. In some embodiments, sponsorships can have requirements that differ than a price payment requirement. In some embodiments, sponsorship requirements can include a token requirement.

In some embodiments, a sponsorship can include one or more subscriptions. For example, sponsorship X 150 can include a subscription, for example subscription 160. In some embodiments, a sponsorship that includes one or more subscriptions can include one or more services to be provided with the one or more subscriptions. For example, service feature E 140, feature set C 130, data service 103, application program 104, etc. can be included with a sponsorship. In some embodiments, a sponsorship that includes one or more subscriptions can include different services or different subscriptions depending on sponsorship type or category. For example, service platform 101 can include service feature E 140 with a "silver" sponsorship, while service platform 101 can include both service feature E 140 and service feature F 141 with a "gold" sponsorship.

In some embodiments, memberships can have different prices. For example, in order for an entity, for example one of contacts A 111, to become a member of an entity, for example entity A 110, or in order an entity, for example one of contacts A 111, to obtain a membership, for example membership A 112, with an entity, for example entity A 110, said one of contacts A 111 can provide a form of payment for a membership to either entity A 110 or service platform 101, for example using a payment processor, such as payment processor 165. The price for said one of contacts A 111 to become a member, for example member A1 113, or the price for said one of contacts A 111 to obtain a membership, for example membership A 112, can depend on customization factors. For example, the price can depend on a price set for all members of a particular membership type or category. In another example, the price can depend on preferences by service platform 101. For example, suppose service platform 101 sets the price for membership A 112. In another example, the price can depend on preferences by entities. For example, suppose entity A 110 desires to set the price for membership A 112, and service platform 101 receives this desired price from entity A 110. Service platform 101 can provide this price to an entity interested in membership, for example one of contacts A 111. In another example, suppose an entity, for example one of contacts A 111 is willing to pay or donate a desired amount for membership A 112, and service platform 101 receives this desired amount from one of contacts A 111. In some embodiments, memberships can have requirements that differ than a price payment requirement. In some embodiments, membership requirements can include a token requirement.

In some embodiments, a membership can include one or more subscriptions. For example, membership A 112 can include a subscription, for example subscription 160. In some embodiments, a membership that includes one or more subscriptions can include one or more services to be provided with the one or more subscriptions. For example, service feature E 140, feature set C 130, data service 103, application program 104, etc. can be included with a membership. In some embodiments, a membership that includes one or more subscriptions can include different services or different subscriptions depending on membership type or category. For example, service platform 101 can include service feature E 140 with a "silver" membership, while service platform 101 can include both service feature E 140 and service feature F 141 with a "gold" membership.

In some embodiments, one or more entities, for example sponsor A1 116, member A2 114, or one of contacts A 111, can request an interest in sponsorship, for example sponsorship X 150 associated with entity A 110 by sending a request to service platform 101. In some embodiments, sponsor Z 155 can request an interest in sponsorship Y 151 associated with service platform 101 by sending a request to service platform 101. Upon fulfillment of a requirement, for example a fee requirement or a token requirement, requests for sponsorship can be fulfilled or completed by service platform 101. In some embodiments, service platform 101 can receive revenue directly or indirectly from one or more entities upon payment of a fee requirement or token requirement or upon satisfaction of a token requirement associated with a sponsorship.

In some embodiments, subscribing for a service with service platform 101 by entity A 110 allows entity A 110 to receive revenue associated with sponsor payments made by sponsors associated with entity A 110, for example sponsor A1 116, sponsor A2 117, or sponsor AM 118. In some embodiments, sponsorship revenue amounts delivered to one or more entities can be calculated by service platform 101 according to a dividend and/or percentage calculation associated with the one or more entities.

In some embodiments, sponsorship revenue can be collected or received by service platform 101 from sponsors. In some embodiments, sponsorship revenue can be collected or received via payment processor 165 or via developer app registered with payment processor 165 on behalf of service platform 101 or on behalf of one or more entities, for example entity A 110. In the instance that the revenue is collected via registered developer app, service platform 101 or said one or more entities, can authorize the use of developer app with payment processor 165 prior to such collection. In some embodiments, sponsorship revenue can be delivered by service platform 101 to entity A 110. In some embodiments, sponsorship revenue can be delivered by service platform 101 to entity A 110 via payment processor 165 or via developer app registered with payment processor 165. In some embodiments, delivery and/or calculations of sponsorship revenue can be performed on a scheduled basis and/or at regular intervals.

For example, suppose entity A 110 authorizes a developer app provided by service platform 101 that is registered with payment processor 165. Additionally, suppose service platform 101 authorizes a developer app provided by service platform 101 registered with payment processor 165. Furthermore, suppose service platform 101 collects sponsorship revenue of $150 USD from sponsors associated with entity A 110, and said collection is via the developer app authorized by service platform 101. Also, suppose that service platform 101 determines that entity A 110 is entitled to a delivery of sponsorship revenue of, or a dividend of collected sponsorship revenue that amounts to, $100 USD. Because entity A 110 has authorized a developer app provided by service platform 101 registered with payment processor 165, service platform 101 can create an invoice and/or issue a payment and/or dividend to entity A 110 for the entitlement via the authorized developer app by entity A 110.

Figure 9:
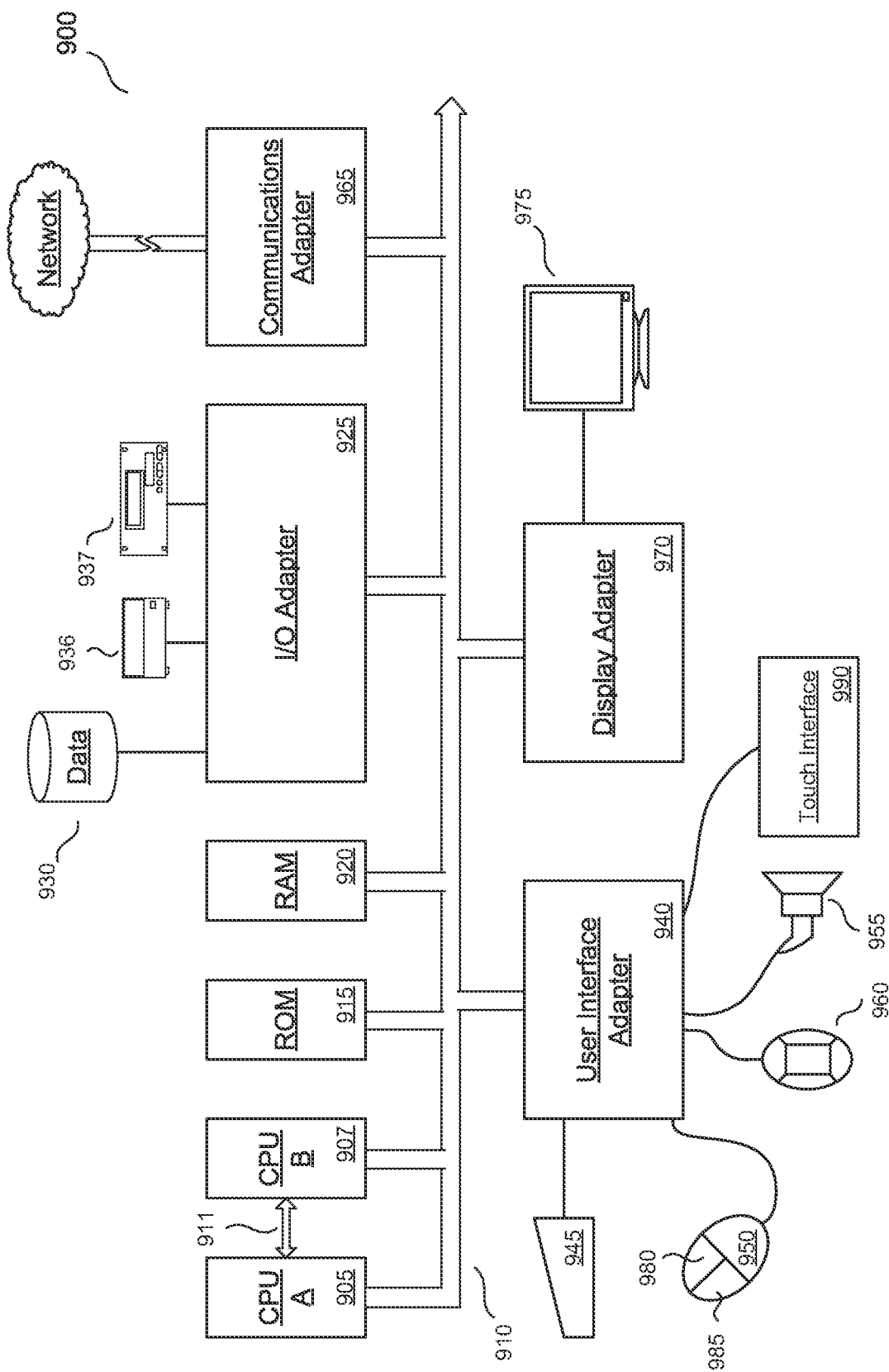
FIG. 9 is a diagram illustrating a processing system according to various embodiments of the present disclosure.

System 100 can include a network, for example Network 102, which can include the Internet, one or more local area or personal area networks, one or more system buses, for example system bus 910 as illustrated in FIG. 9, or the like; communication towers 109, which can include AM or FM broadcast towers, Wi-Fi hotspots, mobile telephone stations, cell towers; or any other suitable communication infrastructure, including satellites (not illustrated), through which service platform 101 can communicate to other networked devices or various internal or external components of system 100, which can also include processing system 900 as illustrated by FIG. 9 or various components thereof. Said communication can be used to deliver or provide or fulfill a service or service contract or subscription based on an associated sponsorship or based on an associated fulfillment of a requirement, for example a token requirement, or based on another determination by service platform 101. Service platform 101 can use this communication infrastructure to communicate with entities, payment processor 165 or other third parties, various components of system 100, or various computing devices, including computing device 107, which can include laptop computers, desktop computers, servers, virtual machines, web servers, database servers, email servers, cloud-based computing platforms, palmtop computers, digital video recorders (DVRs), television set-top boxes, gaming consoles, televisions, smart TVs, projectors, or any of various general or dedicated purpose computers; mobile device 106, which can include personal digital assistants (PDAs), cellular telephones, mobile phones, smartphones, tablets, handsets, mobile handsets, personal communication system (PCS) devices, wearable computing devices, such as glasses, watches, implanted/embedded electronic chips, or the like, music players, video players, portable gaming consoles, portable televisions; or any of various devices that may be included in, or carried by, persons or entities, motor vehicles, transportation vehicles, including navigation systems, satellite radios, or the like; digital display 108, which can include digital billboards, computer monitors, touchscreen displays, elevator advertising displays, sporting scoreboards, dining menu interfaces, ATM displays, self-serve checkout displays, kiosks, interactive coffee tables, digital picture frames, or the like. It should be noted that the term "device(s)" can include all devices as listed above that can comprise service platform 101 or system 100 and/or that can communicate with service platform 101 or to which service platform 101 can communicate, that the above listing of devices is not exhaustive, and that a device that qualifies as one type or category of device may also be considered to be of another type. For example, a mobile phone may also be a general or dedicated purpose computing device, a radio, a television, and/or a navigation system.

System 100, or service platform 101, can include one or more application programs, for example application program 104. Service platform 101 can use the communication infrastructure to communicate with application programs, for example application program 104, used or consumed on any of the devices and/or by one or more entities. Application program 104 can be executed on mobile device 106, computing device 107, digital display 108, or any other device. Service platform 101 can communicate with application program 104 or communicate to application program 104 via one or more devices on which application program 104 is executing or on which application program 104 is receiving or responding to communication(s) or information. According to various embodiments of the present disclosure, application program 104 can include firmware, an application that executes on firmware, an application that runs in a virtual machine environment; an application that runs in an operating system environment; a mobile app that runs on a mobile operating system; an operating system that runs on a device; a virtual operating system that runs on a host operating system a device; a web app that runs inside web browser 105, a website accessible via web browser 105; code or instructions, whether compiled, uncompiled, byte-code, raw, native, native machine, machine, object-oriented, non-object-oriented, compressed, decompressed, encrypted, decrypted, written in a programming language, for example Java, JavaScript, HTML, HTML5, CSS, Flash, Silverlight, Python, Curl, PHP, Objective-C, Visual Basic, C++, C #, Ruby, SQL, or any other programming language, that is included or referenced within a software development kit (SDK), software framework, programming library, component object model, database system, website, web app, web page, or widget or executed within a web browser, executed within an application program as described herein, executed within an iFrame, executed within an operating system, or otherwise; a cloud-based app that runs in a cloud-based environment; an application that runs in a remote desktop environment; a web service that runs on a server hosted on the Internet or a network; a developer app; or any other set of programmable instructions in an environment that allows the execution of the programmable instructions. Service platform 101 can provide or deliver application program 104 to one or more entities, whether having associations and/or subscriptions with or within service platform 101, or whether being a third-party entity not having a direct association or subscription with or within service platform 101. In some embodiments, application program 104 can include management applications. In some embodiments, application program 104 can include end-user applications. In some embodiments, service platform 101 can provide or deliver application program 104 to devices used by one or more entities. In some embodiments, service platform 101 can provide or deliver application program via a third party application distribution platform (not illustrated).

System 100 can include one or more data services, for example data service 103. Service platform 101 can use the communication infrastructure to communicate with or provide data services or content or deliverable content or application program interfaces (APIs), for example data service 103. Data service 103 can be used on, included with or within, consumed by, displayed within/to, or provided to one or more devices, one or more application programs, for example application program 104 or web browser 105, or one or more entities. Data service 103 can include or can be included with a service, a service contract, or a subscription, for example subscription 160. In some embodiments, data service 103 can be provided by service platform 101 via subscription or service contract, for example subscription 160. In some embodiments, data service 103 (or said service, service contract, or subscription) can include one or more data services. According to various embodiments of the present disclosure, said one or more data services can include, but are not limited to, one or more data delivery services; information; content; deliverable content; geo-coded content; geo-fenced content; one or more information services; one or more information contract services; one or more APIs, for example, raw data, serialized or de-serialized data, a Representational State Transfer (REST) API that can include HTTP response codes, HTTP headers, JSON, XML, or any of possible conversation information or data or conversation information methods; one or more telecommunication services; one or more instant messaging services; one or more voice delivery services; one or more video delivery services; one or more short message services (SMS); one or more email or email hosting services; one or more websites; one or more website services; one or more domain name system (DNS) services; one or more DNS hosting and/or management services; one or more code or script library hosting services, for example JavaScript hosting, jQuery hosting, CSS hosting, or the like; one or more subdomain website hosting services, web pages, or external website module hosting services, whether through iFrames, embedded HTML code, or any other method; one or more social networking services; one or more API connectivity services, for example a service of providing a developer app to end-users for connectivity to a third-party website or service; one or more content management systems (CMSs); one or more customer relationship management (CRM) services; one or more website hosting services; one or more customer prospecting services; one or more invoicing and/or billing services; one or more reporting and/or financial reporting and/or analytics services; one or more payment processing services; one or more advertising services or programs; one or more online bidding services; one or more online security services; one or more backup/recovery services; one or more disaster recovery services; one or more sponsorship services or programs; any of one or more services involving the transfer or exchange of information or communication sent from or received by service platform 101; any contract to deliver or provide any of said data services; or any combination of the foregoing.

In some embodiments, service platform 101 can provide or deliver data service 103 to one or more devices; one or more application programs, for example application program 104 or web browser 105; or one or more entities. Data service 103 can be consumed by one or more application programs, for example application program 104, by one or more entities, or by a third-party or third-party application, system, platform, or service. For example, data service 103 can be an API provided by service platform 101 consumed by a mobile application. Said mobile application (or access to data made available by said mobile application) can be accessible by entity A 110 or by another entity not directly associated with service platform 101. In some embodiments, access to some or all of data services 103 can be provided to or restricted from entity A 110 by service platform 101 based on a determination by service platform 101.

System 100 can include one or more service features or products, for example service feature E 140 or service feature F 141. In some embodiments, service features, for example service feature E 140 or service feature F 141, can be included with a subscription, for example subscription 160. In some embodiments, service features, for example service feature E 140 or service feature F 141, can be included as features, parts, elements, or modules of one or more data services, for example data service 103, or one or more application programs, for example application program 104. Service feature E 140 or service feature F 141 as features, parts, elements, or modules of data service 103 or application program 104 can include articles, such as, but not limited to, objects, modules, menus, data, lists, code, scripts, advertisements, still image content, animated content, video content, video services or video communication, audio content, voice services or voice communication, text and/or instant messages, text and/or SMS delivery modules, customer data, membership data, sponsorship data, membership directories, billing modules, advertising modules, sponsorship modules, or other information, and these articles can comprise, or can comprise parts or elements or functions of, data service 103 or application program 104.

Application program 104 or data service 103 can include one or more service features provided by service platform 101, for example service feature E 140 or service feature F 141, which can be one of a plurality of products or features associated with, made available with or provided with, or provided to application program 104 or data service 103 or to an end-user or entity thereof. For example, suppose service platform 101 provides application program 104 to entity A 110, and application program 104 is an online website. Service feature E 140 or service feature F 141 can be provided by service platform 101 to application program 104 and can include a directory listing product designed to list and/or provide searching abilities pertaining to a directory of members of entity A 110, for example member A1 113, member A2 114, or member AN 115. Service feature E 140 and/or service feature F 141 can include, but are not limited to, one or more of the following products or modules: a coupon product; a driving directions or navigation product or service; a promotional or advertising product; a job listing board and/or search product; a product/services listing product; a group deal and/or group coupon product; an API connectivity product; a social sharing or marketing product; a social networking product; an invoicing/billing product; a reporting and/or financial reporting and/or analytics services product; a newsletter product; a contact management product; a contact synchronization product; a member/user profile publication product, including, but not limited to the publication of photos, status updates, contact information, address location, GPS coordinates, product/services, hours of operation; a forum product; a data backup/recovery product; a staff administration product; a training product; a video library product; a mobile website product; a mobile app product; a charting product; a customer correspondence product; a customer prospecting product; a referral product; an email communication product; a task/to-do list product; a mailing label product; an text and/or SMS product; a mobile push notification product; a payment processing product; an accounting product; an accounting data synchronization product; a cloud storage product; a marketing campaign product; a barcode product; a short URL generation product; an event calendar product; a ticketing event product; a paid live event billing product; a news article publication product; a status update product or promotional product or user-generated content product; a community photos product; a photo management product; a notification/reminders product; a recurring billing product; a product having scheduled and/or automated tasks; or any other product or module that can be used by entities and/or provided by service platform 101.

System 100 can include feature sets, for example feature set C 130 or feature set D 131. Feature sets, for example feature set C 130 or feature set D 131, can be created and/or defined by service platform 101 and/or by entities. In some embodiments, feature sets, for example feature set C 130 or feature set D 131, can be included with a subscription, for example subscription 160. In some embodiments, feature sets, for example feature set C 130 or feature set D 131, can be included as features, parts, elements, or modules of one or more data services, for example data service 103, or one or more application programs, for example application program 104. Feature sets can consist of a combination of one or more service features, a combination of one or more feature sets, or a combination of both one or more service features and one or more feature sets. For example, feature set C 130 can consist of service feature E 140, while feature set D 131 can consist of service feature F 141 or can consist of both service feature F 141 and feature set C 130. Application program 104 or data service 103 can include one or more feature sets provided by service platform 101, for example service feature set C 130 or feature set D 131, which can be one of a plurality of product sets or feature sets associated with, made available with or provided with, or provided to application program 104 or data service 103 or to an end-user or entity thereof. In some embodiments, a subscription, for example subscription 160, can include services to be provided with the subscription, for example service feature E 140, feature set C 130, data service 103, or application program 104. In some embodiments, a subscription, for example subscription 160, can include different services or different subscriptions depending on subscription type. For example, service platform 101 can include service feature E 140 with a "standard" subscription, while service platform 101 can include feature set D 131 with a "pro" subscription.

In some embodiments, one or more services; for example services associated with service feature E 140 or service feature F 141, feature set C 130 or feature set D 131, data service 103, or application program 104; one or more subscriptions, for example subscription 160; or one or more service contracts related to subscriptions, for example subscription 160; can be provided or delivered to one or more end-users; one or more entities having an association on or with service platform 101; one or more contacts on service platform 101; one or more members on service platform 101; one or more subscribers on service platform 101; one or more sponsors on service platform 101; one or more application programs, for example application program 104 or web browser 105; one or more data services, for example data service 103; or one or more devices, for example mobile device 106, computing device 107, or digital display 108; collectively "service recipients". In some embodiments, service recipients can be registered with service platform 101 and/or associated with subscriptions, memberships, sponsorships, and/or entities so that said services, subscriptions, or service contracts can be provided or delivered to said service recipients.

In some embodiments, said one or more services, subscriptions, or service contracts can be assigned to be delivered to service recipients, can be reserved for delivery to service recipients, can be restricted from delivery to service recipients, can be withheld from delivery to service recipients, can be allowed for delivery to service recipients, can be delivered or provided to service recipients, and/or can be displayed within, or presented to, or used by service recipients. In some embodiments, delivery or provision of said one or more services, subscriptions, or service contracts to service recipients can be provided by service platform 101, can be provided by entities associated with service platform 101, or can be provided by entities associated with other entities associated with service platform 101. In at least one embodiment, delivery or provision of said one or more services, subscriptions, or service contracts to service recipients can be contingent upon a determination made by service platform 101. In some embodiments, delivery or provision of said one or more services, subscriptions, or service contracts to service recipients can be contingent upon payments made toward an invoice, statement, or bill associated with said one or more services, subscriptions, or service contracts.

For example, service platform 101 can use payments made toward an invoice, statement, or bill associated with said one or more services, subscriptions, or service contracts to deliver or provide said one or more services, subscriptions, or service contracts to a service recipient, for example application program 104, accessible within web browser 105 and/or being executed on a device used by entity A 110. In another example, service platform 101 can use token requirements credited toward an invoice, statement, or bill associated with said one or more services, subscriptions, or service contracts or associated with entity A 110 to deliver or provide said one or more services, subscriptions, or service contracts to a service recipient, for example data service 103, consumed by entity A 110. In another example, service platform 101 can apply credits from payments received or accepted from sponsors towards token requirements associated with said one or more services, subscriptions, or service contracts to deliver or provide said one or more services, subscriptions, or service contracts to a service recipient, for example entity A 110. In some embodiments, delivery or accessibility of said one or more services, subscriptions, or service contracts to/for service recipients can be reserved, withheld, or restricted by service platform 101 until requirements associated with said services, subscriptions, or service contracts are satisfied. In some embodiments, said requirements can include token requirements. In some embodiments, said requirements can include payment of invoices, statements, or bills. In some embodiments, said requirements can include a combination of token requirements and payment of invoices, statements, or bills. In some embodiments, providing or delivering said one or more services, subscriptions, or service contracts by service platform 101 or by an entity to a service recipients can be considered delivery of, provisioning of, or fulfillment of an associated, assigned, allowed, or granted service contract to said service recipient.

Consider application program 104, which can include one or more services, one or more service features, or one or more feature sets provided by service platform 101. Suppose application program 104 is a website application provided to entity A 110 by service platform 101 or by a third party administered by service platform 101. In another example, application program 104 can be a mobile application provided to entity A 110. In either of the previous two examples, application program 104 (or parts or modules or components or features thereof) can be provided via a subscription, for example subscription 160, which is related to entity A 110. Suppose that service platform 101 determines that a requirement related to said subscription or related to the delivery of all or some of the components, modules, or features comprising application program 104 to entity A 110 is satisfied. In this instance, service platform 101 can then enable or provision or provide or deliver all or part of application program 104 to entity A 110 or can then enable or provision or provide or deliver the subscription, for example subscription 160, to entity A 110, thereby fulfilling, or granting entity A 110's service contract or subscription. In the event service platform 101 determines said requirement is not satisfied, service platform 101 can exclude, restrict, or withhold such a provision or delivery of all or part of application program 104 from entity A 110.

Data service 103 or application program 104 can be used in or by a software program and/or used on or by a device; therefore, elements or articles related to service feature E 140, service feature F 141, feature set C 130, or feature set D 131 can be used, displayed, or made available on a device, on an application program within a device, or on other tangible embodiments. Additionally, the delivery or provision of service feature E 140 or service feature F 141, or the delivery or provision of feature set C 130 or feature set D 131, either directly or by a subscription or service contract, for example subscription 160, to data service 103 or application program 104, which can be used in or by a software program and/or used on or by a device, can be contingent upon a determination by service platform 101; therefore, data service 103, application program 104, web browser 105, mobile device 106, computing device 107, or digital display 108, or any devices, elements, articles, or embodiments thereof, can be transformed by such a determination and delivery or provision. Additionally, an entity's interaction or response (or lack thereof) with services, data service 103, application program 104, web browser 105, mobile device 106, computing device 107, digital display 108, or any other product or service which can be affected by the foregoing, can therefore be transformed as a result of such determination and/or delivery or provision.

In some embodiments, service platform 101 can record and/or store relationships representing registrations, associations, inclusions, calculations, formulations, determinations, assignments, fulfillments, provisions, or deliveries related with entities, members, contacts, memberships, sponsorships, feature sets, service features, subscriptions, service contracts, token requirements, sponsor payments, payment credits, subscription prices, payment processors, third-party services, data services, application programs, or devices.

Figure 2:
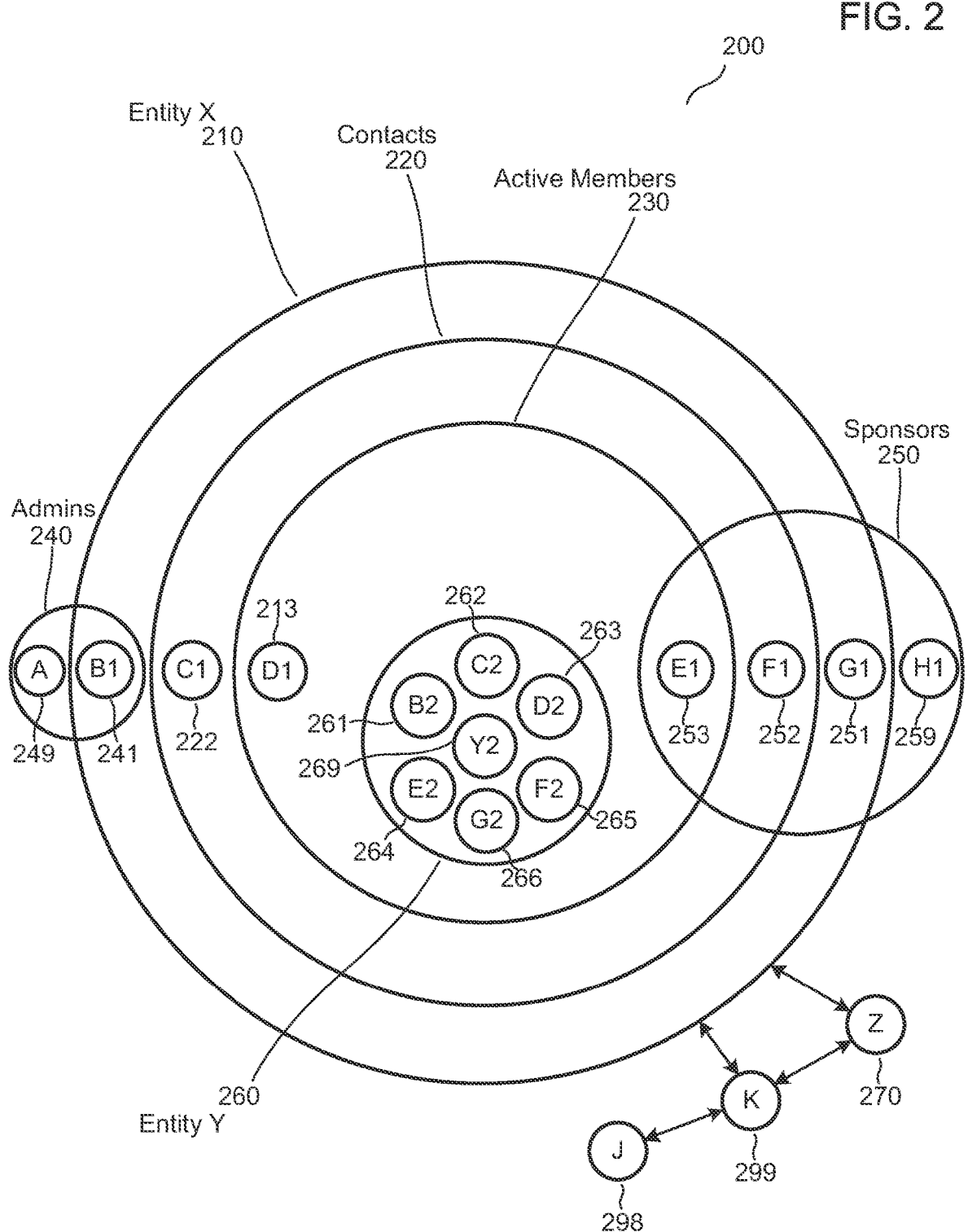
FIG. 2 is a diagram illustrating various elements and relationships with one or more entities and/or peers according to various embodiments of the present disclosure.

Referring next to FIG. 2, a diagram 200 illustrating various elements and relationships with one or more entities and/or peers will be discussed according to some embodiments of the present disclosure. Diagram 200 includes entity X 210, to which zero or more entities can be assigned or associated; contacts 220, to which zero or more entities can be assigned or associated; active members 230, to which zero or more entities can be assigned or associated; admins 240, to which zero or more entities can be assigned or associated; sponsors 250, to which zero or more entities can be assigned or associated; entity Y 260, to which zero or more entities can be assigned or associated; peer Z 270, to which zero or more entities can be assigned or associated; peer J 298, to which zero or more entities can be assigned or associated; and peer K 299, to which zero or more entities can be assigned or associated. Furthermore, in some embodiments, diagram 200 can include entities of the foregoing entity, contacts, active members, admins, sponsors, or peers. Such inclusion can, therefore, designate, assign, and/or associate the entity of the foregoing entity, contacts, active members, admins, sponsors, or peers as a child entity of the foregoing entity, contacts, active members, admins, sponsors, or peers. Also, said inclusion can designate, assign, and/or associate the foregoing entity, contacts, active members, admins, sponsors, or peers as a parent entity of the child entity. The designation, assignment, or association of a parent entity having one or more child entities can be a grouping, categorization, type assignment, association, or the like, of said one or more child entities with the parent entity. Therefore, a reference to a parent entity can be interchangeable with a reference to a group, category, type, membership, association, or the like, of child entities. It should be noted that an entity or peer can be associated with, categorized with, assigned to, connected to, or grouped with zero or more groups, categories, types, memberships, or associations.

As illustrated by FIG. 2, entity X 210 can have one or more child entities and can be a parent entity of the one or more child entities, for example child entity B1 241; child entity C1 222; child entity D1 213; entity Y 260, which can also be designated as a child entity; child entity E1 253, child entity F1 252, and child entity G1 251. In some embodiments, entity X 210 can be include or correspond with entity A 110 or entity B 120 as illustrated in FIG. 1.

As further illustrated by FIG. 2, admins 240 can consist of one or more entities, for example, entity A 249 or child entity B1 241. Entities comprising admins 240 can include entities having administrative control or rights or access associated with one or more properties associated with an entity, for example entity X 210. One or more properties that can have administrative control, rights, or access can include a subscription, for example subscription 160, a data service, for example data service 103, or service features or feature sets thereof, or an application program, for example application program 104, or service features or feature sets thereof, all as illustrated in FIG. 1. For example, suppose entity X 210 has a subscription to receive a website by a service platform, for example service platform 101 as illustrated in FIG. 1, and further suppose that the service platform includes a content management system (CMS) as a service feature with the subscription. Entity A 249 or child entity B1 241 can have administrative control, rights, or access to the CMS so that the website can be managed on behalf of entity X 210 by entity A 249 or child entity B1 241.

As further illustrated by FIG. 2, contacts 220 can consist of one or more entities, for example, child entity C1 222, child entity D1 213, entity Y 260, child entity E1 253, or child entity F1 252. In some embodiments, entities comprising contacts 220 can include or correspond with contacts, for example contacts A 111 or contacts B 121 as illustrated in FIG. 1. In some embodiments, contacts 220 can be of different type. For example, in some embodiments, contacts 220 can include anonymous contacts. Suppose entity X 210 has a website, and an end-user visits the website. A service platform, for example service platform 101 as illustrated in FIG. 1; an entity, for example entity X 210; or another third-party can record the visit of the end-user, and the end-user can be included with contacts 220 as one of a group consisting of one or more website visitors or anonymous contacts. Contacts 220 can also include contacts who take other similar actions that can be used and/or recorded by the service platform to associate said contacts with contacts 220. For example, contacts 220 can include entities, peers, or end-users who interact socially with entity X 210. For example, contacts 220 can consist of a group of followers who socially choose to become a follower of entity X 210, for example in a social network. For example, contacts 220 can consist of a group of likers/promoters who socially choose to like/promote entity X 210, for example in a social network. In another example, contacts 220 can consist of a group of friends who socially choose to become a friend of entity X 210, for example in a social network. In another example, contacts 220 can consist of a group of subscribers who choose to subscribe to information generated by entity X 210. In another example, contacts 220 can consist of a group of one or more previously active members associated with an entity, for example entity X 210, and who have had their membership dropped or their status changed from an active member to a non-active member.

As further illustrated by FIG. 2, active members 230 can consist of one or more entities, for example, child entity D1 213, entity Y 260, or child entity E1 253. In some embodiments, entities comprising active members 230 can include or correspond with members, for example member A1 113, member A2 114, member AN 115, member B1 123, member B2 124, or member BO 125 as illustrated in FIG. 1. In some embodiments, entities comprising active members 230 can be associated with or assigned to memberships, for example membership A 112 or membership B 122 as illustrated in FIG. 1.

As further illustrated by FIG. 2, sponsors 250 can consist of one or more entities, for example, child entity E1 253, child entity F1 252, child entity G1 251, or entity H1 259. In some embodiments, entities comprising sponsors 250 can include or correspond with sponsors, for example sponsor A1 116, sponsor A2 117, sponsor AM 118, sponsor B1 126, sponsor B2 127, sponsor BP 128, or sponsor Z 155 as illustrated in FIG. 1. In some embodiments, entities comprising sponsors 250 can be associated with or assigned to sponsorships, for example sponsorship X 150 or sponsorship Y 151 as illustrated in FIG. 1.

As illustrated by FIG. 2, entity Y 260 can have one or more child entities and can be a parent entity of the one or more child entities, for example child entity B2 261; child entity C2 262; child entity D2 263; child entity E2 264, child entity F2 265, child entity G2 266, and child entity Y2 269. It should be noted that children of entity Y 260 can fall into one or more groups, categories, types, or associations in a similar manner as children of entity X 210. For example, child entity B2 261 can be included in a admin group, for example an admin group similar to admins 240 having entity B1 241. In another example, child entity C2 262 can be included in a contact group, for example a contact group similar to contacts 220 having entity C1 222. In another example, child entity D2 263 can be included in an active member group or active membership, for example a membership group similar to active members 230 having entity D1 213. In another example, child entity E2 264 can be included in sponsor group and an active member group or active membership, for example a sponsor group similar to sponsors 250 and a membership group similar to active members 230 having entity E1 253. In another example, child entity F2 265 can be included in a contact group and an active member group or active membership, for example a contact group similar to contacts 220 and a membership group similar to active members 230 having entity F1 252. In another example, child entity G2 266 can be included in a sponsor group, for example a sponsor group similar to sponsors 250 having entity G1 251. In another example, child entity Y2 269 can be a parent entity with child entities, for example a parent entity similar to entity Y 260 having one or more entities. In some embodiments, entity Y 260 or entity Y2 269 can be included or can correspond with entity A 110 or entity B 120 as illustrated in FIG. 1.

It should be noted that any entities, whether parent or child entities, can be a parent of zero or more entities. Additionally, it should be noted that any peers can be a parent of zero or more entities.

In some embodiments, an entity, whether a parent or child entity, or a peer can be an object or article or information representing or identifying said entity or peer. For example, entity X 210 can be a membership organization represented or identified by a website; a domain name; a business or member page on a website; a geo-fence; a profile page on a website; a business or member or profile listing on a website; a URL; a handle or username, for example a Twitter handle; a barcode, for example a 2-D barcode; an application program, for example application program 104 run on a device; or any other object or article or information that can represent or identify or be associated with entity X 210.

It should be noted that the term "peer" can include an entity, individual, end-user or application end-user, website visitor or website end-user, business, company, corporation, partnership, association, organization, membership organization, membership association, chamber of commerce, government, group, subsidiary, branch office, system, software application, device, sponsor, contact, member, any representative thereof, or any representative operating under the control of such a peer; that the foregoing list of possible peers or peer types or categories is not exhaustive; and that other peers or peer types/categories not mentioned in the foregoing list can be included as a peer. Furthermore, a peer can be a parent entity of a child entity, a peer can be a child entity of a parent entity, a peer can be both a parent entity of a child entity and a child entity of a parent entity, or a peer can be neither a parent entity nor a child entity.

Still referring to FIG. 2, consider peer J 298, peer K 299, and peer Z 270. In some embodiments, peer Z 270 can be a parent entity. In some embodiments, peer Z 270 can be a child entity. In some embodiments, peer K 299 can be child entity. In some embodiments, peer K 299 can be an entity not associated with a parent entity. In some embodiments, peer J 298 can be an entity not associated with a parent entity. In some embodiments, peer Z 270 can interact with entity X 210 or entity X 210 can interact with peer Z 270. In some embodiments, peer K 299 can interact with entity X 210 or entity X 210 can interact with peer K 299. In some embodiments, peer K 299 can interact with peer Z 270 or peer Z 270 can interact with peer K 299. In some embodiments, peer J 298 can interact with peer K 299 or peer K 299 can interact with peer J 298. Any of said interactions can be an action that can be tracked or recorded or stored by a service platform, for example service platform 101 as illustrated in FIG. 1, as relationships or elements associated with entities and/or peers. Said interactions can include various social and/or non-social interactions, for example, a peer or entity visiting a property or representation of the other peer or entity, a peer or entity liking or promoting a property or representation of the other peer or entity, a peer or entity following or friending a property or representation of the other peer or entity, and/or a peer or entity subscribing to a property or representation of the other peer or entity.

In some embodiments, a service platform, for example service platform 101 as illustrated in FIG. 1, can record or store the various elements and relationships with one or more entities and/or peers as discussed herein. Furthermore, the service platform can consider the various elements and relationships to quantify, calculate, or make other determinations according to various embodiments of the present disclosure.

Figure 3:
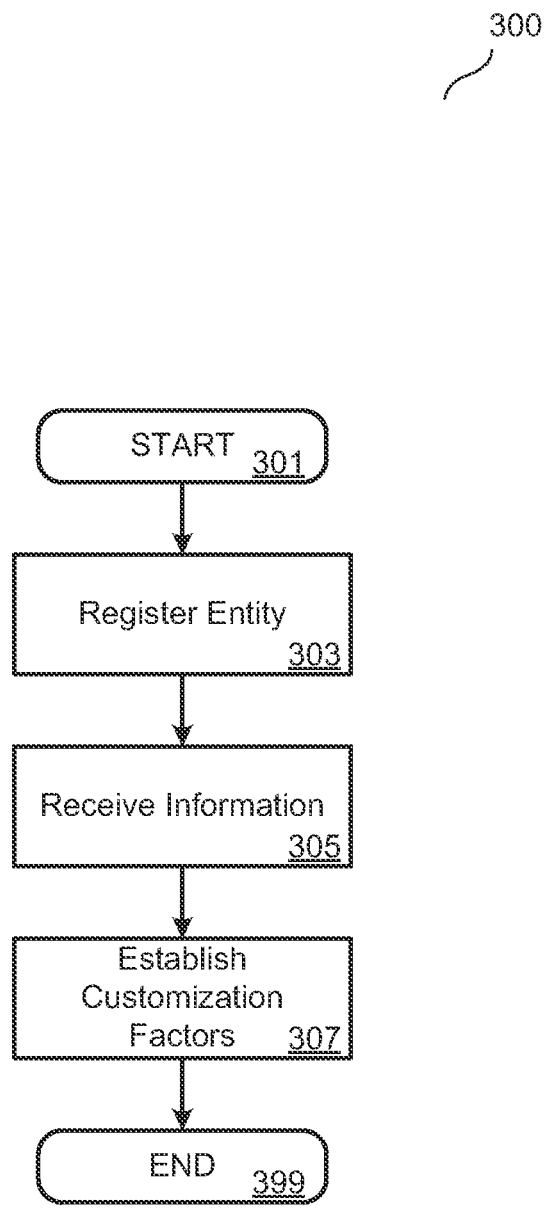
FIG. 3 is a flowchart illustrating entity registration according to various embodiments of the present disclosure.

Referring next to FIG. 3, a method 300 for entity registration will be discussed according to some embodiments of the present disclosure. Method 300 begins, as illustrated by block 301. As illustrated by block 303, a service platform, for example service platform 101 as illustrated in FIG. 1, can receive a request for entity registration. In some embodiments, entity registration can be for one or more entities, for example any one of the entities as illustrated in FIG. 2. In some embodiments, entity registration can be for one or more peers, for example any one of the peers as illustrated in FIG. 2. In some embodiments, the request received by the service platform can originate from said one or more entities or said one or more peers. In other embodiments, the entity registration is not associated with receiving a request from an entity or peer, but rather the registration is associated with registering one or more entities or one or more peers based on other factors or received information, for example based on data received for the purpose of importing one or more entities or one or more peers. As such, in some embodiments, entity registration can include registration of one or more entities or one or more peers of or on behalf of another entity or peer. For example, a request for entity registration can be received by the service platform from another entity or peer having one or more entities or peers as children, and entity registration can include registration of the one or more children. In response to the request or based on the other factors or received information, the service platform can register the one or more entities or the one or more peers as one or more registered entities. In some embodiments, registration can include assigning and/or storing one or more unique identifiers to the one or more registered entities on the service platform. The one or more unique identifiers can be unique within the service platform; unique within a group of entities, all having associations of the same group; or both.

As illustrated by block 305, the service platform can receive information associated with the registered entity. Said information can be any information that the service platform receives from, discovers, calculates, determines, or tracks regarding the registered entity or interactivity regarding the registered entity. For example, suppose the registered entity registers a quantity of child entities or child peers as registered child entities with the service platform, and the service platform receives this information and associates these now registered child entities with the registered entity. In another example, suppose that the registered entity has taken an action to follow a Twitter account associated with the service platform or associated with another entity. The service platform can track this information or can receive this information associated with the entity's following of said Twitter account via discovery, or otherwise. In another example, suppose that the registered entity has one or more associated sponsors. The service platform can receive information related to the one or more associated sponsors. Any of said information in block 305 can be stored by the service platform. Any of said information in block 305 can be used or included by the service platform in determinations, calculations, establishments, or performances of other methods or in any of various embodiments as disclosed herein or otherwise that the service platform might determine to be of use or may implement.

As illustrated by block 307, the service platform establishes customization factors. Said established customization factors can be used by the service platform to determine, calculate, establish, or perform other methods or in any of various embodiments that the service platform might determine to be of use. In some embodiments, said customization factors can be established by using said information in block 305. For example, the service platform can choose or use the number of child entities registered or associated with a registered entity as an established customization factor. The service platform can then, for example, in a determination of a requirement that must be fulfilled for the delivery of a service provided to the registered entity by the service platform, include the number of child entities of the registered entity in the determination. In another example, suppose a registered entity has one or more sponsors associated with the registered entity. In this case, the service platform can choose, use, or include the quantity of the one or more sponsors associated with the registered entity as an established customization factor. In some embodiments, said customization factors can include pricing information specified by the service platform. In some embodiments, said customization factors can include pricing information or other information specified by one or more entities and received by the service platform. In some embodiments, said customization factors can include a quantification of the number of users, members or memberships associated with one or more entities on the service platform. In some embodiments, said customization factors can include a quantification of the number of sponsorships associated with one or more entities on the service platform. In some embodiments, said customization factors can include a quantification of the number of contacts associated with one or more entities on the service platform. In some embodiments, said customization factors can include a quantification of the amount of revenue received from or associated with sponsors of one or more entities on the service platform. In some embodiments, said customization factors can include pricing information, revenue received, revenue processed, or information related to said revenue received or processed for subscriptions associated with one or more entities on the service platform. In some embodiments, said customization factors can include tracked or discovered interactivity associated with one or more entities on the service platform. In some embodiments, said customization factors can include information related to bidding systems or other systems or methods considered by the service platform for establishment and/or use as determined by the service platform. In other embodiments, said customization factors can include any factors as determined by the service platform that can be used by the service platform to determine, calculate, establish, or perform other methods or implement any of various embodiments as disclosed herein or otherwise that the service platform might determine to be of use. Method 300 ends, as illustrated at block 399.

Figure 4:
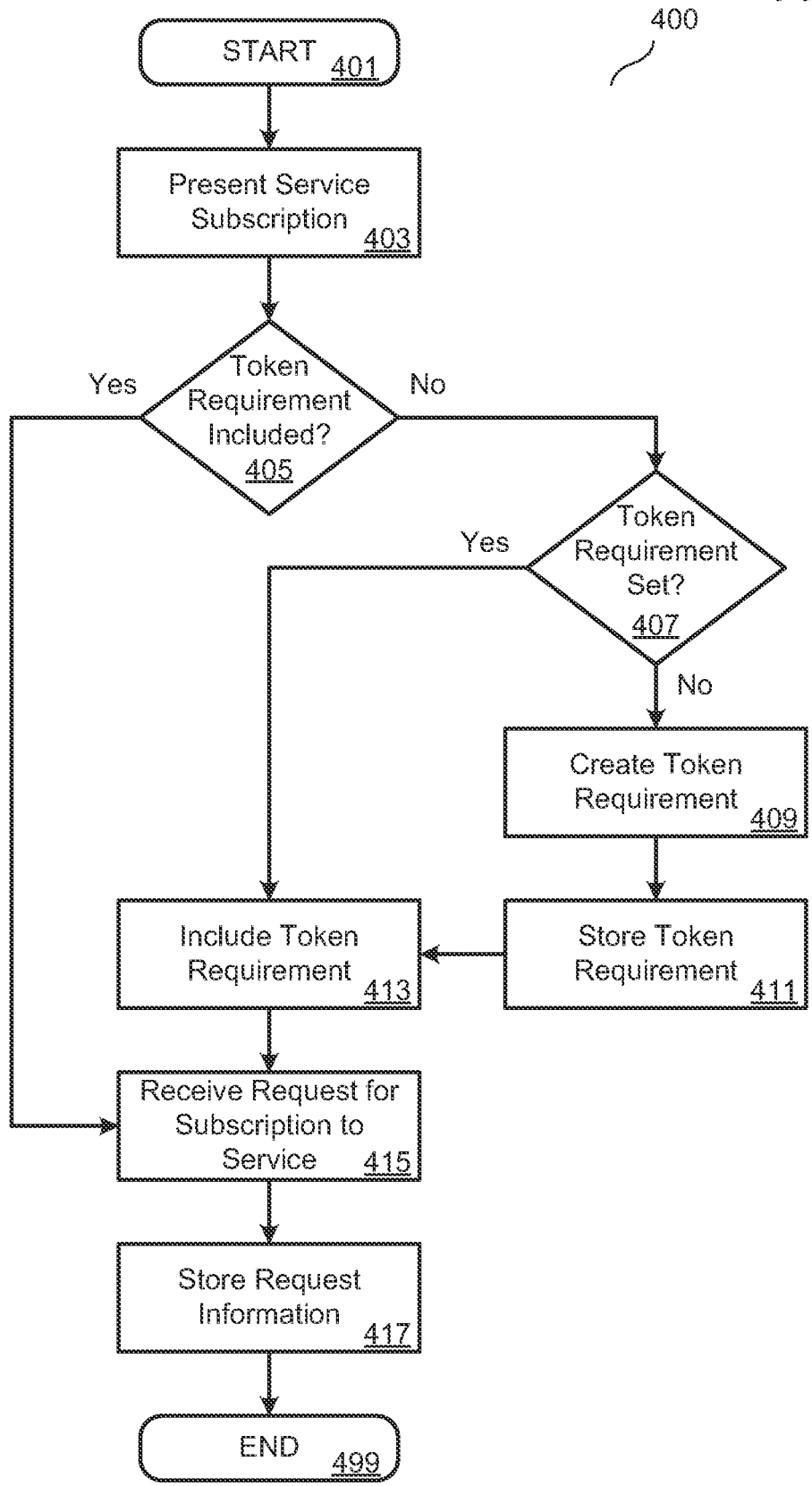
FIG. 4 is a flowchart illustrating a token requirement with a service subscription according to various embodiments of the present disclosure.

Referring next to FIG. 4, a method 400 illustrating a token requirement with a service subscription will be discussed according to various embodiments of the present disclosure. Method 400 begins, as illustrated by block 401. As illustrated by block 403, a service platform, for example service platform 101 as illustrated in FIG. 1, can present a service subscription. In some embodiments, the service subscription can be for a service, for example data service 103, application program 104, service feature E 140, service feature F 141, feature set C 130, and/or feature set D 131, all of the aforementioned as illustrated in FIG. 1; for a subscription, for example subscription 160 as illustrated in FIG. 1; for a subscription, for example subscription 160 as illustrated in FIG. 1, to said service; for a membership, for example membership A 112 or membership B 122 as illustrated in FIG. 1; for a subscription, for example subscription 160 as illustrated in FIG. 1, to said membership; for a sponsorship, for example sponsorship X 150 or sponsorship Y 151 as illustrated in FIG. 1; for a subscription, for example subscription 160 as illustrated in FIG. 1, to said sponsorship; for a service contract for or related to said service; or for content for or related to said service. In some embodiments, the service subscription can be a subscription for a service provided by a third-party and not provided by the service platform. Also, in some embodiments, the service subscription can be presented to one or more various entities, peers, or end-users having one or more relationships or associations with the service platform.

In some embodiments, a service subscription can be presented to entities, for example any one of the entities as illustrated in FIG. 2 or as defined herein. In some embodiments, a service subscription can be presented to peers, for example any one of the peers as illustrated in FIG. 2 or as defined herein. For example, suppose the service platform is presenting a service subscription to an application program end-user or to a website visitor, for example peer J 298 as illustrated in FIG. 2. Peer J 298 can be presented a service subscription as a part of or included with a sign-up phase or application flow or business flow or registration process or method, such as an entity registration method as discussed in FIG. 3 or the like. In some embodiments, a service subscription can be presented to registered entities as discussed in FIG. 3 having previously undergone a sign-up phase or application flow or business flow or registration process or method, as illustrated in FIG. 3. For example, suppose entity X 210 as illustrated in FIG. 2 has undergone a registration process to become a registered entity on a service platform, and suppose entity X 210 becomes associated as a registered entity as a result of the undergoing. The service platform can present a service subscription to the registered entity.

In some embodiments, the presenting can be displaying or offering or making the service available for subscription on a device, for example a mobile handset as discussed in FIG. 1. In some embodiments, the presenting can include displaying the service subscription within a software application, for example application program 104, to one or more end-users, one or more entities, or one or more peers. In some embodiments, the presenting can be sending content, for example HTML, JSON, or any other markup language or content or text or information, to one or more end-users, one or more entities, one or more peers, or one or more devices or one or more application programs being used or consumed by one or more end-users, one or more entities, or one or more peers. For example, the service platform can respond to a request by a web browser, application, or user of said web browser or application, and the service platform can include said content regarding a service subscription with the response. In some embodiments, the presenting can be accomplished via a third-party payment or subscription platform or a subscription platform provided by the service platform, for example a marketplace or application store, to which the service platform communicates and/or receives and/or sends information regarding said service subscription.

Also, in some embodiments, the service subscription can be presented by the service platform to entities or peers or end-users who are either existing subscribers or who are non-subscribers with respect to the service platform. For example, in the case a service subscription is presented by the service platform to an entity or peer or end-user not having a subscription associated with the platform, the service offering or presentation can be for a new service of which the non-subscribing entity or peer or end-user does not have a current subscription. In the case a service subscription is presented to an existing subscriber, the service offering can be for a new or different service of which the existing subscriber does not have a current subscription, can be for an upgrade of an existing service of which the existing subscriber does have a current subscription, or can be for changing one or more requirements used to maintain one or more active or valid subscriptions of which the existing subscriber holds or may hold, such as a token requirement or particular payment method or payment model for one or more subscriptions associated with the existing subscriber, for example, changing from a fee-based-type subscription to a subscription or subscription type having one or more token requirements, or vice versa.

In some embodiments, the service platform can include one or more token requirements with the presentation of the service subscription, as illustrated by block 405. In some embodiments, the service platform can include one or more other requirements with the presentation of the service subscription. If one or more token requirements are included, in some embodiments, method 400 can continue to block 415. In some embodiments, in the event the service platform does not consider including one or more token requirements, block 405 may not be necessary, and method 400 can continue with block 415.

In some embodiments, the one or more token requirements that can be included with the service subscription can include one or more token requirements, or one or more other requirements, that must be satisfied, met, paid, or fulfilled in order for the service subscription to be obtained or in order for one or more goods, services, products, or content associated with the service subscription to be provided. It should be noted that terminology related to fulfilling a token requirement, satisfying a token requirement, or meeting a token requirement in this disclosure can be used interchangeably. Furthermore, it should be noted that presenting one or more service subscriptions that become—or that have one or more associated services, data services, application programs, service features, or feature sets, that become—available for participation, use, or consumption by one or more entities or peers or end-users after one or more requirements, for example a token requirement or other requirement, has been met or satisfied can include a reserving of or an offering of or a reservation for the one or more service subscriptions to or for the one or more entities or peers or end-users. It should be noted that presenting one or more service subscriptions that become—or that have one or more associated services, data services, application programs, service features, or feature sets, that become—available for participation, use, or consumption by one or more entities or peers or end-users after one or more requirements, for example a token requirement or other requirement, has been met or satisfied can include a reserving of or an offering of or a reservation for one or more service contracts to or for the one or more entities or peers or end-users. Therefore, in some embodiments, the service platform can reserve one or more service contracts associated with one or more service subscriptions having one or more token requirements.

In some embodiments, a token requirement can be a requirement that has a fulfillment status. In some embodiments, the fulfillment status can be designated as empty or null, not fulfilled, partially fulfilled, fulfilled, completely fulfilled, or otherwise. In some embodiments, upon the transformation of the fulfillment status of a token requirement, in part or in whole, a determination can be made with regard to the transformed state of the token requirement. For example, in one embodiment, once a token requirement has been fulfilled, further processing or delivery of a service subscription associated with the token requirement can take place.

In some embodiments, a token requirement can be a requirement designed, determined, or predetermined to be satisfied or fulfilled by a payment using real currency. For example, in some embodiments, a token can be represented by a monetary unit, such as U.S. dollars, euros, or any valid currency or legal tender that can be accepted as payment for goods or services or products or content or subscriptions or repayment of debts in any given country or socio-economic context or can be used for a financial transaction or purchase posted towards any financial requirement or obligation for a subscription to a service. In some embodiments, a token can be represented by virtual or digital currency, such as bitcoins (http://bitcoin.org), points, credits, or any other object—whether physical, digital, or virtual—or any sort of record, or a collection of any such objects or records, that can be accepted as payment for goods and services or repayment of debts in any given country or socio-economic context, can be used to directly or indirectly represent or be exchanged for real currency or another monetary unit, or can be used as a method of payment recognized or accepted by the service platform to be applied toward a service subscription or a token requirement for a service subscription. It should be noted that any currencies mentioned in the embodiments herein can either be regulated, deregulated, centralized, or decentralized currencies. In some embodiments, payments for token requirements can be made via cash, check, credit or debit card, ACH, wire transfer, digital or mobile wallet, mobile app, or any other possible method that allows the exchange of real, virtual, or digital currencies, and such payments can be made in person, by mail, by information exchange, by electronic information exchange, by peer-to-peer network, via the Internet or a network, or via a payment processor, for example payment processor 165 as illustrated in FIG. 1.

In at least one embodiment, a token requirement can be a requirement that is satisfied by an application of tokens by the service platform toward the requirement. In some embodiments, a token can be represented by a unit or object determined, predetermined, calculated, created, discovered, or formulated by the service platform. For example, in some embodiments, when creating a token requirement for a service subscription that is presented to an entity or peer interested in the service subscription, the service platform can use quantities of, or relationships between, objects or entities or peers in the calculation of the token requirement. Likewise, in some embodiments, a token requirement created or discovered by the service platform can be a token requirement or a type of a token requirement that can be satisfied as a result of a determination, as a result of a calculation, or as a result of internal processing by the service platform. In some embodiments, a token requirement created or discovered by the service platform can be a token requirement or a type of a token requirement that is created or discovered having a purposeful designation or design for such a determination, calculation, or internal processing by the service platform.

In some embodiments, a token requirement created or discovered by the service platform may be a requirement that is satisfied by a currency payment only, while in other embodiments, the token requirement may be satisfied solely by a calculation, by a determination, or by an internal application or processing of tokens by the service platform. It should be noted that a calculation, determination, or an internal application or processing of tokens can be simply referred to as an application of tokens or an application of credits or an application of token credits. However, other embodiments may combine the use of both currency payments and an application of tokens in the fulfillment of a token requirement. Therefore, in some embodiments, currency payments can be included with an application of tokens. In other embodiments, currency payments can be distinct from an application of tokens.

Still referring to FIG. 4, in the event a token requirement is not included, a determination or check is made as to whether a token requirement is set for the service subscription, as illustrated by block 407. In some embodiments, this check or determination can include querying a database for a token requirement or for a discovery or creation or determination of a token requirement. In some embodiments, this check can include an execution of instructions, and a positive determination can be made based upon said execution of instructions. Following a positive determination of a set token requirement, a token requirement can be included as illustrated by block 413. Following a negative determination, a token requirement is created as illustrated by block 409. According to one embodiment of the present disclosure, a fixed token amount can be used in the creation of a token requirement. For example, one method of creating a token requirement is a fixed method by specifying a desired token amount. Now, suppose a token requirement is created for a service subscription S. In such a fixed token amount specification scenario, the token requirement for service subscription S which has x value is simply t(S)=x, where x is a constant. This disclosure also describes more subtle, complex, and customized methods for creating one or more token requirements than the aforementioned fixed token amount specification.

In some embodiments, a token requirement can be created by a determination, calculation, or formula performed or evaluated or determined or predetermined by the service platform. In some embodiments, an entity or a peer, for example any one of the entities or peers as illustrated in FIG. 2 or as defined herein, can be considered and distinguished apart from other entities or peers in the creation so that a token requirement will be specific for the entity or the peer or specific for a service subscription associated the entity or the peer. For example, if an entity is an organization, a service subscription for the entity can include a token requirement that is different than a token requirement created for a different or similar service subscription associated with another organization. In some embodiments, a token requirement can be created for a service subscription as defined or as described herein or for a subscription, for example subscription 160 as illustrated in FIG. 1. In some embodiments, a token requirement can be created for a service as defined or as described herein or for an object related to said service. For example, a token requirement can be created for a fee or other requirement related to a sponsorship, for example sponsorship X 150 or sponsorship Y 151 as illustrated in FIG. 1, or for a fulfillment of a service contract or subscription, for example subscription 160 as illustrated in FIG. 1, related to said sponsorship. In another example, a token requirement can be created for a fee or other requirement related to a service, for example data service 103 as illustrated in FIG. 1, or related to an application program, for example application program 104 as illustrated in FIG. 1, or related to the fulfillment of a service contract or subscription related to said service or said application program and provided by the service platform to an entity or peer. In some embodiments, a token requirement for a service subscription or for an object can be considered and distinguished apart from other service subscriptions or objects or service subscription types or object types when creating or determining a token requirement for a service subscription or for an object.

Furthermore, in some embodiments, other items of interest, such as, but not limited to, preferences related to the service platform, preferences related to an entity or peer, information related to an entity's or peer's associated memberships, information related to an entity's or peer's associated contacts, information related to an entity's or peer's associated sponsors, information related to an entity's or peer's associated sponsorships, or information related to an entity's or peer's associated membership dues, can be considered or used by the service platform in a determination, calculation, or formula of a token requirement. Additionally, in some embodiments, revenue calculated or revenue received by the service platform in relation to sponsorships can be considered or used in a determination, calculation, or formula of a token requirement. Moreover, in some embodiments, a desired price received by the service platform from a potential subscriber, entity, or peer, can be considered or used in a determination, calculation, or formula of a token requirement. In other embodiments, certain interactivity tracked or discovered by the service platform can be considered or used in a determination, calculation, or formula of a token requirement. In some embodiments, certain activity performed by an entity or peer, or activity performed by any entity or peer related to said entity or peer, tracked or discovered by the service platform can be considered or used in a determination, calculation, or formula of a token requirement. Also, in some embodiments, a bidding system can be considered or used or considered in a determination, calculation, or formula of a token requirement. Additionally, some embodiments may combine any of the plurality of the aforementioned considerations in a determination, calculation, or formula of a token requirement; some embodiments may use only one of the plurality of the aforementioned considerations in a determination, calculation, or formula of a token requirement. Also, some of the aforementioned considerations or factors in a determination, calculation, or formula of a token requirement can be weighted differently than other considerations or factors in the determination, calculation, or formula. More precisely, according to at least one embodiment of the present disclosure, suppose a token requirement is being created for an object that represents a service subscription, and the token requirement can be created by defining the token requirement t of service subscription S of type i associated with entity O as $$t(S_i)_O = \alpha \times f(x_P) + \beta \times f(x_O) + \gamma \times f(N) + \delta \times f(C) + \varepsilon \times f(M_i) + \phi \times f(M_T) + \psi \times f(r(R)) + \omega \times f(p(D)) + \sigma \times f(x_E) + \mu \times f(A) + \theta \times f(Z),$$

where multipliers $\alpha$, $\beta$, $\gamma$, $\delta$, $\varepsilon$, $\phi$, $\psi$, $\omega$, $\sigma$, and $\theta$ are constants in the interval [0,1]; multiplier $\mu$ is a constant in the interval [−1,1]; and each multiplier is associated with a corresponding customization factor, said factor expressed as a function, including: customization factor $f(x_P)$, which is a function of price or value or amount $x_P$ specified by the service platform for service subscription S of type i associated with entity O; customization factor $f(x_O)$, which is a function of price or value or amount $x_O$ specified by entity O and received by the service platform for service subscription S of type i; customization factor $f(N)$, which is a function of the number or a quantity of members having memberships associated with entity O determined, recorded, or discovered by the service platform; customization factor $f(C)$, which is a function of the number or a quantity of contacts associated with entity O determined, recorded, or discovered by the service platform; customization factor $f(M_i)$, which is a function of the number or a quantity of sponsorships of type i associated with entity O determined, recorded, or discovered by the service platform; customization factor $f(M_T)$, which is a function of the total number of sponsorships or a quantity of sponsorships spanning multiple types of sponsorships associated with entity O determined, recorded, or discovered by the service platform; customization factor $f(r(R))$, which is a function of function $r(R)$, where R is any amount of revenue received or accepted or discovered or tracked or calculated by the service platform that can be associated with one or more entities, associated with entity O, or associated with one or more entities, members, contacts, end-users, or sponsors associated with entity O; customization factor $f(p(D))$, which is a function of function $p(D)$, where D is any price of membership dues specified by entity O and/or received and/or discovered by the service platform; customization factor $f(x_E)$, which is a function of price or value or amount $x_E$ specified by entity E, which can be an entity, peer, end-user, member, or contact, interested in service subscription S and received by the service platform for service subscription S of type i for or associated with entity O; customization factor f(A), which is a function of tracked activity or interactivity associated with entity O or activity or interactivity associated with an entity or peer or member or contact or end-user associated with entity O determined, recorded, or discovered by the service platform; and customization factor f(Z), which is a function of a bidding system associated with pricing or valuing service subscription S or other services associated with entity O. This definition, in addition to the other considerations mentioned in other disclosed embodiments, provides even further advantages. It should be noted that this definition is a single example of a plurality of definitions that may be used in a determination, calculation, or formula of a token requirement. Also, it should be noted that, in some embodiments, the values of the multipliers in the aforementioned definition can be any real number, and that the range values of the multipliers as listed above are to serve as a single use case example of such a definition.

With this definition, it is at least therefore possible for a token requirement for a service subscription to be customized between different entities or peers; customized between different service subscriptions or service subscription types; or customized in accordance to, but not limited by, the following customization factors: preferences of the service platform, preferences of an entity or peer, membership size of an entity or peer, contact size of an entity or peer, sponsorship participation associated with an entity or peer, membership dues associated with an entity or peer, revenue calculations or receipts associated with sponsorships, pricing preferences of an entity or peer interested in a service subscription or sponsorship, tracked interactivity or activity discovered to be associated with an entity or peer, and/or a bidding system associated with service subscription and/or membership and/or sponsorship pricing.

Assume in the examples provided below that a token requirement or unit amounts or function definitions are in US Dollars. Now, in order to illustrate a possible embodiment resulting from the previous definition of $t(S_i)_O$, assume that the service platform defines $f(x_P)=100$. Additionally assume now in this illustration a first scenario where the service platform only takes into consideration a price or amount specified by the service platform, and the service platform considers this customization factor in a complete fashion while excluding or not considering or not including any other customization factors. As a result, the platform sets multiplier $\alpha=1$, and sets multipliers $\beta, \gamma, \delta, \varepsilon, \phi, \psi, \omega, \sigma, \mu, \theta=0$. Therefore, in this scenario, we have the following:

$$t(S_i)_O = 1 \times f(x_P) + 0 \times f(x_O) + 0 \times f(N) + 0 \times f(C) + 0 \times f(M_i) +$$
$$0 \times f(M_T) + 0 \times f(r(R)) + 0 \times f(p(D)) + 0 \times f(x_E) + 0 \times f(A) + 0 \times f(Z).$$

Therefore, the following definition for creating the token requirement for this service subscription comes as a result:

$$t(S_i)_O = f(x_P).$$

Therefore, in some embodiments, a token requirement can be determined and/or created solely by one function, one customization factor, one formula or one calculation.

Note that in some embodiments, the service platform can take into consideration a price or value or amount specified by the service platform to apply to all service subscriptions or service subscriptions of a particular type for an entity or peer or presented to an entity or peer. In this case, $t(S_i)_O=t(S)_O$. Also note that in some embodiments, the service platform can take into consideration a price or value or amount specified by the service platform to apply to all service subscriptions or service subscriptions of a particular type for all entities. In this case, $t(S_i)_O=t(S_i)$. Also note that in some embodiments, the service platform can apply both of the previous two aforementioned considerations, resulting in $t(S_i)_O=t(S)$. Therefore, in some embodiments, $t(S)=f(x_P)$. If $f(x_P)$ is a constant, as shown in the previous example where $f(x_P)=100$, this results in $t(S)=x$, where x is a constant. This shows that the fixed price specification scenario remains possible among all the possibilities as described using the aforementioned creation and/or definition for $t(S_i)_O$ in determining and/or creating the token requirement for a service subscription.

The example with $t(S_i)_O=f(x_P)$ also shows that if, in some embodiments, the service platform does not take into consideration a particular customization factor, the multiplier for the customization factor can have a value of zero (0), or a Boolean value of "false", which has the same effect as not including the customization factor and its associated multiplier in the original determination/creation formula $t(S_i)_O$ as specified above. Additionally, if the service platform does take into consideration any customization factor, the multiplier for the customization factor can have a non-zero value in the interval (0,1] or the interval [−1,0). If in this case the value of a multiplier is not zero (0), the value could also be symbolic of having a Boolean value of "true", having the same effect as including the customization factor in a complete fashion in the aforementioned determination/creation formula $t(S_i)_O$ as described above. Therefore, different embodiments can be constructed using the aforementioned determination/creation formula $t(S_i)_O$ or a similar formula as described above, and each embodiment can contain a different possible combination of multipliers and customization factors used in a determination and/or creation of a token requirement.

In one embodiment, for example, suppose that in the determining and/or creation of a token requirement for service subscription S of type i associated with entity O, the service platform only considers customization factors f(N) pertaining to the number or a quantity of memberships of entity O and f(C) pertaining to the number or a quantity of contacts of entity O, and the service platform considers these customization factors in a complete fashion and does not consider the remaining customization factors in the determination and/or creation. Accordingly, the service platform sets $\gamma=\delta=1$ (or a Boolean value of "true") and omits or does not include other multipliers and/or other corresponding functions from a definition used to determine and/or create a token requirement. The following definition for determining or creating a token requirement for a service subscription comes as a result:

$$t(S_i)_O = f(N) + f(C).$$

Therefore, in some embodiments, a token requirement can be determined and/or created by one or more functions, customization factors, formulas, or calculations. In some embodiments, a token requirement can be determined and/or created by one or more functions, customization factors, formulas, or calculations, including one or more functions, customization factors, formulas, or calculations not mentioned herein.

In another embodiment, for example, suppose the service platform only considers customization factors $f(x_O)$ pertaining to a price or value or amount specified by entity O and received by the service platform for service subscription S of type i, $f(N)$ pertaining to the number or a quantity of memberships of or associated with entity O, and $f(C)$ pertaining to the number or a quantity of contacts of or associated with entity O, and the service platform considers these customization factors in a complete fashion as described herein. Accordingly, the following definition for determining and/or creating the token requirement for a service subscription in a likewise Boolean manner comes as a result:

$$t(S_i)_O = f(x_O) + f(N) + f(C).$$

The three previous examples serve as only three possible embodiments among an at least $2^n-1$ possible definitions that can come as a result of the aforementioned determination/creation formula $t(S_i)_O$ above, wherein said possible definitions are constructed by adding, removing, and/or combining the previously mentioned customization factors and their corresponding multipliers set as Boolean values, or either a 0 or a 1, where n is the number of possible customization factors included in the formula.

To better explain how it can be concluded that at least $2^n-1$ embodiments can result from the possible combinations of the customization factors listed in the aforementioned determination/creation formula $t(S_i)_O$, suppose that the service platform has only one (1) customization factor, function A, having multiplier $m_A$, which is either a 0 or a 1. As such, only one (1) possible customization factor can be considered: function A. Because function A is considered, multiplier $m_A$ for function A is set to 1. Therefore, $t(S_i)_O$ has at least one (1) possible definition: A.

Now suppose that the service platform has two (2) customization factors that are possible for consideration: function A, having multiplier $m_A$, which is either a 0 or a 1, and function B, having multiplier $m_B$, which is either a 0 or a 1. As such, three (3) possible definitions using combinations can be shown for $t(S_i)_O$. To explain, consider a first case with function A. If only function A is considered, multiplier $m_A$ for function A is set to 1, and $m_B$ for function B is set to 0; therefore, function B is effectively omitted and not even considered in the definition. Therefore, $t(S_i)_O=A$, which represents a first possible definition for $t(S_i)_O$. Now consider a second case with function B. If only function B is considered, multiplier $m_B$ for function B is set to 1, and $m_A$ for function A is set to 0; therefore, function A is effectively omitted and not even considered in the definition. Therefore, $t(S_i)_O=B$, which represents a second possible definition for $t(S_i)_O$. Finally, consider a third case with both function A and function B. If both function A and function B are considered, multiplier $m_A$ for function A is set to 1, and $m_B$ for function B is set to 1. Therefore, $t(S_i)_O=A+B$, which is functionally equivalent to $t(S_i)_O=B+A$; this represents a third possible definition for $t(S_i)_O$. Therefore, $t(S_i)_O$ has at least three (3) possible definitions: A, B, A+B.

Continuing this combinatorial pattern with three (3) customization factors—function A, function B, and function C—will result with at least seven (7) possible definitions of $t(S_i)_O$: A, B, C, A+B, A+C, B+C, A+B+C. Continuing this pattern with four (4) customization factors—function A, function B, function C, and function D—will result with fifteen (15) possible definitions of $t(S_i)_O$: A, B, C, D, A+B, A+C, A+D, B+C, B+D, C+D, A+B+C, A+B+D, A+C+D, B+C+D, A+B+C+D. Continuing this pattern with five (5) customization factors will result with thirty-one (31) possible definitions of $t(S_i)_O$, and so forth. As such, the following sequence of possible definitions exists for $t(S_i)_O$: 1, 3, 7, 15, 31 . . . , which is defined by the function $f(n)=2^n-1$, where n is the number of items included or considered in the sequence. Therefore, this disclosure shows that, by combining all possible combinations of customization factors used and/or omitted from the original aforementioned determination/creation formula $t(S_i)_O$, there can be at least as many as $2^n-1$ additional embodiments in the creation and/or determination of a token requirement for a service subscription, whether associated with entity O or otherwise. This is made possible by implementing the above aforementioned definition for $t(S_i)_O$ with Boolean-type methods of including and/or not including each specified customization factor or function and its associated multiplier, and also by cycling through the possible combinations of customization factors or functions that are included in the definition.

Accordingly, in the original aforementioned definition/creation formula $t(S_i)_O$ for determining and/or creating the token requirement for a service subscription associated with entity O, the number of customization factors can include, but are not limited to, the following: $f(x_P)$, $f(x_O)$, $f(N)$, $f(C)$, $f(M_i)$, $f(M_T)$, $f(r(S))$, $f(p(D))$, $f(x_E)$, $f(A)$, and $f(Z)$. Therefore, there are at least eleven (11) customization factors or functions that can be used or included in the original aforementioned determination/creation formula $t(S_i)_O$. Therefore, at least as many $2^{11}-1$ (or 2,047) additional embodiments can be constructed, determined, or predetermined by combining each of the possible customization factors or functions as defined in the original aforementioned determination/creation formula $t(S_i)_O$ and as described herein, and each of the at least as many 2,047 additional embodiments are herein incorporated in this disclosure by reference.

Furthermore, in some embodiments, the determining or creation of a token requirement for a service subscription can also use values of the multipliers in a conditional manner where the values of some or all of the multipliers are further determined by the results obtained from functions of the customization factors. For example, suppose that the platform uses customization function $f(x_O)$ in a complete fashion and omits the usage of all other customization functions and/or factors if it is determined that $f(x_P)<f(x_O)$. Accordingly, the service platform sets $\beta=1$ and all other multipliers are equal to 0. Likewise, if the service platform determines that $f(x_P)>f(x_O)$, then the service platform sets all other multipliers equal to 0 with the exception of setting $\alpha=1$, thereby solely using customization function $f(x_P)$ in a complete fashion as described herein and omitting the usage of all other customization functions. Supposing that $f(x_P)=50$ and $f(x_O)=100$, and also supposing that $f(x_P)$ and $f(x_O)$ are the only two customization factors used in the original aforementioned determination/creation formula $t(S_i)_O$ in the determination of a token requirement, the following token requirement can result:

$$t(S_i)_O = \alpha \times f(x_P) + \beta \times f(x_O)$$

$$t(S_i)_O = 0 \times f(x_P) + 1 \times f(x_O)$$

$$t(S_i)_O = f(x_O)$$

$$t(S_i)_O = 100$$

This shows that the determination/creation of a token requirement can include a function of a value or amount or price $x_O$ specified by entity O and received by the service platform for service subscription S of type i associated with entity O, and any other customization factors can be omitted and not used in the determination and/or creation.

If, in this example, $f(x_P) > f(x_O)$, for example, if $f(x_P)=150$ and $f(x_O)=100$, then $t(S_i)_O=150$. This shows that the determination/creation of a token requirement can include a function of price $x_P$ specified by the service platform for service subscription S of type i associated with entity O, and any other customization factors can be omitted and not used in the determination and/or creation. This shows that, in some embodiments, a token requirement can be determined by allowing the service platform to guarantee that the token requirement or value would be at least equal to or higher than the function of price or value or amount $x_P$ specified by the service platform for service subscription S of type i associated with entity O with respect to the other functions for customization factors. Similarly, in some embodiments, a token requirement can be determined by choosing the lesser of one or more functions or customization factors. Therefore, in some embodiments, conditions or conditionals can be implemented to evaluate the result of any of one or more functions of customization factors to appropriately set values of the multipliers or to determine the inclusion or omittance of any of the customization factors used in the determination and/or creation of a token requirement so that any desired or optimal result as determined or desired by the service platform can be obtained.

In another example, suppose that the service platform takes into consideration both $f(x_O)$ and $f(x_P)$ and gives them an equal weight value of 0.5, therefore, $\alpha=0.5$ and $\beta=0.5$. Also suppose that $f(x_O)=100$ and $f(x_P)=50$. As a result, $t(S_i)_O=75$. Because the multiplier of any of the function of customization factors can be constants in the interval (0,1), the token requirement can be determined partly by a preference of the service platform, and partly by a preference as specified by entity O and received by the service platform for sponsorship S of type i. Therefore, in some embodiments, a token requirement can be created and/or determined partly by any function of customization factors.

In some embodiments, the service platform can use a relative size of an entity's contact database, or the number or a quantity of contacts associated with an entity, as a customization factor. Suppose the service platform only considers the number or a quantity of contacts associated with entity O as determined or as discovered the service platform. Additionally, suppose the service platform determines or discovers that entity O has 1,000 contacts, 500 members, 5 sponsors of type i, and 5 sponsors of type j. Additionally, suppose the service platform defines $f(C) = 0.1 \times C$, where C is the number or a quantity of contacts associated with entity O. This has the effect of setting function $f(C)$ equal to ten (10) percent of the number of contacts associated with entity O. Also assume that $\delta=1$ and all other customization factors and multipliers are omitted and not used in the determination. Therefore, the following token requirement can result:

$$t(S_i)_O = \delta \times f(C)$$

$$t(S_i)_O = 1 \times (0.1 \times 1000)$$

$$t(S_i)_O = 100$$

In some embodiments, the service platform can use the relative size of an entity's membership, or the number or a quantity of members associated with an entity, as a customization factor. Suppose the service platform only considers the number or a quantity of members associated with entity O as determined or as discovered the service platform. Therefore the following token requirement can result:

$$t(S_i)_O = \gamma \times f(N)$$

Now suppose the service platform defines f(N) as follows:

$$f(N) = \begin{cases} 50, & N \le 100 \\ 100, & 100 < N < 200 \\ 0.1 \times N + 100, & N \ge 200 \end{cases}$$

where N is the number or a quantity of members determined or discovered to have memberships associated with entity O. This piecewise function definition takes into consideration different tiers based on the number or a quantity of memberships associated with entity O. In this case, suppose that $\gamma=1$. If entity O has 40 memberships, $t(S_i)_O=50$. If the membership size of entity O is different, or changes over time, for example the service platform later discovers entity O to have 125 members, then it is possible for $t(S_i)_O=100$. Likewise, if entity O is discovered to have 500 members, $t(S_i)_O=150$. Therefore, in some embodiments, the service platform can use piecewise functions, or any possible mathematical function, in any of the functions used in the determining and/or creation of a token requirement.

In another example, suppose the service platform uses the original aforementioned definition $t(S_i)_O$ as defined above and also takes into consideration customization factor $f(x_P)$, customization factor $f(x_O)$, customization factor $f(C)$, and customization factor $f(x_E)$. Additionally, conditionals among the customization factors that affect the values of the multipliers have been established according to the following:

$$(\nexists x_O \in \mathbb{R}, f(x_O) \in \mathbb{R}) \to \begin{pmatrix} (f(C) > f(x_P)) \to (\delta = 1, \alpha = \beta = \sigma = 0) \\ \wedge \\ \neg(f(C) > f(x_P)) \to (\alpha = 1, \beta = \delta = \sigma = 0) \end{pmatrix}$$

$$\wedge$$

$$(\exists x_O \in \mathbb{R}, f(x_O) \in \mathbb{R}) \to$$

$$\begin{pmatrix} (f(x_E) > f(x_O)) \to (\sigma = 1, \alpha = \beta = \delta = 0) \\ \wedge \\ \neg(f(x_E) > f(x_O)) \to \begin{pmatrix} (f(x_P) > f(x_O)) \to (\alpha = 1, \beta = \delta = \sigma = 0) \\ \wedge \\ \neg(f(x_P) > f(x_O)) \to (\beta = 1, \alpha = \delta = \sigma = 0) \end{pmatrix} \end{pmatrix}$$

This can be explained as follows: if there does not exist a real value $x_O$ specified by entity O and received by the service platform such that customization function $f(x_O)$ can be defined or determined, then, of the two customization functions $f(x_P)$ and $f(C)$, the function having the highest value in its domain will result in that function's multiplier being set to 1, and all other multipliers of the remaining functions being set to 0; moreover, if there does exist a real value $x_O$ specified by entity O and received by the service platform such that customization function $f(x_O)$ can be defined or determined, then, of the two customization functions $f(x_E)$ and $f(x_O)$, if $f(x_E) > f(x_O)$, then $f(x_E)$'s multiplier will be set to 1, and all other multipliers of the remaining functions will be set to 0; however, if $f(x_O) >= f(x_E)$, then, of the two customization functions $f(x_P)$ and $f(x_O)$, the function having the highest value in its domain will result in that function's multiplier being set to 1, and all other multipliers of the remaining functions being set to 0.

Now, in this example, suppose $f(x_P)=100$; suppose $$f(C) = \begin{cases} 50, & C \leq 100 \\ 100, & 100 < C < 200 \\ 0.1 \times C + 100, & C \geq 200 \end{cases}$$

where C is the number or a quantity of contacts associated with entity O; and suppose the platform has not yet received a value $x_O$ from entity O and, therefore, cannot define customization function $f(x_O)$. If the number or quantity of contacts associated with entity O is 700, then $f(C)=170$. Following the conditional logic as established above at this point yields $t(S_i)_O=f(C)=170$.

Additionally, suppose that an entity E desiring service subscription S of type i associated with entity O is willing to donate a value of 200 toward service subscription S, and therefore specifies 200, which can be recorded or discovered by the service platform, and as such, the platform defines $f(x_E)=200$. Additionally, suppose that the service platform determines or discovers that the number of contacts associated with entity O, for example by querying a database or a database table or a data set containing records of contacts associated with entity O, has decreased to 90, and as such, $f(C)=50$. Because the service platform has not yet received a value $x_O$ from entity O, following the conditional logic as established above results with $t(S_i)_O=f(x_P)=100$. If the service platform does receive a value $x_O$ specified by and/or from entity O as determined or discovered or recorded or received by the service platform, and therefore the service platform sets $f(X)=30$, then, following the conditional logic as established above results with $t(S_i)_O=f(x_E)=200$. Therefore, in some embodiments, the platform can use existential quantifications, or any possible mathematical logic, in the determining and/or creation of a token requirement.

In some embodiments, the service platform can use the price of an entity's associated memberships or membership dues as a customization factor in the determining or creation of a token requirement. Suppose a token requirement is determined by the formula or definition $t(S_i)_O=f(p(D))$, where $f(p(D))$ is a function of function $p(D)$, where D is any price of membership dues specified by entity O and/or received by the service platform. Additionally, suppose that entity O has 300 total memberships, whereby 200 members have membership dues equal to 250, 50 members have membership dues equal to 500, and 50 members have membership dues equal to 150. In some embodiments, the service platform can use the average of these membership dues and define $f(p(D))=275$. Alternatively, if a service subscription is being desired by one or more interested entities associated with entity O, for example one or more members of entity O, the service platform can consider the price of the membership dues assigned to or paid by the one or more interested members in question to determine an appropriate token requirement for the one or more interested members. Suppose a first entity ("FE"), for example member A1 113 as illustrated in FIG. 1 or entity D1 213 as illustrated in FIG. 2, has been assigned or has paid a price equal to 250 for a membership with entity O. It should be noted that, in some embodiments, the service platform can receive, record, or discover membership price amounts associated with entities or members of other entities. As such, the service platform can set $p(D)=250$ for said first entity ("FE"), and the service platform can set $f(p(D))=0.1(p(D))$ for all entities interested in service subscription S of type i associated with entity O. Supposing a second entity ("SE"), for example member B1 123 as illustrated in FIG. 1 or entity Y 260 as illustrated in FIG. 2, has paid or been assigned a price equal to 500 for a membership with entity O. Using this formula for $f(p(D))$ would yield $t(S_{FE})_O=25$ as a token requirement for first entity ("FE") interested in service subscription S associated with entity O and $t(S_{SE})_O=50$ as a token requirement for second entity ("SE") interested in service subscription S associated with entity O. Therefore, in some embodiments, a token requirement of a service subscription can be determined or created by the service platform, and such determination or creation can be subject to or can consider relationships associated with membership pricing.

In some embodiments, the service platform can use or consider the number or a quantity of sponsors determined or discovered on or by the service platform as a customization factor in the determining or creation of a token requirement. Suppose that the service platform defines or determines or creates a token requirement for service subscription S as $t(S)=f(M_T)$. Additionally, suppose the platform defines $$f(M_T) = \frac{1000}{M_T},$$

where $M_T$ is the total number of sponsorships on the service platform. Additionally, suppose the service platform contains ten (10) sponsorships. In this case, the token requirement for service subscription S would be 100. If the service platform contains 11 sponsorships, the token requirement for service subscription S would be 90.91 (rounded to the nearest hundredth).

In another case, suppose that entity O has nine (9) associated sponsorships, and the platform defines a token requirement for service subscription S associated with entity O as $t(S)_O=f(M_T)$. Additionally, suppose the platform defines $$f(M_T) = \begin{cases} 150, & M_T \leq 10 \\ 100, & 10 < M_T < 20 \\ \frac{2000}{M_T}, & M_T \geq 20 \end{cases},$$

where $M_T$ is the total number of sponsorships associated with entity O. In this case, the token requirement for service subscription S associated with entity O would equal 150. If entity O is determined or discovered to have fifteen (15) associated sponsors, the token requirement would equal 100.

If entity O is determined or discovered to have twenty-five (25) associated sponsors, the token requirement would equal 80. Therefore, in some embodiments, the service platform can use the number or a quantity of sponsors determined or discovered to be associated with an entity as a customization factor in the determining or creation of a token requirement.

In another case, suppose that entity O has four (4) associated sponsorships associated with service subscription S of type i, and the service platform defines a token requirement for service subscription S of type i associated with entity O as $t(S_i)_O=f(M_i)$. Also suppose that entity O has thirty-five (35) associated sponsorships associated with service subscription S of type j, and the service platform defines a token requirement for service subscription S of type j associated with entity O as $t(S_j)_O=f(M_j)$. Additionally, suppose the platform defines $$f(M_i) = \begin{cases} 150, & M_i \le 10 \\ 100, & 10 < M_i < 20 \\ \dfrac{2000}{M_i}, & M_i \ge 20 \end{cases} \text{ and } f(M_j) = \begin{cases} 15, & M_j \le 5 \\ 30, & 5 < M_j < 33 \\ \dfrac{1000}{M_j}, & M_j \ge 33 \end{cases},$$

where $M_i$ is the number of sponsorships associated with service subscription S of type i associated with entity O, and $M_j$ is the number of sponsorships associated with service subscription S of type j associated with entity O. In this case, the token requirement for service subscription S of type i would be 150, and the token requirement for service subscription S of type j would be 28.57 (rounded to the nearest hundredth). Therefore, in some embodiments, the service platform can use the number or a quantity of sponsors associated with a service subscription of a particular type, or associated with a sponsorship type, associated with an entity as a customization factor in the determining or creation of a token requirement.

In some embodiments, the service platform can use accepted or calculated or received or tracked or discovered revenue from entities, sponsors, members, contacts, or end-users as a customization factor in the determining or creation of a token requirement. For example, suppose that the service platform defines a token requirement for service subscription S as $t(S)=f(r(R))$, where $r(R)$ is a function of R, where R is any amount of revenue accepted or calculated or received or tracked or discovered by the service platform that can be associated with one or more sponsor payments. Additionally, suppose the service platform defines $r(R)$ as follows:

$$r(R) = \sum_{i=1}^{T}(M_i \times p(S_i)),$$

where i is the index of summation representing each type of sponsorship having, or representing each different sponsorship that has, a unique value or price or token requirement to which there exists a subscriber for a sponsorship service subscription; T is the upper bound of summation representing the total number of sponsorship types having (or different sponsorships found to have) unique values or prices or token requirements to which there exists at least one subscriber for a sponsorship service subscription; $M_i$ is the number of subscribers subscribing to sponsorship service subscription of index i; and $p(S_i)$ is the price or value or token requirement for or of sponsorship payments received from current sponsorship service subscribers of index i.

Furthermore, suppose that there are five (5) sponsors of sponsorship type A and seven (7) sponsors of sponsorship type B; sponsorship type A has a price of 100; and sponsorship type B has a price of 50. Accordingly, $r(R)=850$. Also, suppose in this example that the service platform defines $f(r(R))$ as follows:

$$f(r(R)) = 3 \times \frac{r(R)}{M_T},$$

where $M_T$ is the total number of sponsors. Therefore, the token requirement for service subscription S would be equivalent to three (3) times the average price of sponsorship across all current sponsors, for example all sponsors on the service platform.

In some embodiments, the service platform can use accepted or calculated or received or tracked or discovered revenue from entities, sponsors, members, contacts, or end-users associated with an entity as a customization factor in the determining or creation of a token requirement. As in the case with the previous example, suppose in a different example that the service platform defines a token requirement for service subscription S for entity O as $t(S)_O=f(r(R))$, where $r(R)$ is a function of R, where R is any amount of revenue accepted or calculated or received or tracked or discovered by the service platform that can be associated with entity O. Likewise, $p(S_i)$ in the previous example can be replaced with $p(S_i)_O$, where the price or value or token requirement for or of sponsorship payments is unique to entity O and/or distinct from other entities having sponsors. Also, regarding $M_T$ in the definition of $f(r(R))$, rather than including the total number of subscribing sponsors across all entities as in the case with the previous example, $M_T$ can include the total number of subscribing sponsors uniquely associated with entity O. Accordingly, in some embodiments, the determination or creation of a token requirement can consider revenue received from or calculations made in association with sponsors, entities, members, contacts, or end-users being associated with a particular entity. Also, in some embodiments, the service platform can use calculated or received revenue from sponsors, entities, members, contacts, or end-users of a particular service subscription type associated with an entity as a customization factor in the determining or creation of a token requirement.

In some embodiments, a token requirement can be determined or created by using tracked or discovered or recorded interactivity or activity by the service platform. For example, suppose the service platform takes into consideration membership participation associated with entity O. For example, suppose that the service platform tracks or discovers or records the number of status updates posted by members associated with entity O or posted by a particular member associated with entity O. Accordingly, the service platform can, in a determination or creation of a token requirement, in some embodiments, reduce or discount a token requirement for a service subscription subject to such activity. Suppose in this example, an entity E, for example member A1 113 as illustrated in FIG. 1 or entity D1 213 as illustrated in FIG. 2, is associated with entity O, for example entity A 110 as illustrated in FIG. 1 or entity X 210 as illustrated in FIG. 2, and entity E has posted ten (10) status updates within a period of one month. Additionally suppose this activity is tracked or discovered by the service platform.

As such, the service platform can determine or create a token requirement for service subscription S for entity E associated with entity O as follows:

$$t(S_E)_O = f(x_P) + \mu \times f(A),$$

where f(A) is a function of tracked interactivity or activity associated with entity O as determined or discovered by the service platform, and the platform defines f(A) as follows:

$$f(A) = \begin{cases} 0, & A < 10 \text{ or } A > 20 \\ 1.5 \times A, & A \geq 10 \end{cases},$$

where A is the number of status updates posted by entity E in the last thirty (30) days. Assume $\mu = -1$, and $f(x_P) = 50$. If it is determined or discovered by the service platform that entity E has only posted five (5) status updates in the last thirty (30) days, the token requirement for service subscription S is not reduced nor does entity E receive a discount or reward for interactivity or for meeting a participation quota as determined or predetermined by the service platform. As such, the token requirement is equal to $f(x_P) = 50$. If it is determined or discovered that entity E has posted twelve (12) status updates in the last thirty days, then $f(A) = 18$, and therefore the token requirement can be effectively reduced due to interactivity or participation by entity E as determined by the service platform as a result of the determination or creation of the token requirement and/or formula. Therefore, entity E is rewarded with a discounted value of 32 for the token requirement for service subscription S. Therefore, in some embodiments, a token requirement for a service subscription can be reduced according to a determination or calculation or formulation by the service platform. Also, in some embodiments, a token requirement can include rewards or discounts. In some embodiments, said rewards or discounts can correlate with or include tracked or discovered or recorded interactivity or activity as described herein or otherwise. Furthermore, some embodiments can use tracked or discovered or recorded interactivity or activity associated with a single entity, associated with an entity having child entities, or across all entities associated with the service platform in the determination or creation of a token requirement.

Some examples of interactivity or activity or participation that can be tracked or recorded or discovered by the service platform can include, but are not limited to, the following: the number or a quantity of positive reviews on a member's or entity's or contact's or sponsor's online profile or profile page, for example a profile or profile page that can be provided to entities by the service platform, the number or a quantity of members or entities or contacts or sponsors who register or activate a profile online, for example a profile that can be activated on a service platform provided by the service platform or otherwise, a determination of the amount or a percentage of profile data a member or entity or contact or sponsor has completed, the number or a quantity of job postings associated with a member or sponsor or contact or entity, whether or not a member or sponsor or contact or entity has uploaded photos or digital images, some of which may be related to a profile administered by the member or sponsor or contact or entity, whether or not a member or sponsor or contact or entity has subscribed to interesting services as provided by and/or as determined by the service platform, whether or not an entity has subscribed to interesting services as provided by and/or as determined by the service platform, whether or not a member or sponsor or contact or entity has input data on the service platform related to any data field available for input by the member or sponsor or contact or entity, whether or not a member or sponsor or contact or entity has connected a profile page or a profile or an account under their control with or to a third-party platform, for example providing a link to a social media page under their control and/or approving a developer app as defined herein, whether or not a member or sponsor or contact or entity has interacted or socially interacted or participated with associations or identities related to the service platform that exist on other third-party platforms, for example, whether or not an entity follows or connects with a Twitter account or Twitter application administered by, associated with, or identified as operated by the service platform, etc. It should be noted that the foregoing list of interactions is not exhaustive, and any interaction that can be analyzed, queried, or otherwise determined or discovered or tracked or recorded by the service platform, whether such activity occurs within a system provided by the service platform or elsewhere, can be considered in the determination or creation of a token requirement.

Furthermore, some embodiments in the determination or creation of a token requirement can incorporate a bidding system or method. For example, suppose two parties, Party A and Party B, are interested in a service subscription for a sponsorship, for example sponsorship X 150 as illustrated in FIG. 1, associated with entity O. Suppose Party A bids a value of 95 for the sponsorship, and Party B bids a value of 100 for the sponsorship. As such, the sponsorship can be rewarded to the highest bidder, which in this case is Party B. In some embodiments, similar bidding systems can apply to sponsorships or service subscriptions across all entities, across a group of entities, among entities designated as child entities of a parent entity, within an entity, or even for a specific sponsorship or service subscription type. Additionally, service subscriptions or sponsorships obtained via a bidding system can have time-based constraints, can be granted for a specific time period, can be granted for a specific category, or can have exclusive associations, for example, the winning bidder can be granted exclusive rights, for example exclusive display or advertising rights, for example on or within a service or application or product provided by the service platform or otherwise, that supersede other service subscribers or sponsors or losing bidders. Other uses, rewards, and types of bidding systems not mentioned in this disclosure can be utilized in the determining or creation of a token requirement or a sponsorship price, and the foregoing is to serve only as an example of how a bidding system might be used.

In some embodiments, a token requirement can include a consideration of an offset or adjustment as determined or calculated or desired by the service platform. For example, suppose that an entity interested in a service subscription provides information for a coupon or discount code or other information received or accepted by the service platform. In response to receiving the information, a token requirement for the service subscription to be determined or created can be adjusted accordingly. For example, a token requirement can be adjusted by a percentage or a fixed amount in response to receiving the information. Also, any customization factor or multiplier could be adjusted in a similar manner in response to receiving the information. In some embodiments, information need not be received by the platform in order to apply an offset or adjustment, as an offset or adjustment can be applied or processed internally by the service platform or as determined by the service platform.

It should be noted that, in some embodiments, in the determination or creation of a token requirement for a service subscription, any numbers or quantities specified or used in the illustrations and examples herein can be arbitrary with respect to this disclosure. Furthermore, in some embodiments, the determination or creation of a token requirement need not use any formulas as specified herein, but instead can utilize any other calculation or formula to determine a token requirement as determined or desired by the service platform.

Still referring to FIG. 4, as illustrated by block 411, in some embodiments, the service platform can store or record a token requirement created or determined or calculated for or associated with the service subscription. In some embodiments, the recording or storing can be performed by or in a database or other recording or processing mechanism, method, system, data structure, or otherwise. As illustrated by block 413, in some embodiments, a token requirement can be included following the recording or storing of a token requirement. In some embodiments, the inclusion of a token requirement can include appending the token requirement to the presented service subscription. In some embodiments, the inclusion of a token requirement can include presenting the token requirement as a requirement that must be satisfied in order for the receiver or end-user, or a representative of the receiver or end-user, of the presented service subscription to obtain or be granted rights to receive, use, utilize, or participate in the service subscription, or to receive services associated with the service subscription.

Moving on to block 415, a request for a subscription to a service can be received. For example, the service platform can receive a request from any one of the entities as illustrated in FIG. 2. or as defined herein interested in a subscription for a service presented to the entity. For example, suppose entity A 110 as illustrated in FIG. 1 is interested in a service subscription presented by service platform 101, also as illustrated in FIG. 1. Entity A 110 can interact with an application program, for example application program 104 as illustrated in FIG. 1, which can then send request information to the service platform. In response to receiving the request, the service platform can store information associated with the request, as illustrated by block 417. In some embodiments, information associated with the request can include other information related to the entity, the token requirement, the service subscription, or the like. For example, the service platform can store which particular service subscription is being presented and/or requested; which entity is requesting the service subscription; dates associated with the service subscription, for example a beginning and/or ending date; a term length associated with the service subscription; a cost associated with the service subscription; a calculated token requirement associated with the service subscription; a fulfillment status associated with a calculated token requirement; whether or not a trial, for example a free trial, is associated with the service subscription; a duration and/or beginning and/or ending of a trial associated with the service subscription; whether or not the service subscription will renew or automatically renew; payment information associated with the service subscription; the type of service subscription; etc. In some embodiments, the storage of information associated with the request can include or can be designated as an assignment of a service contract associated with the service subscription, a reserving of a service contract associated with the service subscription, or a recording of a record of interest in a service contract associated with the service subscription. Method 400 ends, as illustrated by 499.

Figure 5:
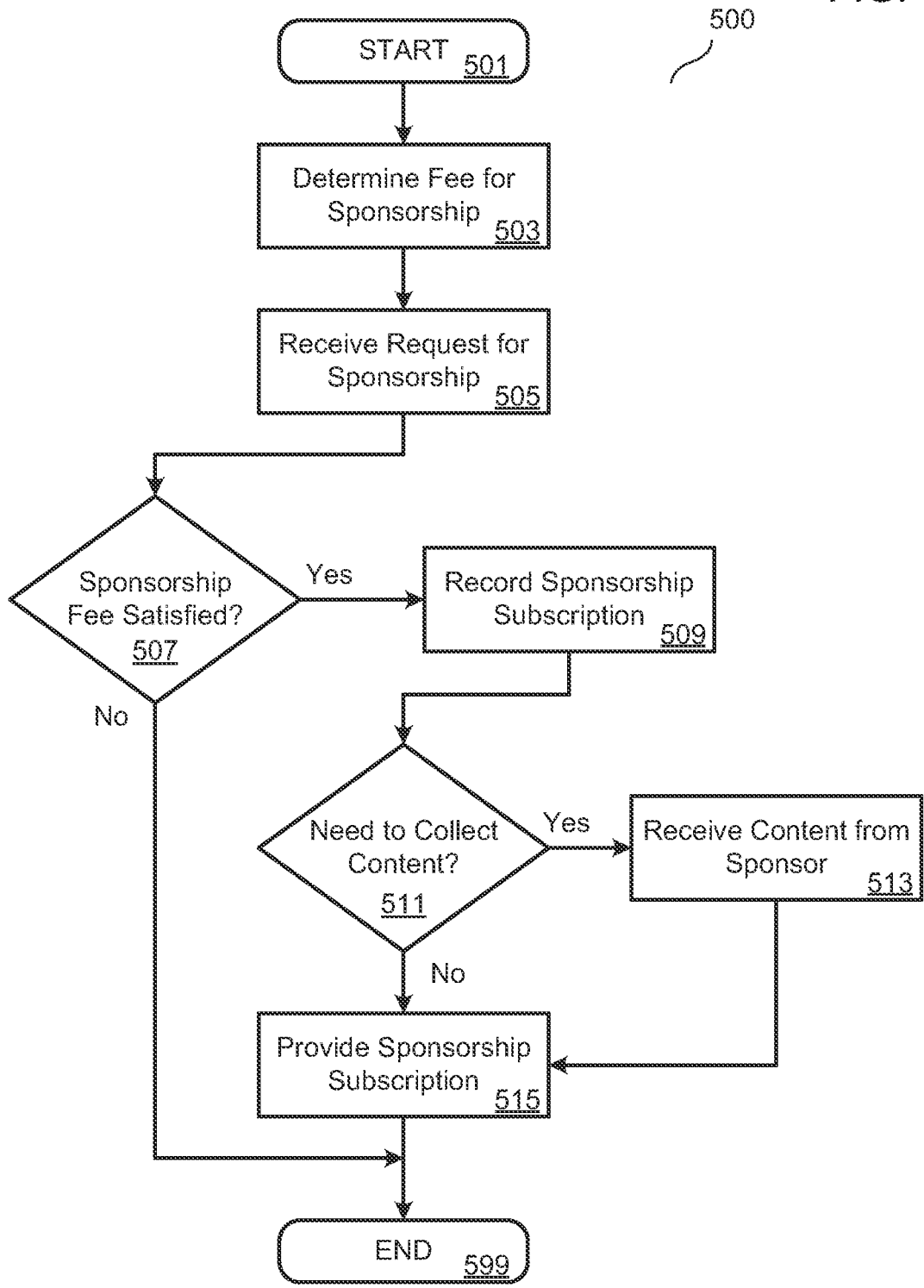
FIG. 5 is a flowchart illustrating elements of a sponsorship according to various embodiments of the present disclosure.

Referring next to FIG. 5, a method 500 illustrating elements of a sponsorship will be discussed according to various embodiments of the present disclosure. Method 500 begins, as illustrated by block 501. As illustrated by block 503, a service platform, for example service platform 101 as illustrated in FIG. 1, can determine a fee for sponsorship. For example, suppose the service platform is presenting a service subscription, for example a service subscription as described by block 403 as illustrated in FIG. 4, and the service subscription is associated with, includes, or is a sponsorship, for example sponsorship X 150 or sponsorship Y 151 as illustrated in FIG. 1. In some embodiments, the sponsorship can have an associated fee that must be paid or a requirement that must be satisfied in order for the service subscription to be assigned to or granted to an entity. In some embodiments, the fee that is determined may be a fee that is satisfied or paid by currency, such as the currencies as mentioned in the discussion of FIG. 4. In some embodiments, the fee may not be a fee that is satisfied by currency, but rather, the fee can be a requirement that is satisfied by a token requirement, for example a created or determined token requirement as illustrated by block 409 and/or discussed in the explanation of FIG. 4. Therefore, the determination of a fee for sponsorship can include any of the variations and embodiments as mentioned in the creation or determination of a token requirement as described herein or as discussed in the explanation of FIG. 4. For example, the fee for sponsorship can be determined by the service platform using customization factors, for example the customization factors described in the explanation of FIG. 4 or as described herein or otherwise. In some embodiments, the fee for sponsorship can be a fee that includes both a currency payment and a token requirement that must be satisfied in order for the fee to become satisfied or paid as determined by the service platform.

As illustrated by block 505, the service platform can receive a request for sponsorship. For example, an entity or peer or end user, for example any one of the entities or peers or end users as illustrated in FIG. 2, can send a request for sponsorship, and the service platform can receive the request. In some embodiments, the service platform can record or store the request or the interest in the sponsorship. Furthermore, in some embodiments, the service platform can receive a payment along with the request, or, in some embodiments, a payment can serve as an indicator of the request.

Next, as illustrated by block 507, a determination is made as to whether the sponsorship fee is satisfied. In some embodiments, the service platform can accept payment for the sponsorship in the determination. In some embodiments, the service platform can accept a fulfillment of a token requirement as a payment for the sponsorship in the determination. In some embodiments, payment information can be received directly by the service platform, and the service platform can process the payment information and accept the sponsorship fee as being satisfied. In some embodiments, payment information can be received by a third party, for example payment processor 165 as illustrated in FIG. 1, and the service platform can receive information regarding the payment information being received by the third party and can accept the sponsorship fee as being satisfied. In some embodiments, revenue from received payments made toward one or more sponsorships and/or associated sponsorship fees can be provided to one or more entities associated with the sponsorship in the form of distributions or dividends. In a positive determination regarding the satisfaction of the sponsorship fee, as illustrated by block 509, the service platform can record or store the sponsorship subscription or can store information regarding the fulfilled sponsorship. As illustrated by block 511, if it is determined that associated content with the sponsorship needs to be collected, for example, if the sponsorship includes advertising or content provided by the sponsor, then content can be received by the service platform, as illustrated by block 513. For example, a sponsor can provide content to the service platform to be associated with the sponsorship. Such content can include advertisements, still image content, animated content, video content, audio content, alphanumeric identifiers, geographically-associated content, or other content. If collection of content is not necessary, then method 500 can continue to block 515. As illustrated by block 515, because the sponsorship fee has been satisfied or because the requirement associated with sponsorship has been fulfilled as illustrated by block 507, a sponsorship subscription, or a service subscription associated with the sponsorship, can be provided or granted by the service platform. For example, as a result of a sponsorship requirement being satisfied, a sponsorship can be granted or delivered to an entity, for example, the subscribing entity, and for example, the services associated with the sponsorship subscription, for example advertising services, can be delivered or provided to the sponsor. It should be noted that method 500 may not be limited to elements of a sponsorship, and that method 500 can include other similar methods for other subscriptions or types of services. For example, method 500 can apply to a membership, or any other service that can be requested by an entity or peer or end-user or that can be provided by the service platform or a third-party platform, or otherwise. Method 500 ends, as illustrated by block 599.

Figure 6:
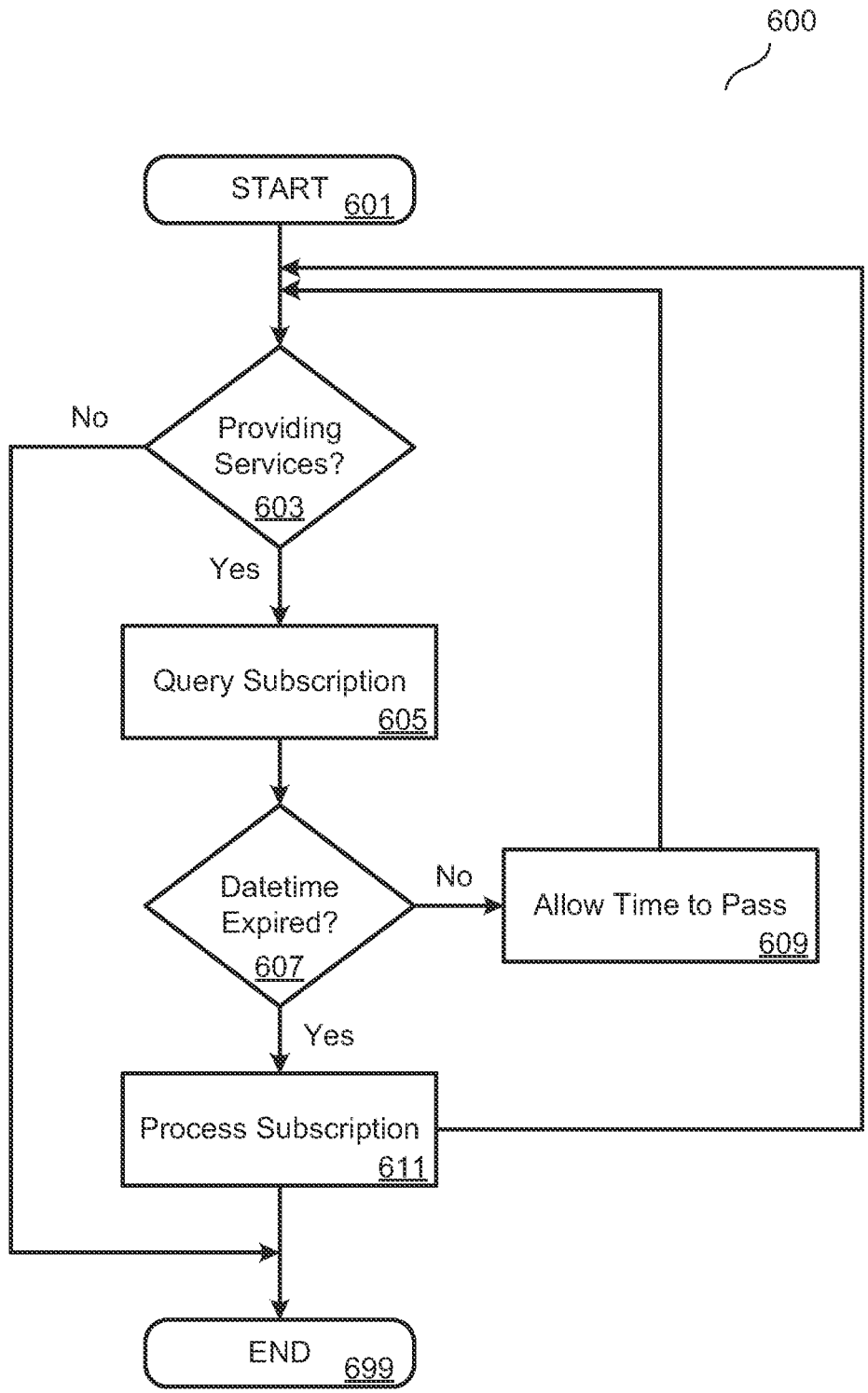
FIG. 6 is a flowchart illustrating recurring processing according to various embodiments of the present disclosure.

Referring next to FIG. 6, a method 600 illustrating elements of recurring processing will be discussed according to various embodiments of the present disclosure. Method 600 begins, as illustrated by block 601. As illustrated by block 603, a service platform, for example service platform 101 as illustrated in FIG. 1, can make a determination whether services are being provided. In some embodiments, the determination can include an evaluation whether services are being provided that are associated with a service subscription, for example subscription 160 as illustrated in FIG. 1 and/or as described herein. In some embodiments, the determination can include an evaluation if an active subscription or an active service contract exists that is associated with the service platform. For example, the service platform can query a database or a data set containing subscriptions or service contracts, and the service platform can determine, of the subscriptions or service contracts that are queried, whether any of the subscriptions or service contracts are currently active as of the current date of the determination or the query, or will become active at a later date. In some embodiments, the mere existence of the service platform could serve as a determination factor whether services are being provided. For example, if the service platform exists, then a positive determination can be made for block 603.

As illustrated by block 605, the service platform can query one or more subscriptions, for example subscription 160 as illustrated in FIG. 1. In some embodiments, information associated or returned with the subscription query can include time specific information (a "datetime") related to a date or time or related to a duration of time having an offset value. For example, suppose a subscription has a monthly renewal period, a start date, and a last processed date. A datetime associated with the subscription could be determined by adding a one month duration to the last processed date. In another example, a datetime could simply be a date and/or date with a time that does not necessarily require a method or calculation to determine the datetime. In some embodiments, a datetime can include regular date periods, for example, the first day of the month, the fifth day of the week, the third month of the year, or the like. In some embodiments, rather than being included with or determined as a result of the subscription query, datetime information can be specified or created or queried or determined that is globally associated with the service platform. In some embodiments, if the subscription being queried is associated with an entity that has a parent entity, datetime information can be specified or created or queried or determined that is locally associated with the parent entity, and therefore could apply to multiple subscriptions of child entities of the parent entity. As illustrated by block 607, a determination is made as to whether the datetime has expired. For example, a positive determination can be made if the datetime occurs before the current date of the determination, implying that the current time and date occurs later than the datetime, and therefore, the datetime has expired. In the event the datetime has not expired, method 600 can loop back to block 603 after time has been allowed to pass, as illustrated by block 609. This can serve as a way to prevent the subscription from being processed, as described by block 611, until desired. The amount of time that is allowed to pass can be determined by the service platform, can be specified or included in conjunction with a subscription or in conjunction with an entity or parent entity associated with a subscription, can be determined by computer processing time, or otherwise. Additionally, the time that is allowed to pass can be any interval of time, for example, milliseconds, seconds, minutes, hours, days, weeks, months, quarters, semesters, years, decades, or any quantity of time.

In the event the datetime has expired, the service platform can process the subscription, as illustrated by block 611. The processing of the subscription can include methods, procedures, calculations, determinations, processing, or other actions associated with the subscription that can involve or require recurring processing as desired or determined by the service platform. In some embodiments, for example, processing a service subscription, for example a service subscription having a token requirement as described in FIG. 4, may have a token requirement that can be dynamic with respect to a recurring method. For example, the service subscription can have a token requirement that can be created or determined on a regular schedule, and if the token requirement is based on factors or formulas or on a determination that can change over time, then the token requirement can change over time. As such, the creation or determination of the token requirement for the service subscription can be subject to recurring processing methods as described herein. Other methods that can be associated with or included with the processing of the subscription can include, but are not limited to, the following: applying tokens or token credits to a service subscription having a token requirement; determining if a subscription, a service contract, or a license to a service is valid or active; determining if a subscription, a service contract, or a license to a service is being used within a grace period; processing one or more payments using payment information associated with one or more responsible entities toward a subscription requirement; creating notifications related to subscriptions, for example, creating a notification, whether in a user interface or by sending a notification, for example, an email, to notify a parent entity to print invoices for child/member entities when their membership subscriptions are due; processing balances and/or dividends; generating reporting data associated with one or more subscriptions; or any other task or method associated with a subscription. In some embodiments, the processing of the subscription can include calculating or setting or creating new time specific information or a datetime or interval for a future expiration or processing date associated with the subscription, or for a renewed or new subscription that can come as a result the processing. This can allow the subscription having an expired datetime that is being processed to have a future expired datetime after the processing so that the subscription may be processed again in a recurring fashion. It should be noted that method 600 may not be limited to querying and/or processing of one or more subscriptions, but method 600 can include other similar methods for any other method, procedure, calculation, determination, task, function, routine, or subroutine that can be performed or executed by a service platform, for example service platform 101 as illustrated in FIG. 1. Method 600 ends, as illustrated by block 699.

Figure 7:
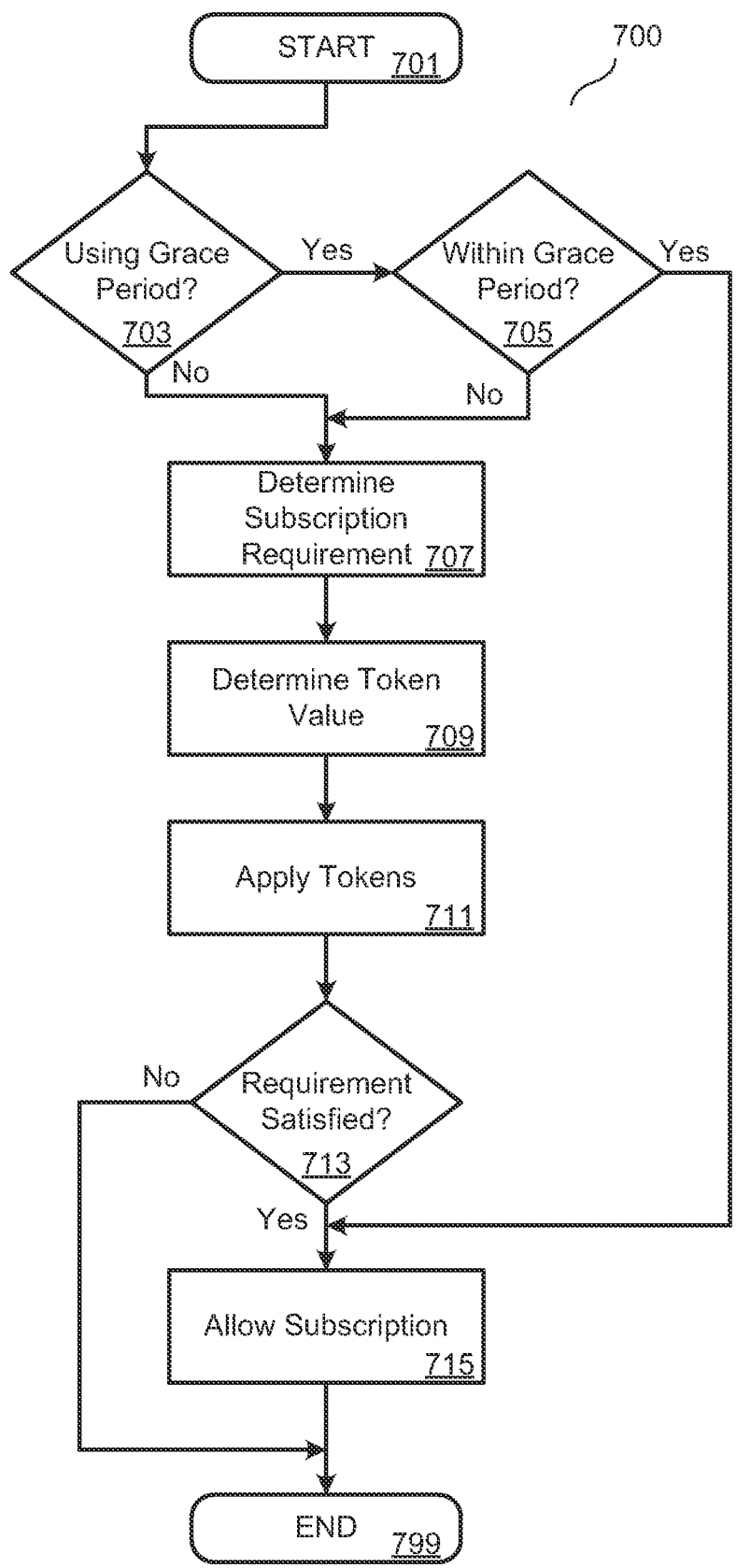
FIG. 7 is a flowchart illustrating an application of tokens according to various embodiments of the present disclosure.

Referring next to FIG. 7, a method 700 illustrating an application of tokens will be discussed according to various embodiments of the present disclosure. Method 700 begins, as illustrated by block 701. As illustrated by block 703, if a service platform, for example service platform 101 as illustrated in FIG. 1, is considering or using a grace period in the processing of a subscription, for example subscription 160 as illustrated in FIG. 1 or a subscription as described and/or discussed in the explanation of FIG. 4, FIG. 5, and/or FIG. 6, then method 700 can proceed with block 705; otherwise, method 700 can proceed with block 707. As illustrated by block 705, the service platform can make a determination as to whether the subscription is within a grace period. For example, suppose the subscription is provided to an entity, for example entity A 110 as illustrated in FIG. 1, and the entity has been granted rights or a license to use the subscription or to access services associated with the subscription during a grace period such that such rights or license bypasses a need for a requirement that must be satisfied prior to the granting of the rights or license. As such, if the service platform determines that the subscription is within such a grace period, method 700 can proceed with block 715; otherwise, method 700 can proceed with block 707. It should be noted that a grace period can be any interval of time, for example, milliseconds, seconds, minutes, hours, days, weeks, months, quarters, semesters, years, decades, or any quantity of time. Additionally, a grace period can be defined by a start date and/or an end date, and the determination whether the subscription is within a grace period can include one or more calculations using said start date and/or end date with one or more other dates, for example, the current date or the date and/or time of the determination or otherwise. In some embodiments, the grace period can be specified by an entity or a parent entity and/or can be received by the service platform. In some embodiments, the grace period can be determined by the service platform.

As illustrated by block 707, the service platform can determine or create a subscription requirement for the subscription. In some embodiments, the determining can include querying or calculating the subscription requirement, for example, using information stored in a database or dataset or data store. In some embodiments, the determining can include creating or determining or the inclusion of a token requirement and/or a required fee, for example a token requirement and/or fee as described and/or discussed in explanation of FIG. 4 and/or FIG. 5, and the created token requirement and/or required fee can be established as the determined subscription requirement. For example, suppose entity A 110 as illustrated in FIG. 1 has an interest in the subscription, the subscription is for a billing service provided by the service platform to entity A 110, entity A 110 has one hundred (100) active members, and the service platform is using a formula that defines the fee requirement in dollars for the subscription to be equal to the quantity of active members at the time of the determination. As such, in this example, the service platform can determine the subscription requirement to be one hundred (100) dollars.

As illustrated by block 709, the service platform can determine or create a token value. A token value can include a value of one or more tokens, for example a token as discussed and/or described in the explanation of FIG. 4. In some embodiments, the service platform can determine the token value to be equal to the amount of revenue received or accepted by the service platform. Revenue received or accepted can be revenue received or accepted as described herein or otherwise. For example, the token value can include revenue received or accepted by the service platform from one or more sponsors or sponsor payments associated with an entity having an interest or reservation in the subscription. In some embodiments, the service platform can determine the token value to be equal to rewards or discounts, or the value of rewards or discounts, as discussed and/or described in the explanation of FIG. 4. In some embodiments, the service platform can use a combination of received and/or accepted revenue with said rewards or discounts in the determination of a token value. In some embodiments, a token value can include a conversion of units from one type of token to another type of token. For example, a token value represented by monetary units or real currency, for example US dollars, can be converted into a token value represented by credits or token credits or virtual currency as determined by the service platform, a token value represented by credits or token credits or a virtual currency can be converted into a token value represented by monetary units or real currency, for example currency such as US dollars, a token value represented by a first real currency can be converted into a second real currency, a token value represented by a first virtual currency can be converted into a second virtual currency, or otherwise. In some embodiments, a token value can be temporal with respect to tokens that have or have not been previously applied or used or credited, for example, applied towards a subscription requirement. For example, the service platform can exclude, from a token value, all tokens or token credits that have previously been applied or credited (or marked as having been applied or credited) towards or against a subscription requirement, such that the token value consists of tokens or token credits not yet applied, in whole or in part, towards or against a token requirement or a subscription requirement or balance. As such, the token value previously applied or credited, in whole or in part, towards or against a token requirement or a subscription requirement or balance may not necessarily be or have the same token value in one or more subsequent determinations of the token value when processing the same or another subscription. Continuing with the previous example with entity A 110, suppose the service platform has received revenue from two (2) sponsors, for example sponsor A1 116 and sponsor A2 117 as illustrated in FIG. 1, and the total revenue from both sponsors is equal to one hundred fifty (150) dollars. As such, in this example, the service platform can determine the token value to be one hundred fifty (150) dollars. Additionally and optionally, the service platform can convert this token value to tokens or token credits or credits. Also additionally and optionally, the service platform can designate these tokens as unused or credits, that is, credits that have not yet been applied.

As illustrated by block 711, the service platform can apply one or more tokens or can apply one or more token credits against the subscription requirement or towards the fulfillment of the subscription requirement. In some embodiments, the application of the one or more tokens or token credits can include a designation or transformation of the one or more tokens or token credits from an unused state to a used state. For example, suppose the service platform performs an application of tokens in a recurring fashion as described by method 600 or a similar method. Tokens applied in a previous application of tokens can be designated as used and, therefore, can be excluded from or made unavailable for future applications that can occur in any subsequent application of tokens.

As illustrated by block 713, the service platform can make a determination if the requirement associated with the subscription is satisfied or fulfilled or completed. In some embodiments, the fulfillment can be accomplished or determined by the application of tokens. In some embodiments, the fulfillment can be accomplished or determined by one or more other methods, for example, receiving from a subscriber of the subscription, or an entity having an interest in the subscription, the subscription requirement, for example, a monetary payment. In some embodiments, the fulfillment can be accomplished or determined by a combination of the application of tokens and the one or more other methods. As a result of a positive determination that the subscription requirement has been satisfied, in whole or in part, method 700 can proceed to block 715.

As illustrated by block 715, the service platform can allow the subscription to the subscriber or the entity interested in or the entity having an interest in the subscription. In some embodiments, the allowance of the subscription can include or can correlate with or can be synonymous with a delivery, a grant, or a provision of the subscription, a service contract associated with the subscription, a license for use of the subscription, access or use of services associated with the subscription, or a reservation associated with the subscription. Therefore, the state of the subscription or service contract or services, or reservation or interest thereof, can be transformed by such an allowance or delivery or provision of the subscription by the service platform. Additionally, in the allowance of the subscription, the service platform can mark or designate or record the subscription as allowable, for example, by modifying one or more database records associated with the subscription or with the subscriber of the subscription whereby a delivery of the subscription can proceed, or whereby an access of services associated with the subscription by the subscriber is allowed, or whereby a delivery or provision of services associated with the subscription by the service platform is allowed or can be executed or processed or fulfilled or initiated. Method 700 ends, as illustrated by block 799.

Figure 8:
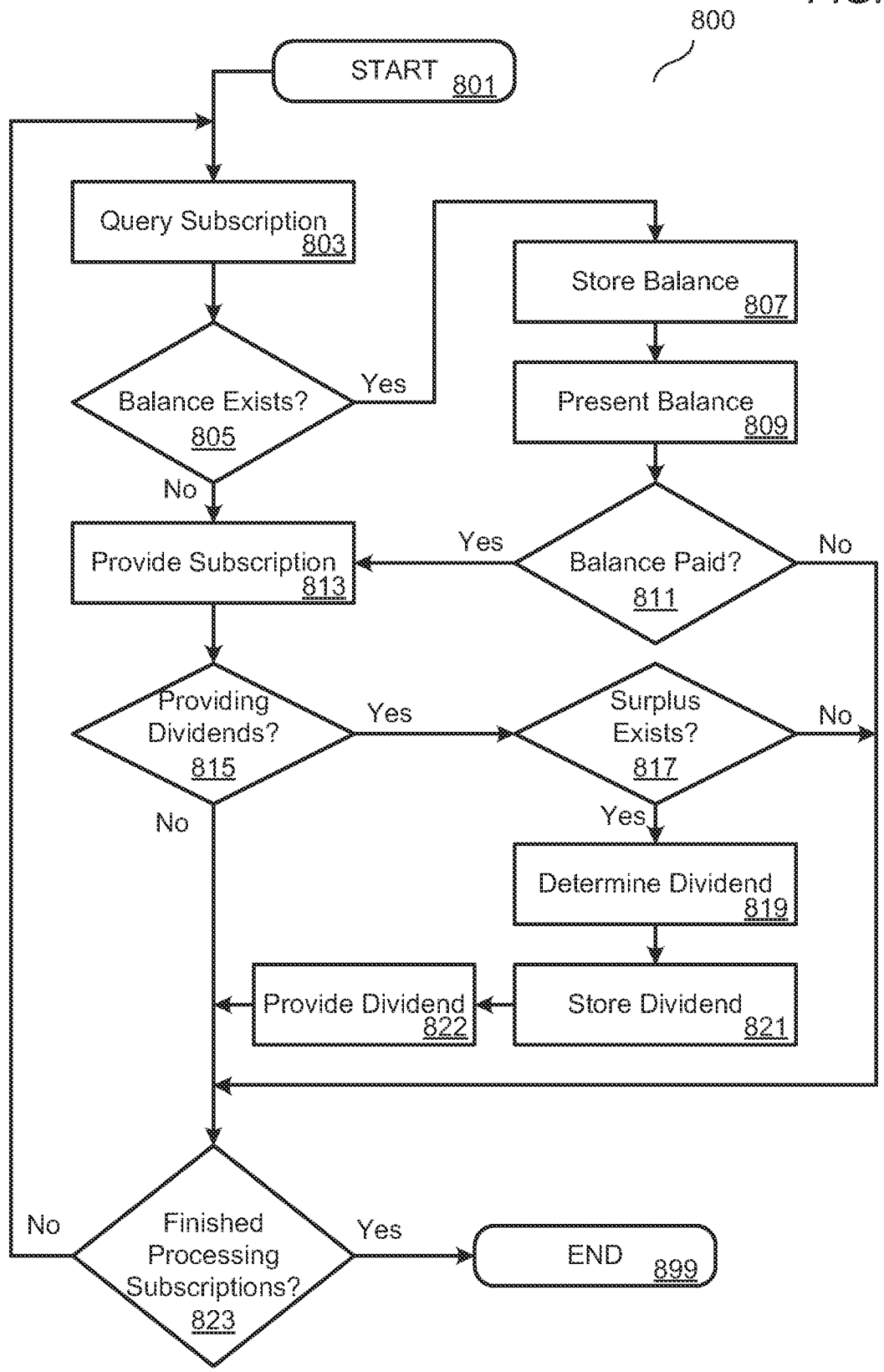
FIG. 8 is a flowchart illustrating balances and dividends according to various embodiments of the present disclosure.

Referring next to FIG. 8, a method 800 regarding balances and dividends will be discussed according to various embodiments of the present disclosure. Method 800 begins, as illustrated by block 801. As illustrated by block 803, a service platform, for example service platform 101 as illustrated in FIG. 1, can query one or more subscriptions, for example subscription 160 as illustrated in FIG. 1 or a subscription as described and/or discussed in the explanation of FIG. 4, FIG. 5, and/or FIG. 6. The one or more subscriptions can be reserved for or can have an interest held by an entity, for example entity A 110 as illustrated in FIG. 1. Furthermore, the one or more subscriptions can be a subscription to which an application of tokens, for example, an application of tokens as described by method 700, as described herein, or otherwise, can be performed. In some embodiments, the one or more subscriptions that are queried can be ordered or selected or chosen by a determined or predetermined priority. For example, suppose entity A 110 has an interest in a first subscription and an interest in a second subscription. The service platform can query the second subscription to be processed according to a method, for example method 800, before the first subscription. In some embodiments, the priority or preference of the querying of one subscription before another subscription can be determined by the service platform. For example, suppose the service platform wishes to provide a first subscription to an entity before providing a second subscription. Such a determination can use monetary or token requirement factors, for example, a subscription that has the highest monetary value or token requirement can be queried first, or a subscription that has the highest probability that its requirement will be satisfied can be queried first. In some embodiments, the priority or preference of the querying of one subscription before another subscription can be determined by an entity having one or more interests in the subscriptions that can be queried. In some embodiments, the priority can be determined by time constraints or expiration or renewal dates or processing dates of the one or more subscriptions. In some embodiments, the one or more subscriptions that are queried can be considered collectively as a group and/or as one subscription throughout method 800. In some embodiments, the priority or preference of the querying of one subscription, or a group of subscriptions, before another subscription (or another group of subscriptions) can be determined by one or more child entities of a parent entity or can be determined by one or more entities associated with the entity to which the one subscription (or subscription group) is associated. For example, suppose an entity is associated with one or more subscriptions or subscription groups, and said entity has one or more child entities associated as sponsors. In some embodiments, the one or more child entities can choose one or more of the one or more subscriptions or subscription groups of which the one or more child entities wishes to have priority over other subscriptions or subscription groups also associated with the entity. This choosing by the one or more child entities can include an application of tokens or token credits as described herein or otherwise from one or more services or subscriptions or sponsorships to which the one or more child entities has satisfied, for example by paying a fee, towards a token requirement required by the one or more subscriptions or subscription groups associated with the entity. For example, a sponsor of an entity can choose to sponsor a particular service reserved by the service platform for the entity, and upon the satisfaction of a requirement associated with the service, the service platform can prioritize and/or deliver the service over or prior to one or more other services also reserved for the entity.

As illustrated by block 805, the service platform can make a determination whether a balance exists. In some embodiments, the balance in question can be an outstanding balance for one or more subscriptions. In some embodiments, the balance in question can be an outstanding balance for an account for an entity that pertains collectively to one or more subscriptions to which the entity has one or more interests.

For example, the balance can include stored balances for other or previously processed subscription or account balances. As such, an outstanding balance can be determined by calculations that involve token requirements, tokens, token credits, financial requirements, financial payments, stored balances, or the like. For example, suppose entity A 110 is associated with a subscription that has a monthly token requirement of one hundred (100) tokens. Suppose that the service platform applies or credits one hundred ten (110) tokens or token credits toward the token requirement, resulting in a surplus of ten (10) unused or available tokens or token credits. As such, no balance exists, and method 800 can proceed to block 813. Now, suppose in a subsequent month, method 800 is processed again in a recurring fashion, for example as described by block 611 in and/or by FIG. 6. Additionally suppose the subscription has a monthly token requirement of one hundred twenty-five (125) tokens. Additionally suppose that in this subsequent month, the service platform applies or credits one hundred twenty (120) tokens or token credits toward the token requirement, resulting in an outstanding balance of five (5) tokens. As such, a balance exists. In such a case, method 800 can proceed to block 807. It should be noted that, in some embodiments, unused tokens can be carried or rolled over to one or more subscriptions. For example, suppose in the subsequent month, the service platform rolled over the ten (10) unused tokens from the previous month, and these tokens were applied towards the token requirement in addition to the one hundred twenty (120) tokens, resulting in a total of one hundred thirty (130) tokens, resulting in a surplus of five (5) tokens. As such, no balance would have existed in the subsequent month.

In some embodiments, tokens or token credits can be evenly distributed across one or more subscriptions. For example, suppose an entity has an interest in a first subscription having a token requirement of fifty (50) and an interest in a second subscription having a token requirement of one hundred (100), and suppose that there exist eighty (80) tokens available for application to the two token requirements. The service platform can evenly apply forty (40) tokens or token credits to each token requirement. In some embodiments, the service platform can apply tokens and/or token credits in an alternating or distributed manner, for example one at a time to each of the one or more subscriptions, for example until the tokens and/or token credits have each been applied, or otherwise.

As illustrated by block 807, in the event a balance exists, the service platform can store or record the balance. For example, the recording or storage can be executed in a database management system for storage in a database or executed in code for storage in a programming variable, or the like. In some embodiments, the balance can be stored for future use, for example, in a printed invoice. In some embodiments, the balance can include a tally of balances or previous balances. As illustrated by block 809, the service platform can present the balance or the outstanding balance to the owner or entity of the interest in the subscription or in the collection of the one or more subscriptions being queried. The presenting can be via a notification, for example an email or an invoice or via user interface in a program, for example application program 104 as illustrated by FIG. 1, or otherwise. As illustrated by block 811, the service platform can make a determination if the balance is paid or satisfied. In some embodiments, this determination can include a receipt or an acceptance of one or more payments that can be applied toward the balance. In some embodiments, this determination can include an application of tokens that can be applied or credited toward the balance. In the event the balance has not been paid or satisfied, method 800 can proceed to block 823. In a positive determination that the balance is paid or satisfied, as illustrated by block 813, the service platform can provide the one or more subscriptions, for example, to the entity or the subscriber of the subscription. In some embodiments, the provision can include an allowance of a subscription, for example as described by block 715 in FIG. 7. In some embodiments, the provision can include a delivery of one or more services or service contracts associated with the one or more subscriptions, the provision can include a grant or license from the service platform to the entity or subscriber for use of or access to the one or more subscriptions or service contracts or services associated with the one or more subscriptions or service contacts.

As illustrated by block 815, in the event the service platform is providing dividends or is considering a provision of dividends as part of method 800, method 800 can proceed to block 817; otherwise, method 800 can proceed to block 823. As illustrated by block 817, the service platform can make a determination whether a surplus of tokens or token credits or revenue exists with respect to the balance. For example, if there is a remainder of unused or available tokens or token credits following an application of tokens towards or for a subscription, or following a determination if a balance exists for a subscription, the service platform can make a positive determination. If there does not exist a surplus, then method 800 can proceed with block 823.

As illustrated by block 819, the service platform can determine or create a dividend. In some embodiments, the dividend can be designated for the entity having an interest in the one or more subscriptions. In some embodiments, the dividend can be designated for one or more child entities that has, by its/their participation and/or sponsorship, contributed towards an application of tokens that may have helped or contributed towards the existence or formulation of a surplus associated with its/their parent entity. The service platform can use, in the determination or creation of the dividend, one or more of any of the customization factors or formulas as described in FIG. 4. For example, suppose the service platform determines that the dividend will be equal to forty percent (40%) of any monthly surplus of tokens or token credits. If there is a surplus of one hundred (100) tokens, then, in this example, the service platform can determine the dividend to be equal to forty (40) tokens. In another example, suppose the service platform determines that the dividend will be equal to any surplus remaining that is greater than the monthly revenue generated by two sponsors of type i associated with entity A 110. Suppose, in this example, that two hundred (200) tokens were received in one month and were applied towards a subscription associated with entity A 110 having a monthly token requirement of fifty (50), leaving a surplus of one hundred fifty (150) tokens. If the monthly revenue for two sponsors of type i totals one hundred (100) tokens, the service platform could determine the dividend for entity A 110 to equal fifty (50) tokens. As illustrated by block 821, the service platform can store or store a record of or information related to the dividend. As illustrated by block 822, the service platform can provide the dividend. In some embodiments, the dividend can be provided to the one or more entities designated to receive the dividend. In some embodiments, the provision of the dividend can include using a payment processor, for example payment processor 165 as illustrated in FIG. 1, for example a payment processor to which the one or more designated entities can have an account or can have approved a developer app, as described herein, which can be used by the service platform in the dividend provision. In some embodiments, the provision of a dividend by the service platform to an entity can be performed in an automated and/or scheduled and/or recurring manner as described herein or otherwise, and/or the provision can be performed at runtime without any requirement or interaction by the entity in order for the provision to be executed by the service platform. In some embodiments, the dividend can be held and/or reserved and/or applied to one or more balances of one or more subscriptions or other subscriptions, for example a subscription that will be subsequently processed, for example, on or during a future processing date or time. In some embodiments, the part of a dividend can be held/reserved/applied to one or more balances of one or more subscriptions or other subscriptions while another part of a dividend can be provided to one or more entities designated to receive the dividend.

As illustrated by block 823, the service platform can make a determination whether the processing of subscriptions is finished or complete. For example, if an entity has one or more associated subscriptions, the service platform can continue method 800 by processing subsequent subscriptions of which have not yet been processed or are in need of being processed. If the service platform is not finished processing subscriptions, method 800 can loop back to block 803; otherwise, method 800 ends, as illustrated by block 899.

The methods and processes discussed previously, as well as other embodiments, may be implemented in a processing system executing a set of instructions stored in memory, or on a removable computer readable medium. An example of a system according to some embodiments is illustrated in FIG. 9. Referring now to FIG. 9, a high-level block diagram of a processing system is illustrated and discussed. Processing system 900 includes one or more central processing units, such as CPU A 905 and CPU B 907, which may be conventional microprocessors interconnected with various other units via at least one system bus 910. CPU A 905 and CPU B 907 may be separate cores of an individual, multi-core processor, or individual processors connected via a specialized bus 911. In some embodiments, CPU A 905 or CPU B 907 may be a specialized processor, such as a graphics processor, other co-processor, or the like.

Processing system 900 includes random access memory (RAM) 920; read-only memory (ROM) 915, wherein the ROM 915 could also be erasable programmable read-only memory (EPROM) or electrically erasable programmable read-only memory (EEPROM); input/output (I/O) adapter 925, for connecting peripheral devices such as data disk units 930, optical drive 936, or tape drive 937 to system bus 910; a user interface adapter 940 for connecting keyboard 945, mouse 950, touch interface 990, one or more cameras, compasses, accelerometers, gyroscopes (none of which are illustrated), speaker 955, microphone 960, or other user interface devices to system bus 910; communications adapter 965 for connecting processing system 900 to an information network such as the Internet or any of various local area networks, wide area networks, telephone networks, or the like, for connecting processing system 900 to a location network such as a global positioning system or the like, for connecting processing system 900 to wireless networks such as or via Bluetooth, Wi-Fi, NFC, Zigbee, Z-Wave, or the like, and/or for connecting processing system 900 to mobile provider networks such as GPRS, GSM, CDMA, LTE, WiMax, or the like; and display adapter 970 for connecting system bus 910 to a display device such as monitor 975 or the like. Mouse 950 has a series of buttons 980, 985 and may be used to control a cursor shown on monitor 975.

It will be understood that processing system 900 may include other suitable data processing systems without departing from the scope of the present disclosure. For example, processing system 900 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention, the disclosure, or various embodiments thereof can be implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any apparatus that can contain, store, communicate, propagate, or transport the program for use by or in connection with the instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Data structures and transmission of data (including wireless transmission) particular to aspects of the disclosure are also encompassed within the scope of the disclosure. Data can include, but is not limited to, information stored in or retrieved from one or more databases, data structures, data stores, or the like. Said data can include relevant information for processing, for example, user information, membership information, pricing information, records of invoices, and/or other information. Information received, discovered, queried, processed, or otherwise used with respect to this disclosure can be obtained from said one or more databases. Information recorded can be copied or stored to said one or more databases. Data structures can include a database having tables, fields, records, data types, etc. Data structures can include the use of file formats or be represented by or in specialized formats, such as those having JSON, XML, CSV (character-separated values), delimited files, hierarchical structure, or document-oriented structure, arrays, nodes, objects, collections, Booleans, integers, numbers, nulls, objects, strings, elements, doubles, date, datetimes, bytes, bits, BSON (Binary JSON) objects, regular expressions, or the like.

It should be noted that, throughout this disclosure, any reference to the term or meaning "associated with," wherein a first-mentioned object or embodiment or entity is associated with a second-mentioned object or embodiment or entity, can also include an assignment of the first-mentioned object or embodiment or entity to the second-mentioned object or embodiment or entity. For example, a first entity associated with a second entity can also include said first entity assigned to said second entity. Likewise, throughout this disclosure, any reference to the term or meaning "associated with," wherein a first-mentioned object or embodiment or entity is associated with a second-mentioned object or embodiment or entity, can also include an assignment of the second-mentioned object or embodiment or entity to the first-mentioned object or embodiment or entity. For example, a first entity associated with a second entity can also include said second entity assigned to said first entity. Any such associations or assignments can be associated or assigned or recorded or stored or referenced or determined by a service platform, for example service platform 101 as illustrated in FIG. 1.

Various embodiments have been described for applying dynamic tokens to one or more token requirements associated with one or more services or subscriptions or service contracts. Other variations and modifications of the embodiments disclosed may be made based on the description provided, without departing from the scope of the invention as set forth in the following claims. Any steps recited in any method or process claims may be executed in any order and are not limited to the order presented in the claims.

The invention claimed is:

1. A method for providing data delivery services from a service platform to one or more application programs, the method comprising:

storing, on at least one computer medium and in at least one database for maintaining subscription plans associated with a data delivery service provided by the service platform over a communications infrastructure for communication between the service platform and one or more mobile devices operated by one or more end-user subscribers, a first record associated with a first entity and a first subscription plan for the data delivery service in response to receiving, from the first entity, a request for the first subscription plan, thereby establishing the first entity as a first service recipient to receive the data delivery service per the first subscription plan;

storing, on the at least one computer medium and in the at least one database, a second record associated with a second entity and a second subscription plan for the data delivery service in response to receiving, from the second entity, a request for the second subscription plan, thereby establishing the second entity as a second service recipient to receive the data delivery service per the second subscription plan;

registering a third entity to be associated with the service platform as a first sponsor having a first sponsorship for sponsoring at least a portion of the data delivery service provided by the service platform;

providing, to at least one mobile device operated by the first service recipient, first audio content via the data delivery service, wherein the first audio content has been received by the service platform from the first sponsor for data delivery to the first service recipient;

providing, to at least one mobile device operated by the second service recipient, second audio content via the data delivery service, wherein the second audio content has been received by the service platform from a fourth entity for data delivery to the second service recipient; and after it is determined, by at least use of at least one processor, that a designated datetime for one of the subscription plans associated with the data delivery service provided by the service platform to a service recipient has passed, creating a bill for the service recipient of the one of the subscription plans regarding the data delivery service, wherein, in the instance the one of the subscription plans is the first subscription plan associated with the first record and as a result of a determination, by the service platform, that the first service recipient has subscribed to an audio delivery service provided by the first sponsor, the creating of the bill includes at least a) using first recorded tracked activity performed by the first service recipient using the data delivery service, b) creating a token requirement based on at least the first recorded tracked activity, and c) applying at least one credit towards the at least a portion of the bill regarding the data delivery service in response to the creation of the token requirement.

* * * * *